(12) United States Patent
Visser et al.

(10) Patent No.: US 9,305,567 B2
(45) Date of Patent: Apr. 5, 2016

(54) SYSTEMS AND METHODS FOR AUDIO SIGNAL PROCESSING

(71) Applicant: QUALCOMM Incorporated, San Diego, CA (US)

(72) Inventors: Erik Visser, San Diego, CA (US); Lae-Hoon Kim, San Diego, CA (US); Jongwon Shin, Gwangju (KR); Yinyi Guo, San Diego, CA (US); Sang-Uk Ryu, San Diego, CA (US); Andre Gustavo P. Schevciw, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 13/827,894

(22) Filed: Mar. 14, 2013

(65) Prior Publication Data

US 2013/0282369 A1    Oct. 24, 2013

Related U.S. Application Data

(60) Provisional application No. 61/637,175, filed on Apr. 23, 2012, provisional application No. 61/658,843, filed on Jun. 12, 2012, provisional application No. 61/726,458, filed on Nov. 14, 2012, provisional application No. 61/738,976, filed on Dec. 18, 2012.

(51) Int. Cl.
*G10L 21/0208* (2013.01)
*G10L 15/20* (2006.01)
*G10L 21/0316* (2013.01)
(Continued)

(52) U.S. Cl.
CPC .............. *G10L 21/0208* (2013.01); *G10L 15/20* (2013.01); *G10L 21/0316* (2013.01); *G10L 25/93* (2013.01); *G10L 2021/02165* (2013.01)

(58) Field of Classification Search
None
See application file for complete search history.

(56) References Cited

U.S. PATENT DOCUMENTS

| 5,228,088 | A | * | 7/1993 | Kane et al. ............ 704/233 |
| 5,664,052 | A | | 9/1997 | Nishiguchi et al. |
| 6,122,384 | A | | 9/2000 | Mauro |

(Continued)

FOREIGN PATENT DOCUMENTS

| GB | 2374265 A | 10/2002 |
| WO | WO-9912155 A1 | 3/1999 |

OTHER PUBLICATIONS

Diethorn E.J., "A subband noise-reduction method for enhancing speech in telephony and teleconferencing", Applications of Signal Processing to Audio and Acoustics, 1997 IEEE ASSP Workshop on New Paltz, NY, USA Oct. 19-22, New York, NY, USA,IEEE, US, Oct. 19, 1997, pp. 1-4, XP010248196, ISBN: 978-0-7803-3908-8.

(Continued)

*Primary Examiner* — Douglas Godbold
(74) *Attorney, Agent, or Firm* — Austin Rapp & Hardman

(57) ABSTRACT

A method for signal level matching by an electronic device is described. The method includes capturing a plurality of audio signals from a plurality of microphones. The method also includes determining a difference signal based on an inter-microphone subtraction. The difference signal includes multiple harmonics. The method also includes determining whether a harmonicity of the difference signal exceeds a harmonicity threshold. The method also includes preserving the harmonics to determine an envelope. The method further applies the envelope to a noise-suppressed signal.

44 Claims, 36 Drawing Sheets

(51) Int. Cl.
  *G10L 25/93* (2013.01)
  *G10L 21/0216* (2013.01)

(56) References Cited

U.S. PATENT DOCUMENTS

| | | | |
|---|---|---|---|
| 6,253,171 B1 | 6/2001 | Yeldener | |
| 6,363,345 B1 | 3/2002 | Marash et al. | |
| 6,658,380 B1 | 12/2003 | Lockwood et al. | |
| 6,965,860 B1 | 11/2005 | Rees et al. | |
| 7,521,622 B1 | 4/2009 | Zhang | |
| 8,606,566 B2* | 12/2013 | Li et al. | 704/205 |
| 8,831,686 B2 | 9/2014 | Hansson et al. | |
| 8,898,058 B2 | 11/2014 | Shin et al. | |
| 2002/0138254 A1* | 9/2002 | Isaka et al. | 704/208 |
| 2002/0147585 A1 | 10/2002 | Poulsen et al. | |
| 2003/0055646 A1 | 3/2003 | Yoshioka et al. | |
| 2003/0177006 A1* | 9/2003 | Ichikawa et al. | 704/231 |
| 2004/0042626 A1 | 3/2004 | Balan et al. | |
| 2004/0052384 A1* | 3/2004 | Ashley et al. | 381/94.1 |
| 2004/0148166 A1 | 7/2004 | Zheng | |
| 2005/0149321 A1 | 7/2005 | Kabi et al. | |
| 2005/0154584 A1 | 7/2005 | Jelinek et al. | |
| 2006/0053003 A1* | 3/2006 | Suzuki et al. | 704/216 |
| 2006/0069551 A1 | 3/2006 | Chen et al. | |
| 2006/0100868 A1 | 5/2006 | Hetherington et al. | |
| 2006/0239473 A1 | 10/2006 | Kjorling et al. | |
| 2006/0293882 A1* | 12/2006 | Giesbrecht et al. | 704/204 |
| 2007/0021958 A1* | 1/2007 | Visser et al. | 704/226 |
| 2007/0036342 A1 | 2/2007 | Boillot et al. | |
| 2007/0124140 A1* | 5/2007 | Iser et al. | 704/223 |
| 2007/0230712 A1 | 10/2007 | Belt et al. | |
| 2007/0288233 A1 | 12/2007 | Kim | |
| 2007/0288236 A1 | 12/2007 | Kim | |
| 2008/0027712 A1 | 1/2008 | Thomas et al. | |
| 2008/0133223 A1 | 6/2008 | Son et al. | |
| 2008/0281589 A1 | 11/2008 | Wang et al. | |
| 2009/0076815 A1* | 3/2009 | Ichikawa et al. | 704/233 |
| 2009/0089053 A1 | 4/2009 | Wang et al. | |
| 2009/0254340 A1 | 10/2009 | Sun et al. | |
| 2009/0281805 A1* | 11/2009 | LeBlanc et al. | 704/233 |
| 2009/0287481 A1* | 11/2009 | Paranjpe et al. | 704/226 |
| 2009/0292536 A1 | 11/2009 | Hetherington et al. | |
| 2009/0316918 A1 | 12/2009 | Niemisto et al. | |
| 2010/0323652 A1 | 12/2010 | Visser et al. | |
| 2011/0026722 A1 | 2/2011 | Jing et al. | |
| 2011/0033059 A1 | 2/2011 | Bhaskar et al. | |
| 2011/0046947 A1 | 2/2011 | Vaillancourt et al. | |
| 2011/0103615 A1* | 5/2011 | Sun | 381/94.3 |
| 2011/0170711 A1 | 7/2011 | Rettelbach et al. | |
| 2011/0257967 A1 | 10/2011 | Every et al. | |
| 2011/0264447 A1 | 10/2011 | Visser et al. | |
| 2011/0268301 A1 | 11/2011 | Nielsen et al. | |
| 2012/0004907 A1* | 1/2012 | Kulakcherla et al. | 704/207 |
| 2012/0051548 A1 | 3/2012 | Visser et al. | |
| 2012/0106753 A1* | 5/2012 | Theverapperuma et al. | 381/92 |
| 2012/0106758 A1* | 5/2012 | Bonada et al. | 381/94.3 |
| 2012/0130711 A1* | 5/2012 | Yamabe | 704/231 |
| 2012/0316869 A1 | 12/2012 | Xiang et al. | |
| 2013/0034243 A1* | 2/2013 | Yermeche et al. | 381/94.1 |
| 2013/0080169 A1 | 3/2013 | Harada et al. | |
| 2013/0151247 A1* | 6/2013 | Lou et al. | 704/226 |
| 2013/0218568 A1 | 8/2013 | Tamura et al. | |
| 2013/0282372 A1 | 10/2013 | Visser et al. | |
| 2013/0282373 A1 | 10/2013 | Visser et al. | |
| 2014/0072132 A1 | 3/2014 | Gautama | |
| 2014/0207443 A1* | 7/2014 | Hosoya et al. | 704/206 |
| 2014/0337021 A1 | 11/2014 | Kim et al. | |

OTHER PUBLICATIONS

Ethorn D., et al., "Subband Noise Reduction Methods for Speech Enhancement", Jan. 1, 2004, Audio Signal Processing for Next-Generation Multimedia Communication Systems, Boston, MA: Kluwer Academic Publ, US, pp. 91-115, XP008167324, ISBN: 978-1-4020-7768-5.

International Search Report and Written Opinion—PCT/US2013/037117—ISA/EPO—Feb. 20, 2014.

Mustiere et al., "Efficient SNR-Based Subband Postprocessing for Residual Noise Reduction in Speech Enhancement Algorithms", EUSIPCO 2011, Proceedings of, Aug. 23, 2010, pp. 1558-1561, XP055101329.

Partial International Search Report—PCT/US2013/037117—ISA/EPO—Oct. 8, 2013.

Plapous C., et al., "Speech Enhancement Using Harmonic Regeneration", 2005 IEEE International Conference on Acoustics, Speech, and Signal Processing—Mar. 18-23, 2005—Philadelphia, PA, USA, IEEE, Piscataway, NJ, vol. 1, Mar. 18, 2005, pp. 157-160, DOI: 10.1109/ICASSP.2005.14150741SBN: 978-0-7803-8874-1, XP010791998.

Tan L. N., et al., "Voice Activity Detection Using Harmonic Frequency, Components in Likelihood Ratio Test", Acoustics Speech and Signal Processing, (ICASSP), 2010 IEEE International Conference on, IEEE, Piscataway, NJ' USA, Mar. 14, 2010, pp. 4466-4469, XP931697540, ISBN: 978-1-4244-4295-9.

Zavarehei E et al., "Noisy Speech Enhancement Using Harmonic-Noise Model and Codebook-Based Post-Processing", IEEE Transactions on Audio, Speech and Language Processing, IEEE Service Center, New York, NY, USA, vol. 15, No. 4, May 1, 2007, pp. 1194-1203, XP011177226, ISSN: 1558-7916, DOI:10.1109/TASL.2007.894516.

Haigh, J.A. et al.: "Robust Voice Activity Detection using Cepstral Features," Speech Research Group, Electrical Engineering Department, University College Swansea, Swansea, SA2 8PP, UK. p. 321-324.

* cited by examiner

SYSTEMS AND METHODS FOR AUDIO SIGNAL PROCESSING

RELATED APPLICATIONS

This application is related to and claims priority from U.S. Provisional Patent Application Ser. No. 61/637,175 filed Apr. 23, 2012, for "DEVICES FOR APPROXIMATELY MATCHING OUTPUT LEVEL TO INPUT LEVEL AFTER NOISE SUPPRESSION," from U.S. Provisional Patent Application Ser. No. 61/658,843 filed Jun. 12, 2012, for "DEVICES FOR PRESERVING AN AUDIO ENVELOPE," from U.S. Provisional Patent Application Ser. No. 61/726,458 filed Nov. 14, 2012, for "SYSTEMS AND METHODS FOR SIGNAL LEVEL MATCHING" and from U.S. Provisional Patent Application Ser. No. 61/738,976 filed Dec. 18, 2012, for "DEVICES FOR SIGNAL LEVEL MATCHING."

TECHNICAL FIELD

The present disclosure relates generally to communication systems. More specifically, the present disclosure relates to systems and methods for audio signal processing.

BACKGROUND

Communication systems are widely deployed to provide various types of communication content such as data, voice, video and so on. These systems may be multiple-access systems capable of supporting simultaneous communication of multiple communication devices (e.g., wireless communication devices, access terminals, etc.) with one or more other communication devices (e.g., base stations, access points, etc.). Some communication devices (e.g., access terminals, laptop computers, smart phones, media players, gaming devices, etc.) may wirelessly communicate with other communication devices.

Many activities that were previously performed in quiet office or home environments may now be performed in acoustically variable situations like a car, a street or a café. For example, a person may communicate with another person using a voice communication channel. The channel may be provided, for example, by a mobile wireless handset or headset, a walkie-talkie, a two-way radio, a car-kit or another communication device. Consequently, a substantial amount of voice communication is taking place using portable audio sensing devices (e.g., smartphones, handsets and/or headsets) in environments where users are surrounded by other people, with the kind of noise content that is typically encountered where people tend to gather.

Such noise tends to distract or annoy a user at the far end of a telephone conversation. Moreover, many standard automated business transactions (e.g., account balance or stock quote checks) employ voice-recognition-based data inquiry, and the accuracy of these systems may be significantly impeded by interfering noise. Accordingly, devices that may help to reduce these inefficiencies may be beneficial.

SUMMARY

A method for signal level matching by an electronic device is described. The method includes capturing a plurality of audio signals from a plurality of microphones. The method also includes determining a difference signal based on an inter-microphone subtraction. The difference signal includes multiple harmonics. The method also includes determining whether a harmonicity of the difference signal exceeds a harmonicity threshold. The method also includes preserving the harmonics to determine an envelope. The method includes applying the envelope to a noise-suppressed signal.

The method may include segmenting an input spectrum into one or more bands. The method may also include measuring a signal-to-noise ratio for each band. The method may also include determining if the signal-to-noise ratios are less than a first threshold. The method may further include assembling a target spectrum. The method may include adjusting a gain of one or more bands in the noise-suppressed signal based on the target spectrum.

Assembling a target spectrum may include replacing a portion of a speech reference spectrum with a portion of a speech template spectrum. The portion of the speech reference spectrum that is replaced may include one or more bands where the signal-to-noise ratio is less than the first threshold. The speech reference spectrum may be based on the input spectrum. The speech template spectrum may be based on a codebook. The speech template spectrum may be based on an interpolation of the bands of the input spectrum where the signal-to-noise ratio is greater than the first threshold.

Assembling a target spectrum may include harmonic synthesis generation. The method may include suppressing residual noise based on the plurality of audio signals. Applying the envelope to the noise-suppressed signal may include adjusting a gain of the noise-suppressed signal such that a noise-suppressed signal level approximately matches an audio signal level. Determining a difference signal may include determining portions of the input spectrum that correspond to a speech signal. The target spectrum may be based on gain differences and a pitch estimate.

The method may include receiving a signal. The method may include filtering the noise signal to produce a filtered noise signal. The method may include generating a first summed signal based on the filtered noise signal and a speech signal. The method may include generating a transformed signal based on the first summed signal. The method may also include generating a fundamental frequency of the transformed signal. The method may include generating a confidence measure or a voicing parameter. The method may further include estimating one or more sinusoidal parameters based on the fundamental frequency. The method may also include generating a sinusoidal signal based on the one or more sinusoidal parameters. The method may include multiplying the sinusoidal signal by the confidence measure or voicing parameter to produce a scaled sinusoidal signal. The method may also include filtering the scaled sinusoidal signal to produce a first filtered signal. The method may include filtering the transformed signal to produce a second filtered signal. The method may further include summing the first filtered signal and the second filtered signal to produce a second summed signal. The method may further include transforming the second summed signal into a time domain.

An electronic device for signal level matching is also described. The electronic device includes a plurality of microphones that capture a plurality of audio signals. The electronic device also includes inter-microphone subtraction circuitry coupled to the plurality of audio microphones. The inter-microphone subtraction circuitry determines a difference signal based on an inter-microphone subtraction. The difference signal includes multiple harmonics. The electronic device also includes envelope determination circuitry coupled to the inter-microphone subtraction circuitry. The envelope determination circuitry determines whether a harmonicity of the difference signal exceeds a harmonicity threshold. The envelope determination circuitry also preserves the harmonics to determine an envelope. The electronic device also includes envelope application circuitry coupled to the envelope determination circuitry. The envelope application circuitry applies the envelope to a noise-suppressed signal.

A computer-program product for signal level matching is also described. The computer-program product includes a non-transitory tangible computer-readable medium with instructions. The instructions include code for causing an electronic device to capture a plurality of audio signals from a plurality of microphones. The instructions also include code for causing the electronic device to determine a difference signal based on an inter-microphone subtraction. The difference signal includes multiple harmonics. The instructions include code for causing the electronic device to determine whether a harmonicity of the difference signal exceeds a harmonicity threshold. The instructions also include code for causing the electronic device to preserve the harmonics to determine an envelope. The instructions further include code for causing the electronic device to apply the envelope to a noise-suppressed signal.

An apparatus for signal level matching is also described. The apparatus includes means for capturing a plurality of audio signals. The apparatus also includes means for determining a difference signal based on an inter-microphone subtraction. The difference signal includes multiple harmonics. The apparatus also includes means for determining whether a harmonicity of the difference signal exceeds a harmonicity threshold. The apparatus also includes means for preserving the harmonics to determine an envelope. The apparatus also includes means for applying the envelope to a noise-suppressed signal.

Another method of signal level matching by an electronic device is also described. The method includes segmenting an input spectrum into multiple bands. The method also includes measuring a signal-to-noise ratio at each band. The method further includes determining if the signal-to-noise ratio is lower than a first threshold. The method additionally includes assembling a target spectrum. The method also includes adjusting a gain of one or more bands in a noise-suppressed signal based on the target spectrum.

Another electronic device for signal level matching is also described. The electronic device includes segmenting circuitry that segments an input spectrum into multiple bands. The electronic device also includes measuring circuitry coupled to the segmenting circuitry. The measuring circuitry measures a signal-to-noise ratio at each band. The electronic device also includes threshold circuitry coupled to the measuring circuitry. The threshold circuitry determines if the signal-to-noise ratio is lower than a first threshold. The electronic device further includes assembly circuitry coupled to the threshold circuitry. The assembly circuitry assembles a target spectrum. The electronic device additionally includes adjustment circuitry coupled to the assembly circuitry. The adjustment circuitry adjusts a gain of each band in a noise-suppressed signal based on the target spectrum.

Another computer-program product for signal level matching is also described. The computer-program product includes a non-transitory tangible computer-readable medium with instructions. The instructions include code for causing an electronic device to segment an input spectrum into multiple bands. The instructions also include code for causing the electronic device to measure a signal-to-noise ratio at each band. The instructions further include code for causing the electronic device to determine if the signal-to-noise ratio is lower than a first threshold. The instructions additionally include code for causing the electronic device to assemble a target spectrum. The instructions also include code for causing the electronic device to adjust a gain of each band in a noise-suppressed signal based on the target spectrum.

Another apparatus for signal level matching is also described. The apparatus includes means for segmenting an input spectrum into multiple bands. The apparatus also includes means for measuring a signal-to-noise ratio at each band. The apparatus further includes means for determining if the signal-to-noise ratio is lower than a first threshold. The apparatus additionally includes means for assembling a target spectrum. The apparatus also includes means for adjusting a gain of each band in a noise-suppressed signal based on the target spectrum.

DETAILED DESCRIPTION

Figure 1:
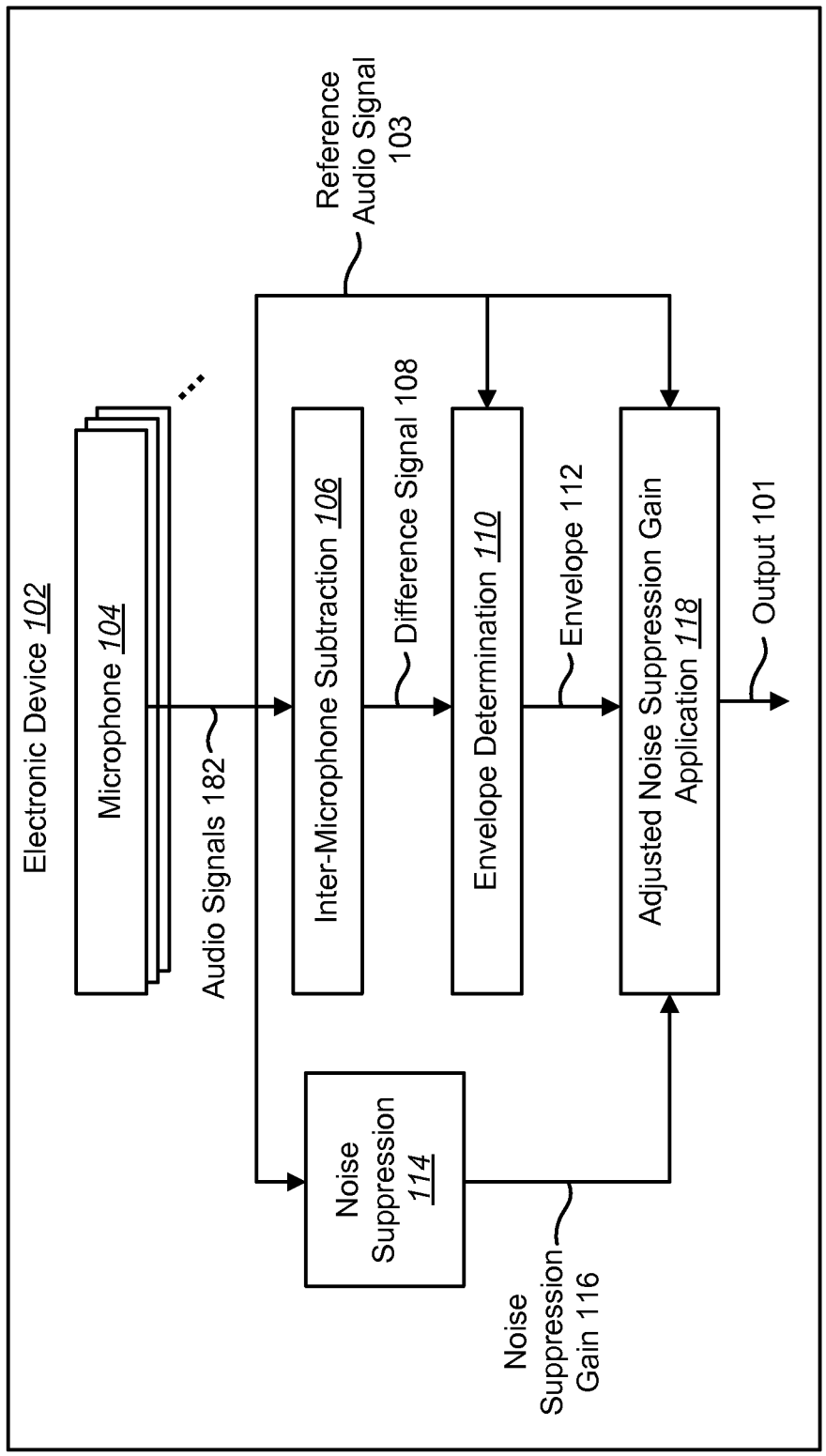
FIG. 1 is a block diagram illustrating one configuration of an electronic device in which systems and methods for signal level matching may be implemented.

The 3rd Generation Partnership Project (3GPP) is a collaboration between groups of telecommunications associations that aims to define a globally applicable 3rd generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices.

Some communication devices (e.g., access terminals, client devices, client stations, etc.) may wirelessly communicate with other communication devices. Some communication devices (e.g., wireless communication devices) may be referred to as mobile devices, mobile stations, subscriber stations, clients, client stations, user equipment (UEs), remote stations, access terminals, mobile terminals, terminals, user terminals, subscriber units, etc. Examples of communication devices include cellular telephone base stations or nodes, access points, wireless gateways, wireless routers, laptop or desktop computers, cellular phones, smart phones, wireless modems, e-readers, tablet devices, gaming systems, etc. Some of these communication devices may operate in accordance with one or more industry standards as described above. Thus, the general term "communication device" may include communication devices described with varying nomenclatures according to industry standards (e.g., access terminal, user equipment, remote terminal, access point, base station, Node B, evolved Node B, etc.).

Any incorporation by reference of a portion of a document shall also be understood to incorporate definitions of terms or variables that are referenced within the portion, where such definitions appear elsewhere in the document, as well as any figures referenced in the incorporated portion. Unless initially introduced by a definite article, an ordinal term (e.g., "first," "second," "third," etc.) used to modify a claim element does not by itself indicate any priority or order of the claim element with respect to another, but rather merely distinguishes the claim element from another claim element having a same name (but for use of the ordinal term). Unless expressly limited by its context, each of the terms "plurality" and "set" is used herein to indicate an integer quantity that is greater than one.

For applications in which communication occurs in noisy environments, it may be desirable to separate a desired speech signal from background noise. Noise may be defined as the combination of all signals interfering with or otherwise degrading the desired signal. Background noise may include numerous noise signals generated within the acoustic environment, such as background conversations of other people, as well as reflections and reverberation generated from the desired signal and/or any of the other signals. Unless the desired speech signal is separated from the background noise, it may be difficult to make reliable and efficient use of it. In one particular example, a speech signal is generated in a noisy environment, and speech processing methods are used to separate the speech signal from the environmental noise.

Noise encountered in a mobile environment may include a variety of different components, such as competing talkers, music, babble, street noise and/or airport noise. As the signature of such noise is typically non-stationary and close to the user's own frequency signature, the noise may be hard to model using traditional single-microphone or fixed beam-forming type methods. Single-microphone noise reduction techniques typically require significant parameter tuning to achieve optimal performance. For example, a suitable noise reference may not be directly available in such cases, and it may be necessary to derive a noise reference indirectly. Therefore, multiple-microphone based advanced signal processing may be desirable to support the use of mobile devices for voice communications in noisy environments.

The techniques disclosed herein may be used to improve voice activity detection (VAD) in order to enhance speech processing, such as voice coding. The disclosed voice activity detection techniques may be used to improve the accuracy and reliability of voice detection, and thus, to improve functions that depend on voice activity detection, such as noise reduction, echo cancellation, rate coding and the like. Such improvement may be achieved, for example, by using voice activity detection information that may be provided from one or more separate devices. The voice activity detection information may be generated using multiple microphones or other sensor modalities to provide a more accurate voice activity detector.

Use of a voice activity detector as described herein may be expected to reduce speech processing errors that are often experienced in traditional voice activity detection, particularly in low signal-to-noise-ratio (SNR) scenarios, in non-stationary noise and competing voices cases, and other cases where voice may be present. In addition, a target voice may be identified, and such a voice activity detector may be used to provide a reliable estimation of target voice activity. It may be desirable to use voice activity detection information to control vocoder functions, such as noise estimation updates, echo cancellation (EC), rate-control and the like. A more reliable and accurate voice activity detector may be used to improve speech processing functions such as the following: noise reduction (NR) (i.e., with more reliable voice activity detection, higher noise reduction may be performed in non-voice segments), voice and non-voiced segment estimation, echo cancellation, improved double detection schemes and rate coding improvements, which allow more aggressive rate coding schemes (for example, a lower rate for non-voice segments).

A method as described herein may be configured to process the captured signal as a series of segments. Typical segment lengths range from about five or ten milliseconds to about forty or fifty milliseconds, and the segments may be overlapping (e.g., with adjacent segments overlapping by 25% or 50%) or non-overlapping. In one particular example, the signal is divided into a series of non-overlapping segments or "frames," each having a length of ten milliseconds. A segment as processed by such a method may also be a segment (i.e., a "subframe") of a larger segment as processed by a different operation, or vice versa.

Noise suppression in adverse environments may require accurate estimation of noise and voice parameters. The labeling of which parts of the recorded signals correspond to speech or noise may be accomplished through single or multi-channel voice activity detectors that exploit properties of these signals. Signal-to-noise ratio conditions may be evaluated to determine which of the voice activity detectors are reliable. Corresponding checks and bounds may be set on the labeling scheme. Despite such precautions and sophisticated labeling, some damage may occur to the processed speech, especially in signals with low signal-to-noise ratio conditions or in dynamic scenarios where decision errors may lead to temporary voice attenuation. This is noticeable in bumps and dips of the speech envelope, outright attenuation or significant distortion of the speech output signal. Therefore, a restoration stage may be utilized to maintain a certain perceptual output level consistency. It makes the noise suppression scheme a closed loop system where the final output gain may be determined by checking the noise suppression output against the recorded speech input spectrum and levels.

The speech envelope may be encoded in its voiced part, more specifically in the spectral gain at multiples of the fundamental pitch frequency. Determining these gains may include tracking of peaks in the recorded spectrum and/or pitch estimation outright. Signal-to-noise ratio measurements may determine which parts of the spectrum can be used to determine these gains. In a handset configuration, one way to ensure there is a signal with a good signal-to-noise ratio may be to estimate peak locations or pitch at the output of the inter-microphone subtraction stage, which subtracts two (or more) signals with the same content, but with different recorded signal-to-noise ratios due to the distance of the microphones from the mouth of a user. Once the peak locations are known, they may be retrieved from the original input spectrum. Labeling which parts of the input spectrum is voiced speech for analysis may be accomplished through the use of single and multi-channel voice activity detectors. Given the speech envelope, the noise suppression output or gain may be scaled back at voiced speech peak locations to a pre-defined level or a level relating to the recorded input. For example, if the suppressed output is scaled back, some precision loss may occur in a fixed-point implementation. To prevent this, the gain may be worked on instead, with a final gain being applied after all the functions. This may lead to a sensation of consistent loudness and speech color. In other scenarios, such as speakerphone or distributed microphone arrays, the signal-to-noise ratio may be so bad in parts of the spectrum that a complete reconstruction of the speech envelope may be required, as noise suppression would cause too much damage. This requires synthesis of both voiced and unvoiced speech (e.g., gain synthesis and phase synthesis) where the missing parameters are either based on some codebook or extrapolated from less noisy parts of the spectrum.

In some implementations, to preserve a speech envelope, an electronic device may include a voiced speech voice activity detector. The electronic device may also include a switch mechanism (e.g., for switching from a dual microphone to a single microphone, etc.). According to one approach, the switching mechanism may be based on phase and dual microphone gain differences. In another approach, the switching mechanism may be based on phase, dual-microphone gain differences and a single-microphone voice activity detector. This switching mechanism may not be sufficient in the presence of public noise and/or music noise with a 0-5 dB signal-to-noise ratio. Accordingly, a more reliable voice activity detector based on speech harmonicity may be utilized in accordance with the systems and methods disclosed herein. One example of a near end voice speech detector is a harmonic product spectrum (HPS) voice activity detector.

In some implementations, the electronic device may compute a statistic that is sensitive to harmonic content by evaluating the pitch of an enhanced signal. In some implementations, the enhanced signal may be characterized as Mic1-$a$*Mic2. Accordingly, the signal of a second microphone (e.g., Mic2) may be subtracted from the signal of a first microphone (e.g., Mic1). Additionally, the signal of the second microphone (e.g., Mic2) may be scaled (e.g., by a factor a). In some examples, the pitch estimation may be performed based on autocorrelation, cepstrum, harmonic product spectrum and/or linear predictive coding (LPC) techniques. For instance, a harmonic product spectrum may use a frequency domain approach for computing pitch. The electronic device may also compute a speech pitch histogram in optimal holding pattern intervals. The speech pitch histogram may be used to gate harmonic statistics. For example, the histogram may gate the harmonic statistic by being only sensitive to speech pitch range. In some implementations, the histogram may be able to be updated with a fixed buffer length, so that it can be adjusted over time. The final harmonic statistic (e.g., the gated harmonic statistic) may be used to compute a near end voiced speech detector. In some implementations, the term "near end" refers to a signal wherein the pitch estimation may be based on the difference between two microphones (e.g., Mic1-Mic2). This may emphasize signals closer to Mic1 (hence the near end phone user). A voiced speech detector may look for harmonicity in a certain pitch range. The pitch range or contour may be learned by a speech histogram. In some implementations, the pitch range may be used to weight the harmonicity statistic. For example, a weight close to one may be used when the pitch in a current frame is located close to the maximum of the histogram. Or, a weight close to zero may be used when the pitch range is located along the tail ends of the histogram. In some implementations, the histogram may be updated only when a microphone gain difference is large and/or a measured harmonicity is large. The near end voiced speech detector may be integrated with other single channel voice activity detections to detect near end speech. If attenuated near end speech is detected during some intervals (e.g., 1.5 second intervals), the switching mechanism may switch to a single microphone. It should be noted that in some cases, the terms "harmonic" and "harmonicity" may be used interchangeably herein. For example, a "harmonic statistic" may be alternatively referred to as a "harmonicity statistic."

Voice activity detection may be used to indicate the presence or absence of human speech in segments of an audio signal, which may also contain music, noise, or other sounds. Such discrimination of speech-active frames from speech-inactive frames is an important part of speech enhancement and speech coding, and voice activity detection is an important enabling technology for a variety of speech-based applications. For example, voice activity detection may be used to support applications such as voice coding and speech recognition. Voice activity detection may also be used to deactivate some processes during non-speech segments. Such deactivation may be used to avoid unnecessary coding and/or transmission of silent frames of the audio signal, saving on computation and network bandwidth. A method of voice activity detection (e.g., as described herein) is typically configured to iterate over each of a series of segments of an audio signal to indicate whether speech is present in the segment.

It may be desirable for a voice activity detection operation within a voice communications system to be able to detect voice activity in the presence of very diverse types of acoustic background noise. One difficulty in the detection of voice in noisy environments is the very low signal-to-noise ratios that are sometimes encountered. In these situations, it is often difficult to distinguish between voice and noise, music or other sounds.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. Features and/or elements depicted in a Figure may be combined with or replaced with one or more features and/or elements depicted in one or more other Figures in some configurations. For example, one or more of the electronic devices described herein may include circuitry for performing one or more of the functions described in connection with one or more of the methods described herein. Furthermore, one or more of the functions and/or blocks/modules in some configurations may be replaced with or combined with one or more of the functions and/or blocks/modules in other configurations.

FIG. 1 is a block diagram illustrating one configuration of an electronic device 102 in which systems and methods for signal level matching may be implemented. Examples of the electronic device 102 include wireless communication devices, digital audio recorders, video cameras, desktop computers, etc. For instance, examples of wireless communication devices include smartphones, cellular phones, personal digital assistants (PDAs), wireless modems, handheld devices, laptop computers, Session Initiation Protocol (SIP) phones, wireless local loop (WLL) stations, other wireless devices, etc.

The electronic device 102 may include one or more of a plurality of microphones 104, an inter-microphone subtraction block/module 106, an envelope determination block/module 110, an adjusted noise suppression gain application block/module 118 and a noise suppression block/module 114. As used herein, the phrase "block/module" indicates that a particular component may be implemented in hardware, software or a combination of both. For example, the inter-microphone subtraction block/module 106 may be implemented with hardware components such as circuitry and/or software components such as instructions or code, etc.

The plurality of microphones 104 may receive (e.g., capture) a plurality of audio signals 182. In some implementations, an audio signal 182 may have one or more components. For example, a microphone 104 may receive an audio signal 182 with a speech component and a noise component. In one example, a speech component may include the voice of a user talking on an electronic device 102. As described above, a noise component of an audio signal 182 may be any component that interferes with a desired speech component. Examples of noise components include competing talkers, environmental noise, reverberation of the speech signal, etc.

In some configurations, the plurality of microphones 104 may be spaced apart on the electronic device 102. For example, a first microphone 104 may be placed at a first location on the electronic device 102. A second microphone 104 may be placed at a second location on the electronic device 102 that is distinct from the first location. In this example, the first microphone 104 and the second microphone 104 may receive different audio signals 182. For example, a first microphone 104 may be located closer to the source of the audio signal 182. A second microphone 104 may be located farther away from the source of the audio signal 182. In this example, the first microphone 104 may receive an audio signal 182 that is different from the audio signal 182 that is received by the second microphone 104. For example, the speech component of an audio signal 182 received by the first microphone 104 may be stronger than the speech component of an audio signal 182 received by the second microphone 104.

It should be noted that the electronic device 102 may segment an input spectrum into one or more bands (where the input spectrum is based on the audio signals 182, for example). For instance, the electronic device 102 may include a segmentation block/module (not shown in FIG. 1) that segments the input spectrum of the audio signals 182 and provides the band(s) to one or more of the blocks/modules illustrated in FIG. 1. Accordingly, the segmentation block/module may be coupled to one or more of the other blocks/modules illustrated in FIG. 1. Additionally or alternatively, one or more of the blocks/modules (e.g., noise suppression block/module 114, inter-microphone subtraction block/module 106, envelope determination block/module 110, adjusted noise suppression gain application block/module 118, etc.) illustrated in FIG. 1 may segment the input spectrum into one or more bands.

A noise suppression block/module 114 may be coupled to the plurality of microphones 104. The noise suppression block/module 114 may receive the plurality of audio signals 182 from the plurality of microphones 104. Based on the plurality of audio signals 182, the noise suppression block/module 114 may generate a noise suppression gain 116. In some implementations, the noise suppression gain 116 may reflect a version of a filter gain for an audio signal 182 with suppressed noise. For example, the noise suppression block/module 114 may receive a plurality of audio signals 182 from the plurality of microphones 104. The noise suppression block/module 114 may then reduce a noise audio signal 182 using a variety of noise suppression techniques (e.g., a clipping technique).

The inter-microphone subtraction block/module 106 may be coupled to the plurality of microphones 104. The inter-microphone subtraction block/module 106 may receive the plurality of audio signals 182 from the plurality of microphones 104. In some configurations, the inter-microphone subtraction block/module 106 may determine a difference signal 108 based on the plurality of audio signals 182. For example, the inter-microphone subtraction block/module 106 may subtract an audio signal 182 received by a second microphone 104 from an audio signal 182 received by a first microphone 104 to produce a difference signal 108.

During use of an electronic device 102, the electronic device 102 may be held in various orientations. A speech audio signal 182 may be expected to differ from a first microphone 104 (e.g., a microphone 104 closer to the source of the audio signal 182) to a second microphone 104 (e.g., a microphone 104 farther from the source of the audio signal 182) for most handset holding angles. However, a noise audio signal 182 may be expected to remain approximately equal from the first microphone 104 to the second microphone 104. Consequently, inter-microphone subtraction may be expected to improve the signal-to-noise ratio in the first microphone 104 (e.g., the microphone 104 closer to the source of the audio signal 182).

In some configurations, the difference signal 108 may indicate the difference between one or more audio signals 182 from the plurality of microphones 104. For example, the difference signal 108 may indicate a difference between the audio signal 182 received by a first microphone 104 and the audio signal 182 received by a second microphone 104. In some examples, the difference signal 108 may indicate one or more characteristics of the received audio signals 182. For example, the difference signal 108 may indicate a phase difference in the received audio signals 182. Additionally or alternatively, the difference signal 108 may indicate a level difference in the received audio signals 182. The difference signal 108 may also accentuate the different components of an audio signal 182. For example, as described above, a first microphone 104 may have a different speech audio signal 182 than a second microphone 104. In this example, the first microphone 104 and the second microphone 104 may have similar noise audio signals 182. In this example, the difference signal 108 may indicate the differences in the speech audio signals 182, thus highlighting the speech audio signal 182.

The difference signal 108 may comprise multiple harmonics. In some configurations, a harmonic may be an integer multiple of a fundamental frequency. For example, a fundamental frequency may represent the resonant frequency of a voice. In other words, a harmonic may be caused by vibration of the vocal chords. Thus, the difference signal 108 may comprise multiple integer variations of a fundamental frequency. In this example, the difference signal 108 may include a plurality of harmonics that are based on the fundamental frequency.

In some configurations, a harmonicity may be computed based on the difference signal 108. For example, a harmonicity may be computed using a harmonic product spectrum (HPS) approach (e.g., a degree of periodicity). A harmonicity threshold may be applied to the level of harmonicity. If the harmonicity of the difference signal 108 exceeds a certain harmonicity threshold, then this frame can be labeled a voiced speech frame or at least is a likely candidate for having voiced speech. The envelope determination block/module 110 may compute the harmonicity in some configurations. Alternatively, another component or block/module may compute the harmonicity.

In some implementations, the harmonicity threshold for voiced/unvoiced speech classifications in Enhanced Variable Rate Codec (EVRC) may be based off of the energy of a waveform. The harmonicity threshold may be related to some of the initial terms in the Levinson-Durbin algorithm relating to the autocorrelation. In some implementations, the harmonicity threshold may be empirically determined and/or tunable. Some examples of harmonicity thresholds may be based on the number of zero-crossings or a percentage range of energy.

In some implementations, a threshold may be applied to the difference signal 108 as well. This difference signal 108 threshold may be an implicit threshold. This implicit threshold may be zero. For example, after a bin-wise subtraction, negative differences may be clipped to zero. Additionally, the difference signal 108 threshold can be adjusted from zero to an arbitrary fixed value or it can be set according to statistics such as harmonicity or a signal-to-noise ratio. For example, if harmonicity was high recently, the difference signal 108 threshold can be adjusted (e.g., increased) so that the small differences are neglected, as some of the strong harmonic component will more likely survive in this condition regardless. In another example, in a low signal-to-noise ratio case, the difference signal 108 threshold can be raised to discard noise in the difference signal 108. In another approach, the difference signal 108 threshold may be lowered below zero and a bias may be added to make the difference at threshold zero so that the noisy desired signal can be used for harmonicity computation.

In some approaches, the difference signal 108 may be determined or obtained after multiplying one or more of the audio signals 182 by one or more gains. For example, the difference signal 108 may be expressed as Mic1-$a$*Mic2, where "Mic1" is a first microphone 104 signal, "Mic2" is a second microphone signal 104 and "a" is a gain. It should be noted that one or more of the gains may be 0. For instance, the difference signal 108 may be expressed as Mic1-0*Mic2. Accordingly, the difference signal 108 may be one of the audio signals 182 in some configurations. It should be noted that the inter-microphone subtraction block/module 106 may be optional and may not be included in the electronic device 102 in some configurations. In these configurations, one or more of the audio signals 182 may be provided to the envelope determination block/module 110.

The envelope determination block/module 110 may be coupled to the inter-microphone subtraction block/module 106. The envelope determination block/module 110 may determine an envelope 112. In other words, the envelope determination block/module 110 may determine the shape of the envelope 112. The envelope determination block/module 110 may generate and/or assemble multiple frequency band contours to produce an envelope 112. In some implementations, the envelope determination block/module 110 may determine the envelope 112 based on the plurality of audio signals 182. More specifically, the envelope determination block/module 110 may determine the envelope 112 based on the audio signal 182. For example, the envelope determination block/module 110 may determine the envelope 112 based on the speech component of the audio signal 182 as indicated in the difference signal 108.

In some configurations, the envelope determination block/module 110 may base the envelope 112 on one or more harmonics of the audio signal 182. As described above, the audio signal 182 may include one or more harmonics of the fundamental frequency (corresponding to speech). In this example, the envelope determination block/module 110 may preserve the harmonics of the audio signals 182 in determining the envelope 112.

In some implementations, once a frame has been labeled as voiced speech (e.g., voiced speech encodes the speech envelope), a pitch can be determined based on the detected harmonicity and speech peaks of the original microphone input signal based on the pitch. The peaks may also be determined by performing a minimum/maximum search in each frame with detected voiced speech. These peak amplitudes may have been damaged by noise suppression, so they may need to be scaled back or restored to the original input levels.

The adjusted noise suppression gain application block/module 118 may be coupled to the envelope determination block/module 110, the noise suppression block/module 114 and/or the one or more microphones 104. The adjusted noise suppression gain application block/module 118 may produce an output 101 (e.g., a noise-suppressed output signal) based on one or more of the noise suppression gain 116, the envelope 112 and the reference audio signal 103. For example, the adjusted noise suppression gain application block/module 118 may apply the envelope 112 to a noise-suppressed signal. As described earlier, the noise suppression gain 116 may reflect a filter gain for an audio signal 182 with suppressed noise, where the noise has been suppressed using any number of noise-suppression techniques. In some configurations, the adjusted noise suppression gain application block/module 118 may receive a noise suppression gain 116 from the noise suppression block/module 114. The adjusted noise suppression gain application block/module 118 may also receive the envelope 112 from the envelope determination block/module 110. Additionally, the adjusted noise suppression gain application block/module 118 may receive a reference audio signal 103 from the one or more microphones 104. In some configurations, the reference audio signal 103 may be one of the audio signals 182. For example, the reference audio signal 103 may be one of the microphone 104 signals from which an actual gain of target speech may be measured.

In one example, the adjusted noise suppression gain application block/module 118 may apply one or more of the envelope 112 and the noise suppression gain to a noise-suppressed signal. In some implementations, the adjusted noise suppression gain application block/module 118 may apply the envelope 112 and the noise suppression gain 116 such that the output 101 level approximately matches the audio signal 182 level. For example, the adjusted noise suppression gain application block/module 118 may clip one or more peaks and valleys of a noise-suppressed signal. Additionally or alternatively, the adjusted noise suppression gain application block/module 118 may scale a portion of a noise-suppressed signal such that it approximately matches the envelope 112. For example, the adjusted noise suppression gain application block/module 118 may multiply one or more bands of a noise-suppressed signal such that it approximately matches the envelope 112. In some configurations, the adjusted noise suppression gain application block/module 118 may apply the envelope 112 and the noise suppression gain 116 such that the output 101 level approximately matches the plurality of audio signals' 182 level.

In some configurations, the electronic device 102 may utilize the difference signal 108 and/or the reference audio signal 103 in order to determine spectrum peaks. The spectrum peaks may be utilized to restore and/or adjust a final noise suppression gain based on the spectrum peaks. It should be noted that the restoration or envelope adjustment may be applied before applying the gain function on the noise-suppressed signal. For example, if the restoration or envelope adjustment is applied after the gain function, some precision loss in fixed-point coding may occur. More detail regarding these configurations is given below in connection with FIGS. 20-28.

Figure 2:
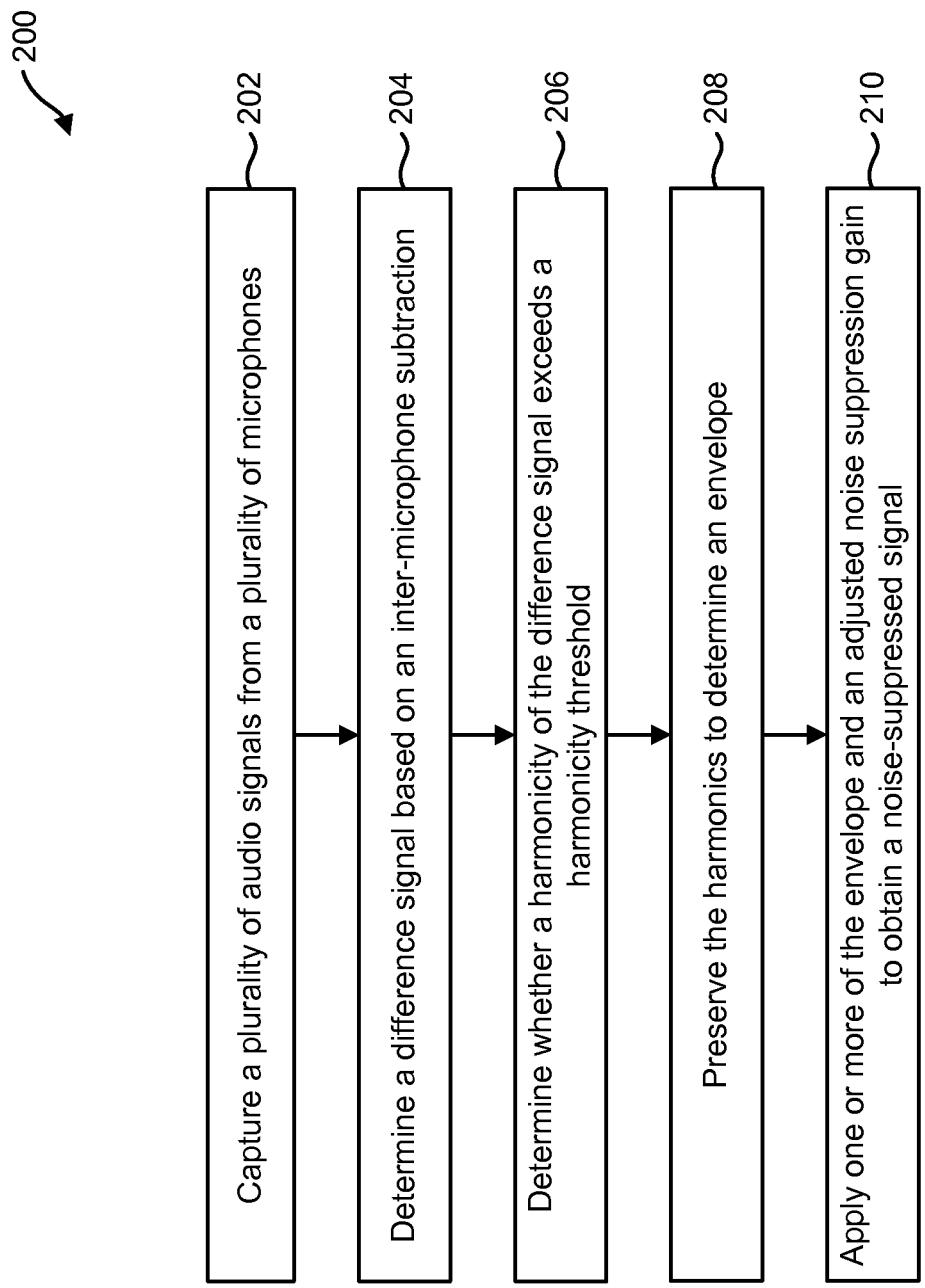
FIG. 2 is a flow diagram illustrating one configuration of a method for signal level matching.

FIG. 2 is a flow diagram illustrating one configuration of a method 200 for signal level matching. The method 200 may be performed by the electronic device 102. For example, the method 200 may be performed by a wireless communication device. The electronic device 102 may capture 202 a plurality of audio signals 182 from a plurality of microphones 104. For example, the plurality of microphones 104 may convert a plurality of acoustic audio signals to a plurality of electronic audio signals. In some configurations, the electronic device 102 may segment an input spectrum into one or more bands (where the input spectrum is based on the audio signals 182, for example).

The electronic device 102 may determine 204 a difference signal 108 based on an inter-microphone subtraction. More specifically, the electronic device 102 may determine 204 a difference signal 108 based on an inter-microphone subtraction of the plurality of audio signals 182. For example, the electronic device 102 may determine 204 a difference signal 108 based on an audio signal 182 received by a first microphone 104 and an audio signal 182 received by a second microphone 104. In some implementations, the electronic device 102 may determine 204 a difference signal based on an inter-microphone subtraction, where the difference signal comprises multiple harmonics. For example, the difference signal 108 may comprise multiple harmonics of a fundamental frequency. In some implementations, determining 204 a difference signal 108 based on an inter-microphone subtraction may include determining portions of the input spectrum that correspond to a speech signal.

The electronic device 102 may determine 206 whether a harmonicity of the difference signal 108 exceeds a harmonicity threshold. For example, a harmonicity may be computed based on the difference signal 108. In some implementations, this may be done as described above. If the harmonicity of the difference signal 108 exceeds a certain harmonicity threshold, then this frame can be labeled a voiced speech frame or at least is a likely candidate for having voiced speech.

The electronic device 102 may preserve 208 the harmonics to determine an envelope 112. For instance, the electronic device 102 may determine an envelope 112 by generating and/or assembling multiple frequency band contours to produce an envelope 112. In some implementations, the envelope determination block/module 110 may determine the envelope 112 based on the plurality of audio signals 182. More specifically, the envelope determination block/module 110 may determine the envelope 112 based on the speech audio signal 182. For example, the envelope determination block/module 110 may determine the envelope 112 based on the speech audio signal 182 as indicated in the difference signal 108.

In some configurations, the envelope determination block/module 110 may base the envelope 112 on one or more harmonics of an audio signal 182. In this example, the envelope determination block/module 110 may preserve 208 the harmonics of the audio signal 182. The harmonics may then be used to determine the envelope 112. As described above, the difference signal 108 may indicate one or more harmonics of the audio signal 182. In some implementations, the envelope determination block/module 110 may preserve 208 the harmonics of the audio signal 182 as indicated in the difference signal 108. In some configurations, preserving 208 the harmonics to develop an envelope 112 may result in envelope 112 levels that are approximately equal to the levels of the plurality of the audio signals 182 received by the microphones 104.

The electronic device 102 may apply 210 one or more of an envelope 112 and an adjusted noise suppression gain to obtain a noise-suppressed signal. For example, the electronic device 102 may apply 210 the envelope 112 such that the output signal (e.g., normalized signal) level(s) match one or more levels of the input audio signal 182 (e.g., voice signal levels). As described above, the noise-suppressed signal may be based on the plurality of audio signals 182. For example, the noise-suppressed signal may reflect a version of the plurality of audio signals 182 wherein the noise has been suppressed.

In some implementations, applying 210 the envelope 112 may include adjusting the noise-suppressed signal to approximately match the envelope 112. For example, the adjusted noise suppression gain application block/module 118 may clip one or more peaks and valleys of a noise-suppressed signal such that the noise-suppressed signal approximately matches the envelope 112. Additionally or alternatively, the adjusted noise suppression gain application block/module 118 may scale a portion of the noise-suppressed signal to approximately match the envelope 112. For example, the adjusted noise suppression gain application block/module 118 may multiply one or more bands of the noise-suppressed signal such that it approximately matches the envelope 112. In some configurations, the adjusted noise suppression gain application block/module 118 may apply the envelope 112 to a signal such that the noise-suppressed signal levels approximately match the plurality of audio signals 182 levels.

Figure 3:
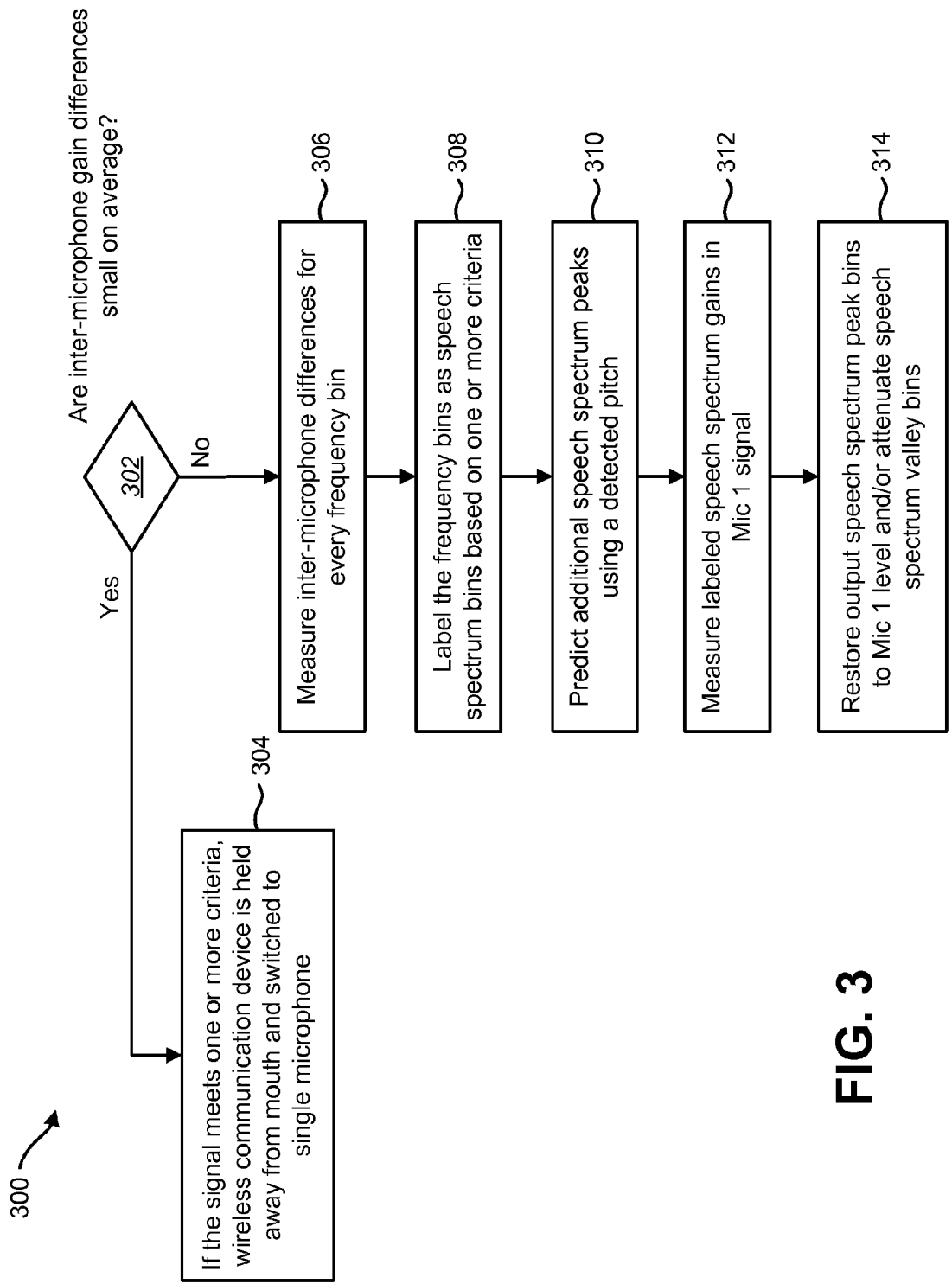
FIG. 3 is a flow diagram illustrating one configuration of a method for speech envelope preservation and/or restoration.

FIG. 3 is a flow diagram illustrating one configuration of a method 300 for speech envelope preservation and/or restoration. The method 300 may be performed by the electronic device 102. In some configurations, the electronic device 102 may determine 302 if the inter-microphone gain differences are small on average. If the electronic device 102 determines 302 that the inter-microphone gain differences are small on average, the electronic device 102 may switch 304 to a single microphone. For example, if the signal meets one or more criteria, the electronic device 102 may be held away from the mouth and switched 304 to a single microphone 104. An example of switching 304 to a single microphone is given as follows. The electronic device 102 may determine if the audio signal 182 meets one or more criteria. In some examples, the audio signal 182 may be a dual microphone 104 signal defined by the relationship Mic1-bMic2, where b is a scalar. Examples of criteria include a harmonicity of the audio signal 182 exceeding a certain threshold a few number of times in a defined period of time, a single channel voice activity detector is active and dual microphone 104 noise suppressed output is attenuated with respect to the input. In some configurations, in addition to evaluating whether the difference signal exceeds a certain harmonicity threshold in each frame, this condition may have to be fulfilled for at least a certain number of frames within a period (e.g., 2 seconds) for there to be sufficient evidence to switch the noise suppression scheme from multiple (e.g., dual) microphones to a single microphone. If the electronic device 102 determines that the audio signal 182 meets one or more criteria, the electronic device 102 may switch 304 to a single microphone 104. In some examples, switching 304 to a single microphone 104 may be based on received input. For example, a user may hold the phone away from the mouth.

If the electronic device 102 determines 302 that inter-microphone gains are not small on average, the electronic device 102 may measure 306 the inter-microphone differences for every frequency bin. In some implementations, the electronic device 102 may label 308 the frequency bins as speech spectrum bins based on one or more criteria. For example, the electronic device 102 may label 308 the frequency bins as speech spectrum bins when the differences (e.g., inter-microphone gain differences) exceed a certain threshold and the near end voiced speech detector indicates voice activity (e.g., when a harmonic product spectrum voice activity detector is equal to 1). The electronic device 102 may predict 310 additional speech spectrum peaks using a detected pitch. The electronic device 102 may measure 312 the labeled speech spectrum gains in the first microphone 104 (e.g., Mic1) signal. The electronic device 102 may restore 314 the output speech spectrum peak bins to the first microphone 104 (e.g., Mic1) level and/or attenuate speech spectrum valley bins.

Figure 4:
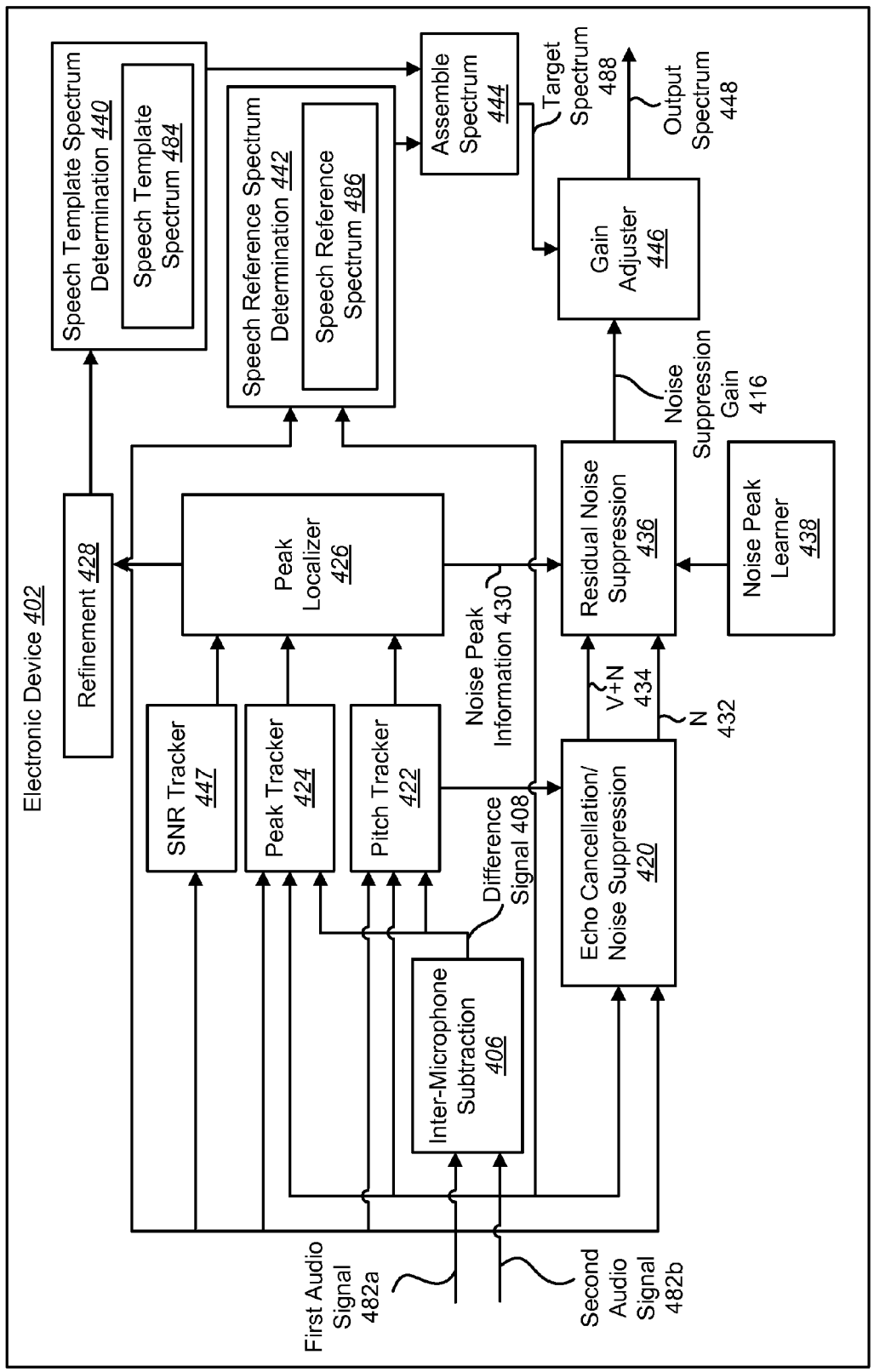
FIG. 4 is a block diagram illustrating another configuration of an electronic device in which systems and methods for signal level matching may be implemented.

FIG. 4 is a block diagram illustrating another configuration of an electronic device 402 in which systems and methods for signal level matching may be implemented. The electronic device 402 may be an example of the electronic device 102 described in connection with FIG. 1. The electronic device 402 may include an inter-microphone subtraction block/module 406, which may be an example of the inter-microphone subtraction block/module 106 described in connection with FIG. 1. Specifically, the inter-microphone subtraction block/module 406 may subtract one or more audio signals 482a-b provided by the plurality of microphones 104. In some configurations, the audio signals 482a-b may be examples of the audio signals 182 described in connection with FIG. 1. In some implementations, the inter-microphone subtraction block/module 406 may segment an input spectrum into one or more bands. The inter-microphone subtraction block/module 406 may lower noise levels in the audio signals 482a-b, possibly enhancing the peaks of the difference signal 408 generated by the inter-microphone subtraction block/module 406. In some configurations, the difference signal 408 may be an example of the difference signal 108 described in connection with FIG. 1.

The electronic device 402 may also include one or more of a peak tracker 424, a pitch tracker 422, an echo cancellation/noise suppression block/module 420, a noise peak learner 438, a residual noise suppression block/module 436, a peak localizer 426, a refinement block/module 428, a speech template spectrum determination block/module 440, a speech reference spectrum determination block/module 442, an assemble spectrum block/module 444 and a gain adjuster block/module 446.

The difference signal 408 may be provided to one or more of the peak tracker 424 and the pitch tracker 422. Additionally or alternatively, the plurality of microphones 104 may provide audio signals 482a-b to the peak tracker 424 and/or the pitch tracker 422. The peak tracker 424 may track peaks in the difference signal 408 and/or two or more audio signals 482a-b. The pitch tracker 422 may track the pitch (e.g., the fundamental frequency and/or harmonics of a voice signal) of the difference signal 408 and/or two or more audio signals 482a-b. The peak tracker 424 and/or the pitch tracker 422 may provide tracking information to a peak localizer 426. In some implementations, the peak localizer 426 may determine the location of peaks in the audio signals 482a-b. For example, the peak localizer 426 may analyze the peaks of the difference signal 408 and the audio signals 482a-b received from the microphones 104 to determine which peaks are caused by noise and which peaks are caused by speech.

The peak localizer 426 may provide peak information to a refinement block/module 428. The refinement block/module 428 may determine the sufficiency of peak information for determining an envelope 112. As described above, the envelope 112 may be based on the peaks of the plurality of audio signals 482a-b. If the peaks are not sufficient, then the envelope 112 may not be reliable. In one configuration, the refinement block/module 428 may determine if the peaks are sufficient by determining the signal-to-noise ratio of the audio signals 482a-b and determining whether the signal-to-noise ratio is too low. For example, the refinement block/module 428 may determine if the signal-to-noise ratios are less than a first threshold. If a signal-to-noise ratio of a peak is too low (e.g., lower than the first threshold), then that peak may not provide sufficient information to determine the shape of the envelope 112. In this case, the electronic device 402 may utilize a speech template spectrum 484 located in a speech template spectrum determination block/module 440 in order to select a replacement band spectrum for the portion of the audio signals 482a-b with a low signal-to-noise ratio. In some configurations, the speech template spectrum 484 may be based on a codebook. In other configurations, the speech template spectrum 484 may be based on an interpolation of the bands of the input spectrum (e.g., the difference signal 408 and the audio signals 482a-b) where the signal-to-noise ratio was sufficient.

By comparison, if a peak is sufficient (e.g., the signal-to-noise ratio is not too low), then the electronic device 402 may utilize a speech reference spectrum 486 in order to select the band spectrum for that portion of the audio signals 482a-b. As described above, the plurality of microphones 104 may be coupled to a speech reference spectrum determination block/module 442. In some cases, the speech reference spectrum determination block/module 442 may include a speech reference spectrum 486 that is based on the plurality of audio signals 482a-b. In this case, the speech reference spectrum 486 contained in the speech reference spectrum determination block/module 442 may include the portions of the input spectrum (e.g., the audio signals 482a-b from the plurality of microphones 104) where the signal-to-noise ratio was not too low.

One or more signal bands from the speech reference spectrum 486 and/or from the speech template spectrum 484 may be provided to an assemble spectrum block/module 444. For example, the speech reference spectrum determination block/module 442 may send one or more bands of the speech reference spectrum 486 (e.g., corresponding to bands of the audio signal 482a-b where the peak information was sufficient) to the assemble spectrum block/module 444. Similarly, the speech template spectrum determination block/module 440 may send one or more bands of the speech template spectrum 484 (e.g., corresponding to bands of the audio signal 482a-b where the peak information was not sufficient) to the assemble spectrum block/module 444. The assemble spectrum block/module 444 may assemble a target spectrum 488 based on the received bands. In some configurations, the envelope 112 described in connection with FIG. 1 may be an example of the target spectrum 488. In some implementations, the target spectrum 488 may be based on a gain difference and a pitch estimate. The target spectrum 488 may then be provided to the gain adjuster block/module 446. As will be described in greater detail below, the gain adjuster block/module 446 may adjust the gain of a noised-suppressed signal based on the target spectrum 488 and/or the noise suppression gain 416.

The echo cancellation/noise suppression block/module 420 may perform echo cancellation and/or noise suppression on the input audio signals 482a-b received from the one or more microphones 104. In some implementations, the echo cancellation/noise suppression block/module 420 may implement one or more of the functions performed by the noise suppression block/module 114 described in connection with FIG. 1. The echo cancellation/noise suppression block/module 420 may provide a voice and noise signal 434 (V+N) as well as a noise signal 432 (N) to a residual noise suppression block/module 436.

Noise peak information 430 from the peak localizer 426 may be provided to the residual noise suppression block/module 436. Additionally or alternatively, a noise peak learner 438 may provide information to the residual noise suppression block/module 436. The noise peak learner 438 may determine (e.g., learn) peaks in the non-stationary noise spectrum. In some configurations, this may be accomplished based on the same techniques utilized in pitch tracking and/or peak tracking. However, this may be performed on a noise reference signal or may be determined (e.g., learned) as a side product of the speech peak tracking. The learned noise peaks may be utilized to identify a tonal residual of interfering speakers or music. The tonal residual(s) may then be effectively removed in a noise suppression post-processing stage (e.g., the residual noise suppression block/module 436), for example. The residual noise suppression block/module 436 may perform additional noise suppression in an attempt to remove residual noise from the voice and noise signal 434. For example, the residual noise suppression block/module 436 may determine the harmonics of a first microphone 104 signal. Based on those harmonics, the residual noise suppression block/module 436 may further suppress noise. In another example, the residual noise suppression block/module 436 may determine the harmonics of a difference signal (e.g., a first microphone 104 minus a second microphone 104 signal). Based on those harmonics, the residual noise suppression block/module 436 may further suppress noise. For example, the residual noise suppression block/module 436 may suppress residual noise based on the plurality of audio signals. In some implementations, the residual noise suppression block/module 436 may implement one or more of the functions performed by the noise suppression block/module 114 described in connection with FIG. 1.

The residual noise suppression block/module 436 may provide a noise-suppression gain 416 to the gain adjuster block/module 446. The gain adjuster block/module 446 may amplify and/or attenuate portions (e.g., frequency bands) of a noise-suppressed signal based on the target spectrum 488 and/or the noise suppression gain 416. Additionally or alternatively, the gain adjuster block/module 446 may scale a portion of a noise-suppressed signal such that it approximately matches the target spectrum 488. For example, the gain adjuster block/module 446 may multiply one or more bands of a noise-suppressed signal such that it approximately matches the target spectrum 488. In some configurations, the gain adjuster block/module 446 may apply the target spectrum 488 to a noise-suppressed signal such that the noise-suppressed signal approximately matches the level of the plurality of the audio signals 482a-b of the plurality of microphones 104. In some configurations, the gain adjuster block/module 446 may clip one or more peaks and valleys of the noise-suppressed signal such that the noise-suppressed signal approximately matches the level(s) of the target spectrum 488 and/or level(s) of the plurality of audio signals 482a-b. The gain adjuster block/module 446 may provide an output spectrum 448. In some configurations, the output spectrum 448 may reflect the noise-suppressed signal with the target spectrum 488 applied. The level(s) of the output spectrum 448 signal may approximately match those of the input audio signal 482a-b (e.g., input voice signal).

The SNR tracker 447 may be implemented similar to the SNR determination block/module 2085 described in connection with FIG. 20 in some configurations. Additionally, the peak tracker 424 may be implemented similar to the peak map block/module 2083 described in connection with FIG. 20. Furthermore, the pitch tracker 422 may include the framewise processing block/module 2073 described in connection with FIG. 20 to compute harmonicity information. The refinement block/module 428 may include the post-processing block/module 2093 described in connection FIG. 20.

In some configurations, the pitch tracker 422 may provide harmonicity information in order to perform microphone switching (e.g., dual to single microphone switching and single to dual microphone switching stat change) in (and/or before) the echo cancellation/noise suppression block/module 420.

Figure 5:
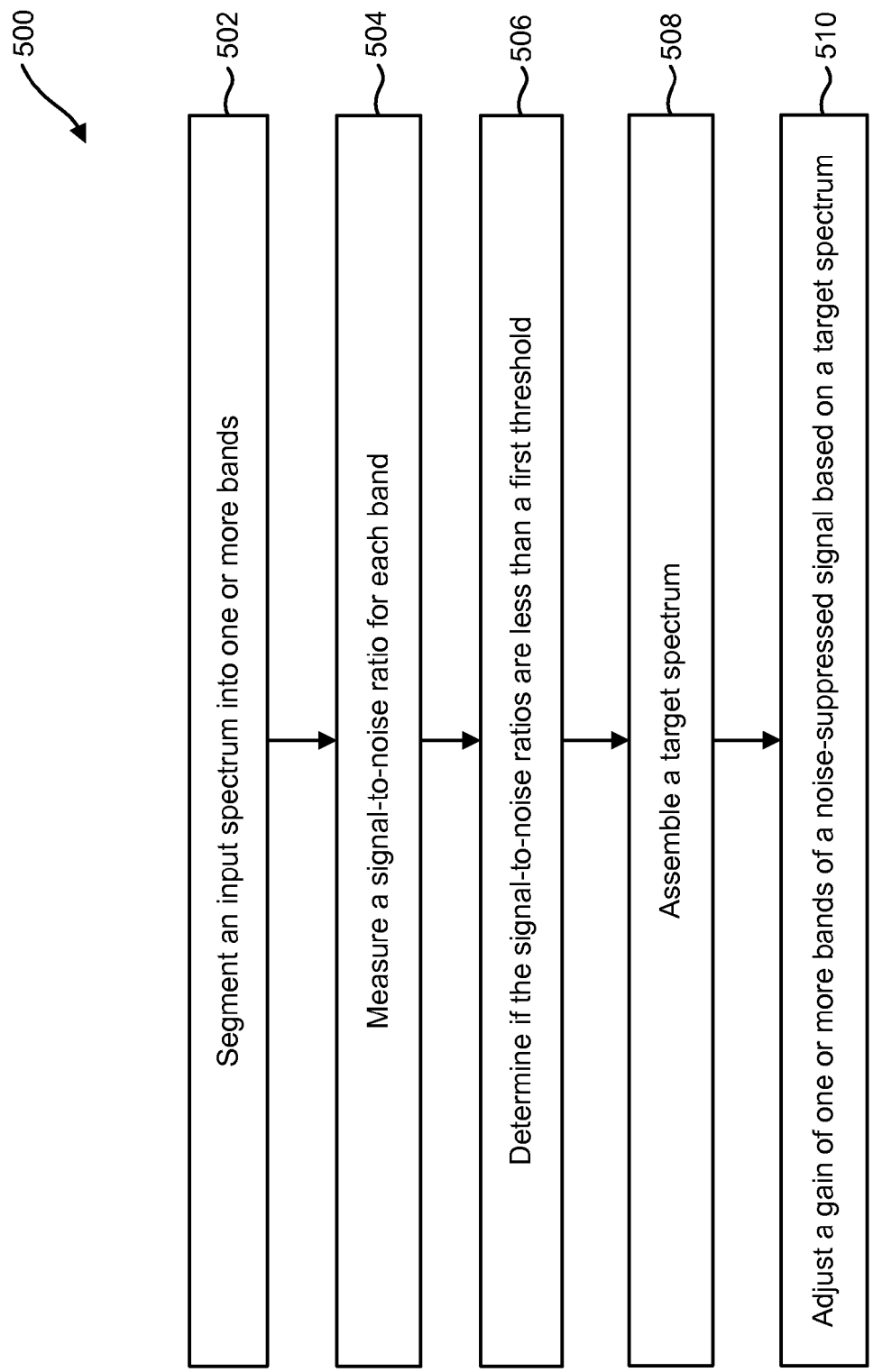
FIG. 5 is a flow diagram illustrating another configuration of a method for signal level matching.

FIG. 5 is a flow diagram illustrating another configuration of a method 500 for signal level matching. The method 500 may be performed by an electronic device 102. The electronic device 102 may segment 502 an input spectrum into multiple frequency bands. In some configurations, an input spectrum may include a plurality of audio signals 182. In this example, the electronic device 102 may segment 502 the input spectrum (e.g., the plurality of audio signals 182) into multiple frequency ranges. The electronic device 102 may measure 504 the signal-to-noise ratio at each frequency band. In this example, one or more signal-to-noise ratios may correspond to the input spectrum. The electronic device 102 may determine 506 if the signal-to-noise ratios are less than a first threshold.

The electronic device 102 may assemble 508 a target spectrum 488. For example, the electronic device 102 may assemble 508 multiple frequency bands in order to produce a target spectrum 488. In some implementations, if the electronic device 102 determines 506 that a signal-to-noise ratio of a frequency band was lower than the first threshold, assembling 508 a target spectrum 488 may include replacing a portion of a speech reference spectrum 486 with a portion of a speech template spectrum 484. The target spectrum 488 may include one or more of a portion of a speech reference spectrum 486 and a portion of a speech template spectrum 484. In some configurations, the electronic device 102 may replace portions of the speech reference spectrum 486 with the speech template spectrum 484. The portion of the speech reference spectrum 486 that is replaced may include one or more bands where the signal-to-noise ratio is less than the first threshold. For example, if the signal-to-noise ratio for one or more bands is less than the first threshold, the electronic device 102 may search a codebook (e.g., a speech template spectrum 484) for a nearest matching contour. The electronic device 102 may then replace a portion of the speech reference spectrum 486 with that portion of the speech template spectrum 484. In this way, the electronic device 102 may optionally utilize a speech template spectrum 484 for cases where the signal-to-noise ratio is too low to reliably determine an input voice (e.g., speech) contour. In some configurations, assembling 508 the target spectrum 488 may include harmonic synthesis generation.

If the electronic device 102 determines 506 that a signal-to-noise ratio of a frequency band was not lower than the first threshold, assembling 508 a target spectrum 488 may include assembling a portion of the speech reference spectrum 486. In some examples, the speech reference spectrum 486 may be based on the input spectrum. In some configurations, the portion of the speech reference spectrum 486 that is included may correspond to the frequency bands that exhibited signal-to-noise ratios greater than the first threshold. In some implementations, the method 500 may further include suppressing residual noise based on the plurality of audio signals.

The electronic device 102 may adjust 510 a gain of one or more bands in a noise-suppressed signal based on the target spectrum 488. For example, if the electronic device 102 determines 506 that the signal-to-noise ratios are not less than a first threshold or upon assembling 508 a target spectrum 488, the electronic device 102 may adjust 510 the gain of the noise-suppressed signal for each band in order to approximately match one or more output spectrum 448 levels with one or more input signal levels. For example, the electronic device 102 may scale a portion of the noise-suppressed signal such that it approximately matches the target spectrum 488. For example, the electronic device 102 may multiply one or more bands of the noise-suppressed signal such that it approximately matches the target spectrum 488. In some configurations, the electronic device 102 may adjust 510 the noise-suppressed signal such that the noise-suppressed signal approximately matches the level(s) of the plurality of audio signals 182.

Figure 6:
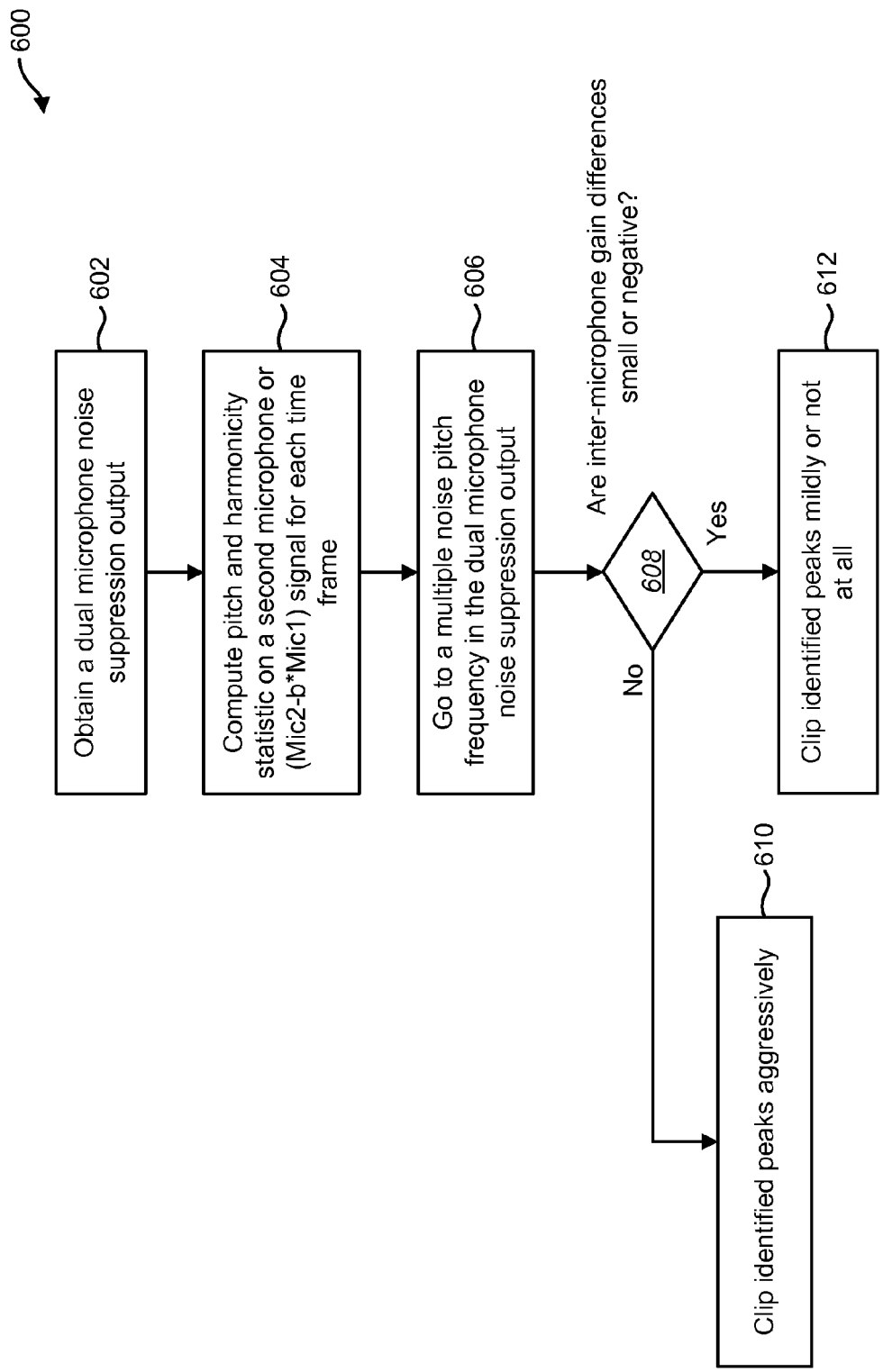
FIG. 6 is a flow diagram illustrating one configuration of a method for noise suppression.

FIG. 6 is a flow diagram illustrating one configuration of a method 600 for noise suppression. In some implementations, the electronic device 102 may include circuitry for performing one or more of the functions described herein. In some configurations, the electronic device 102 may obtain 602 a dual microphone 104 noise suppression output. The electronic device 102 may compute 604 the pitch and harmonicity statistic on the second microphone 104 audio signal 182 or a Mic2-b*Mic1 audio signal 182 for each time frame. The electronic device 102 may go 606 to multiples of a noise pitch frequency in the dual microphone 104 noise suppression output. In some configurations, the electronic device 102 may utilize multiples of the noise pitch frequency based on a primary microphone signal (e.g., one of the audio signals 182) to predict harmonic noise peaks and provide selective noise reduction at those noise peak locations only. In some implementations, the electronic device 102 may determine 608 if the inter-microphone gain is small or negative. If the electronic device 102 determines 608 that the inter-microphone gain is small or negative, the electronic device 102 may clip 612 the identified peaks mildly. In some configurations, if the electronic device 102 determines 608 that the inter-microphone gain difference is small or negative, the electronic device 102 may not clip the identified peaks at all. Additionally or alternatively, if the inter-microphone gain difference is small (or negative) on average, the electronic device 102 may label one or more frequency bins as speech spectrum bins. If the electronic device 102 determines 608 that the inter-microphone gain differences are not small or negative, the electronic device 102 may clip 610 the identified peaks aggressively.

Figure 7:
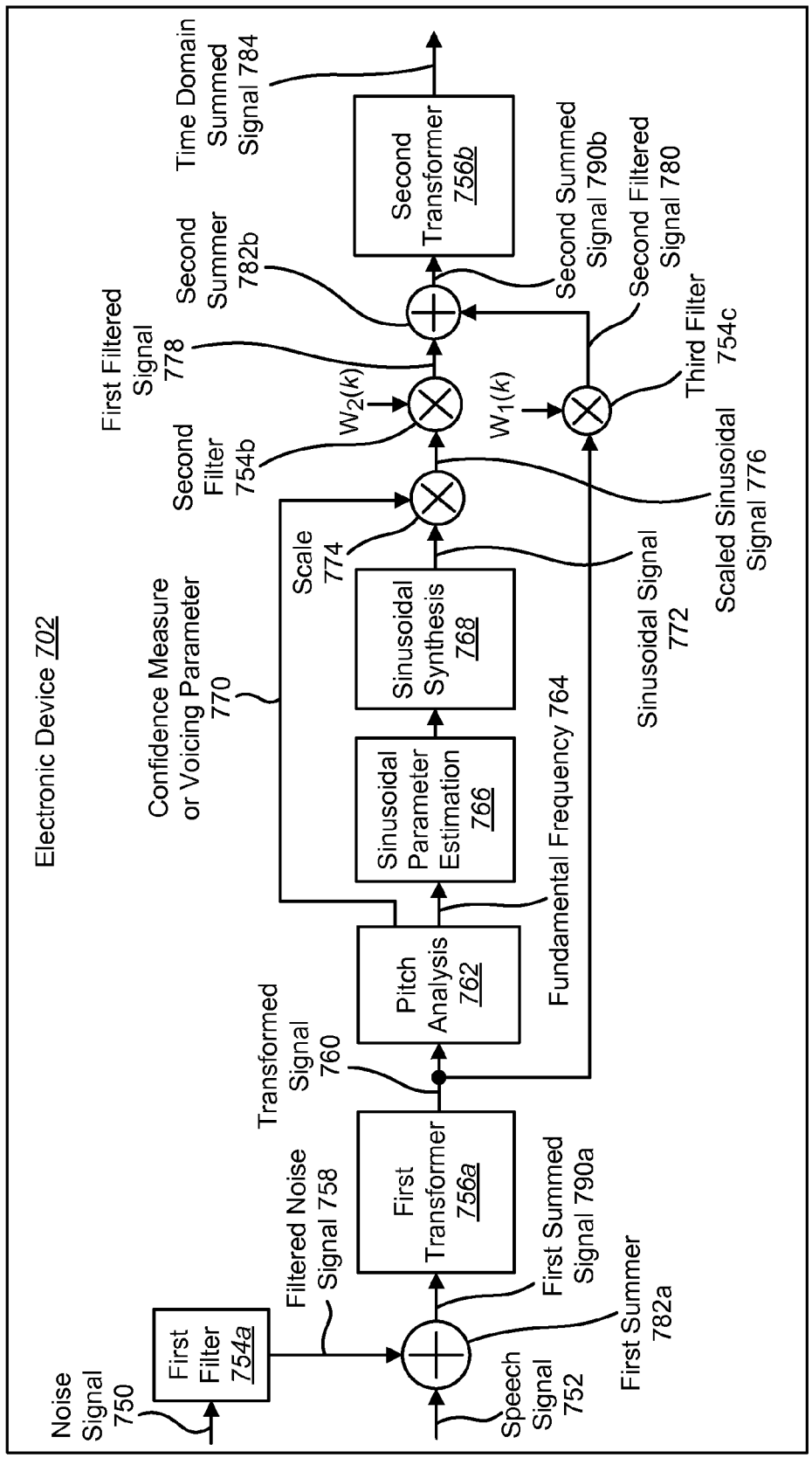
FIG. 7 is a block diagram illustrating another configuration of an electronic device in which systems and methods for signal level matching may be implemented.

FIG. 7 is a block diagram illustrating another configuration of an electronic device 702 in which systems and methods for signal level matching may be implemented. In some configurations, the electronic device 702 may be an example of the electronic device 102 described in connection with FIG. 1. The electronic device 702 may include one or more of a first filter 754*a*, a first summer 782*a*, a first transformer 756*a*, a pitch analysis block/module 762, a sinusoidal parameter estimation block/module 766, a sinusoidal synthesis block/module 768, a scale block/module 774, a second filter 754*b*, a third filter 754*c*, a second summer 782*b* and a second transformer 756*b*.

The electronic device 702 may receive one or more noise signals 750. Examples of noise signals 750 include, but are not limited to babble noise, environmental noise or any other competing speech. The noise signal 750 may be provided to (e.g., received by) a first filter 754*a* to produce a filtered noise signal 758. In some implementations, the first filter 754*a* may be a low-pass filter (for example, a 600 Hz low-pass filter). The first filter 754*a* may be coupled to the first summer 782*a*. The filtered noise signal 758 may be provided to the first summer 782*a*. The first summer 782*a* may sum or combine the filtered noise signal 758 with a speech signal 752 to produce a first summed signal 790*a*. In some configurations, the speech signal 752 may be a "clean" wideband (WB) speech signal 752. In some configurations, the noise signal 750 (e.g., the babble noise or competing speech signal) and the speech signal 752 (e.g., the "clean" WB speech signal) may be provided to an echo cancellation/noise suppression block/module 420. In this example, the speech signal 752 (e.g., the "clean" WB speech signal) may be a noise-suppressed signal.

The first transformer 756a may be coupled to the first summer 782a. In this example, the first summed signal 790a may be provided to the first transformer 756a. The first transformer 756a may transform the first summed signal 790a into a transformed signal 760. In some implementations, the transformed signal 760 may be similar to the first summed signal 790a in the frequency domain. The first transformer 756a may be a fast Fourier transform (FFT) block/module.

The first transformer 756a may be coupled to a third filter 754c. The third filter 754c may receive the transformed signal 760 and multiply it to produce a second filtered signal 780 that will be described in greater detail below.

The first transformer 756a may also be coupled to a pitch analysis block/module 762. In this example, the pitch analysis block/module 762 may receive the transformed signal 760. The pitch analysis block/module 762 may perform pitch analysis in order to extract a frequency (e.g., fundamental frequency 764) from the transformed signal 760. The pitch analysis block/module 762 may also provide a confidence measure or voicing parameter 770 to a scale block/module 774 that is coupled to the pitch analysis block/module 762.

The fundamental frequency 764 may be provided to a sinusoidal parameter estimation block/module 766 that is coupled to the pitch analysis block/module 762. As will be described in greater detail below, the sinusoidal parameter estimation block/module 766 may perform one or more operations to estimate one or more sinusoidal parameters.

The sinusoidal parameters may be provided to a sinusoidal synthesis block/module 768 that is coupled to the sinusoidal parameter estimation block/module 766 to produce a sinusoidal signal 772. In some implementations, the sinusoidal signal 772 may be transformed into the frequency domain, for example via a fast Fourier transform (FFT). The resulting frequency domain sinusoidal signal 772 may be provided to a scale block/module 774 that is coupled to the sinusoidal synthesis block/module 768. The scale block/module 774 may multiply the frequency domain sinusoidal signal 772 with the confidence measure or voicing parameter 770 to produce a scaled sinusoidal signal 776.

The second filter 754b that may be coupled to the scale block/module 774 may receive the scaled sinusoidal signal 776 to produce a first filtered signal 778. A second summer 782b that may be coupled to the second filter 754b and the third filter 754c may receive the first filtered signal 778 and the second filtered signal 780. The second summer 782b may sum the first filtered signal 778 and the second filtered signal 780 to produce a second summed signal 790b. A second transformer 756b that may be coupled to the second summer 782b may receive the second summed signal 790b. The second transformer 756b may transform the second summed signal 790b into the time domain to produce a time domain summed signal 784. For example, the second transformer 756b may be an inverse fast Fourier transform that transforms the second summed signal 790b into the time domain to produce a time domain summed signal 784.

Figure 8:
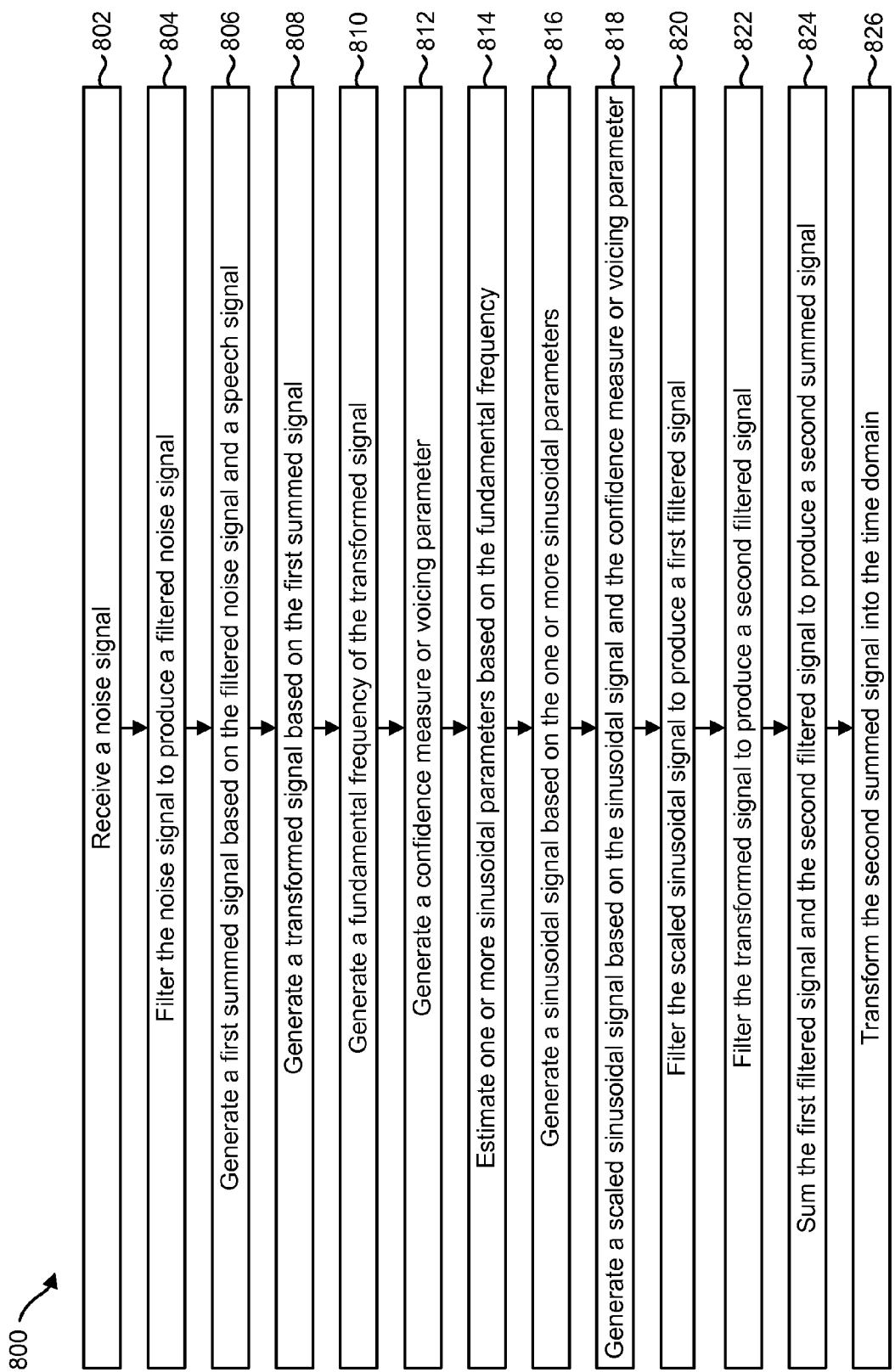
FIG. 8 is a flow diagram illustrating another configuration of a method for signal level matching.

FIG. 8 is a flow diagram illustrating another configuration of a method 800 for signal level matching. The method 800 may be performed by an electronic device 102. The electronic device 102 may receive 802 a noise signal 750. The noise signal 750 may include babble noise, environmental noise and any other signal that competes with a speech signal 752. In some configurations, the speech signal 752 may be denoted as x(n). The first filter 754a may filter 804 the noise signal 750 to produce a filtered noise signal 758. In some implementations, the first filter 754a may be a low-pass filter. A first summer 782a coupled to the first filter 754a may generate 806 a first summed signal 790a based on the filtered noise signal 758 and the speech signal 752. In some configurations, the first summed signal 790a may be denoted as $x_n(n)$. The first transformer 756a may generate 808 a transformed signal based on the filtered summed signal 790a. The transformed signal 760 may be denoted as $x_n(k)$. In some configurations, the transformed signal 760 may be based on the first summed signal 790a. For example, the transformed signal 760 may be similar to the first summed signal 790a in the frequency domain. The first transformer 756a may use a fast Fourier transform (FFT) to generate 808 the transformed signal 760.

A pitch analysis block/module 762 of the electronic device 102 may generate 810 a fundamental frequency 764 of the transformed signal 760. For example, the pitch analysis block/module 762 may receive the transformed signal 760 and perform pitch analysis to extract a fundamental frequency 764. The fundamental frequency 764 may be denoted as $\omega_o$. The pitch analysis block/module 762 may also generate 812 a confidence measure or voicing parameter 770. In some implementations, the confidence measure or voicing parameter 770 may be based on the transformed signal 760.

The sinusoidal parameter estimation block/module 766 may estimate 814 one or more sinusoidal parameters based on the fundamental frequency 764. For example, the sinusoidal parameter estimation block/module 766 may estimate 814 one or more sinusoidal parameters based on one or more of the following equations.

$$\hat{\omega}_i = l\omega_o,$$

$$\hat{A}_i = X_n(\hat{\omega}_i),$$

$$\hat{\phi}_i^{(m)} = \hat{\phi}_i^{(m-1)} + \int \hat{\omega}_i(\tau)d\tau \text{ and}$$

$$s(n) = \sum_{i=1}^{L} \hat{A}_i \cos(\hat{\omega}_i n + \hat{\phi}_i).$$

In the above described equations, $\omega_o$ may refer to the fundamental frequency 764 or pitch, $\hat{A}_i$ may refer to amplitudes of the speech peaks at multiples of a pitch frequency, $\hat{\phi}_i^{(m)}$ may refer to the phase components in each frequency bin i and frame m and s(n) may refer to the one or more sinusoidal parameters.

The sinusoidal synthesis block/module 768 may generate 816 a sinusoidal signal 772 based on the one or more sinusoidal parameters. For example, the sinusoidal synthesis block/module 768 may perform a fast Fourier Transform of one or more sinusoidal parameters to generate a sinusoidal signal 772. In some implementations, the sinusoidal signal 772 may be denoted as S(k). In these implementations, the relationship between the sinusoidal parameters s(n) and the sinusoidal signal S(k) 772 may be illustrated as S(k)=FFT{s(n)}.

A scale block/module 774 of the electronic device 102 may generate 818 a scaled sinusoidal signal 776 based on the sinusoidal signal 772 and the confidence measure or voicing parameter 770. For example, the scale block/module 774 may multiply the frequency domain sinusoidal signal 772 with the confidence measure or voicing parameter 770 to generate 818 a scaled sinusoidal signal 776.

The second filter 754b may filter 820 the scaled sinusoidal signal 776 to produce a first filtered signal 778. For example, the scaled sinusoidal signal 776 may be multiplied by $W_2(k)$ (e.g., a low-pass filter transfer function) or filtered to produce a first filtered signal 778. Similarly, the third filter 754c may filter 822 the transformed signal 760 to produce a second filtered signal 780. For example, the transformed signal 760 may be multiplied by $W_1(k)$ (e.g., a high-pass filter transfer function) or filtered to produce a second filtered signal 780.

The second summer 782b may sum 824 the first filtered signal 778 and the second filtered signal 780 to produce a second summed signal 790b. For example, the second summer 782b may receive the first filtered signal 778 and the second filtered signal 780 and combine them to produce a second summed signal 790b.

The second transformer 756b may transform 826 the second summed signal 790b into the time domain. For example, the second transformer 756b may use an inverse fast Fourier Transform to transform 826 the second summed signal 790b into the time domain to produce a time domain summed signal 784.

Figure 9:
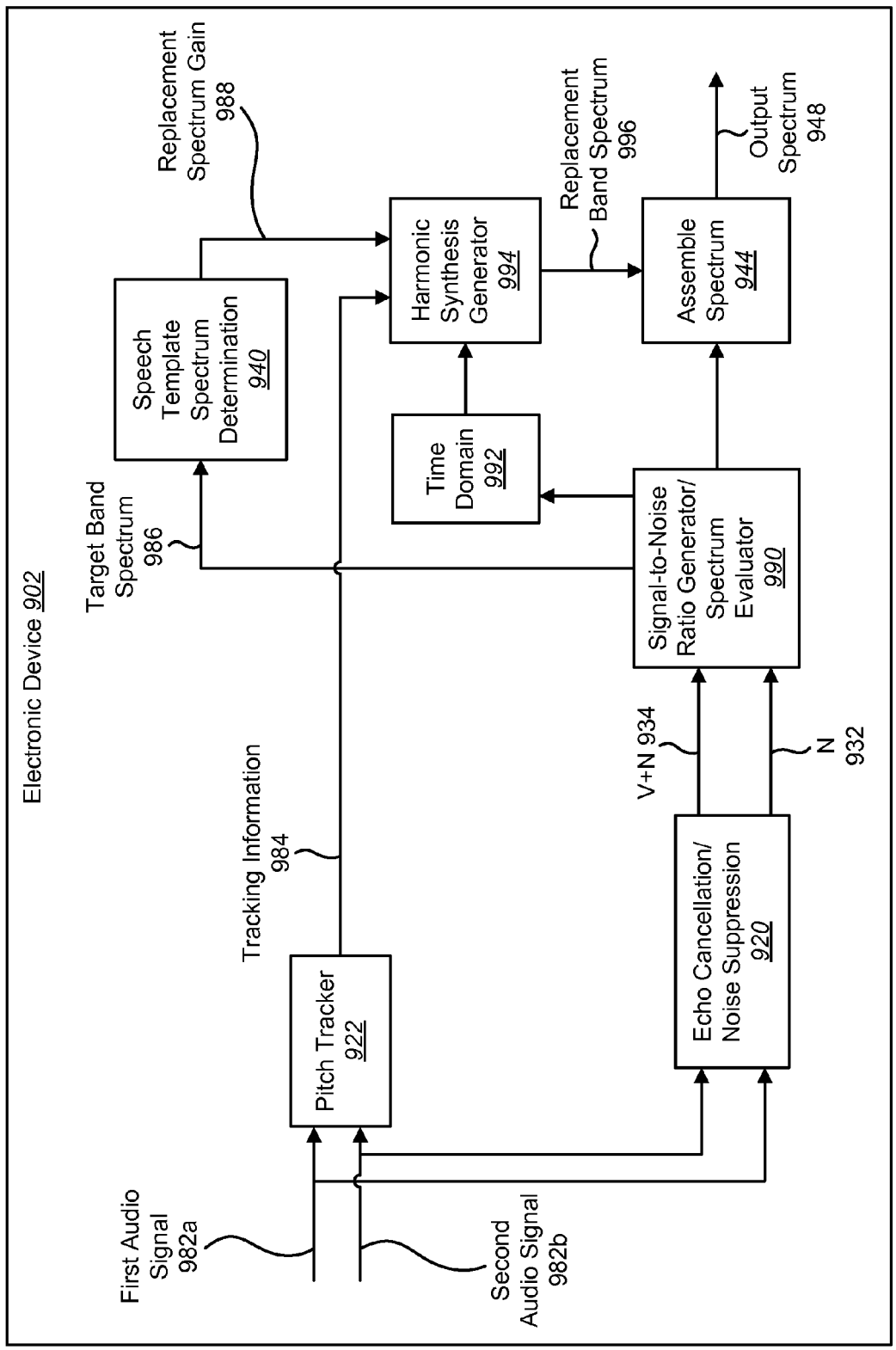
FIG. 9 is a block diagram illustrating another configuration of an electronic device in which systems and methods for signal level matching may be implemented.

FIG. 9 is a block diagram illustrating another configuration of an electronic device 902 in which systems and methods for signal level matching may be implemented. The electronic device 902 may be an example of the electronic device 102 described in connection with FIG. 1. The electronic device 902 may include a pitch tracker 922, an echo cancellation/noise suppression block/module 920, a speech template spectrum determination block/module 940 and an assemble spectrum block/module 944 similar to corresponding elements described earlier. The electronic device 902 may also include one or more of a signal-to-noise generator/spectrum evaluator 990, a time domain block/module 992 and a harmonic synthesis generator 994.

In some examples, the plurality of microphones 104 (not shown) may be coupled to the pitch tracker 922 and/or to an echo cancellation/noise suppression block/module 920. The input audio signals 982a-b from the plurality of microphones 104 may be provided to the pitch tracker 922. The pitch tracker 922 may track the pitch of the audio signals 982a-b (e.g., the fundamental frequency and/or harmonics of a voice signal). The pitch tracker 922 may provide tracking information 984 (e.g., a frequency, $\hat{\omega}$) to a harmonic synthesis generator 994.

The echo cancellation/noise suppression block/module 920 may perform echo cancellation and/or noise suppression on the input audio signals 982a-b received from the one or more microphones 104. In some implementations, the echo cancellation/noise suppression block/module 920 may implement one or more of the functions performed by the noise suppression block/module 114 described in connection with FIG. 1. The echo cancellation/noise suppression block/module 920 may provide a voice and noise signal 934 (V+N) as well as a noise signal 932 (N) to a signal-to-noise ratio generator/spectrum evaluator 990.

The signal-to-noise generator/spectrum evaluator 990 may determine a target band spectrum 986. In some implementations, the target band spectrum 986 may be an example of the target spectrum 488 described in connection with FIG. 4. The electronic device 902 may optionally determine replacement spectrum gain 988 (e.g. $\hat{A}_i$). In some implementations, the replacement spectrum gain 988 may be based on one or more of the speech reference spectrum 486 and the speech template spectrum 484 as described in connection with FIG. 4. In some implementations, the replacement spectrum gain 988 may be obtained from a speech template spectrum determination block/module 940 (e.g., codebook) based on the target band spectrum 986. The replacement spectrum gain 988 may be provided to the harmonic synthesis generator 994.

The signal-to-noise ratio generator/spectrum evaluator 990 may also provide a frequency domain signal to a time domain block/module 992. The time domain block/module 992 may convert the frequency domain signal into the time domain. The time domain block/module 992 may also provide the time domain signal to the harmonic synthesis generator 994. The harmonic synthesis generator 994 may generate a replacement band spectrum 996 based on the replacement spectrum gain 988, the tracking information 984 and a time-domain signal. The replacement band spectrum 996 may be provided to an assemble spectrum block/module 944. The assemble spectrum block/module 944 may assemble a spectrum and produce an output spectrum 948 based on an output from the signal-to-noise generator/spectrum evaluator 990 and/or the replacement band spectrum 996.

Figure 10:
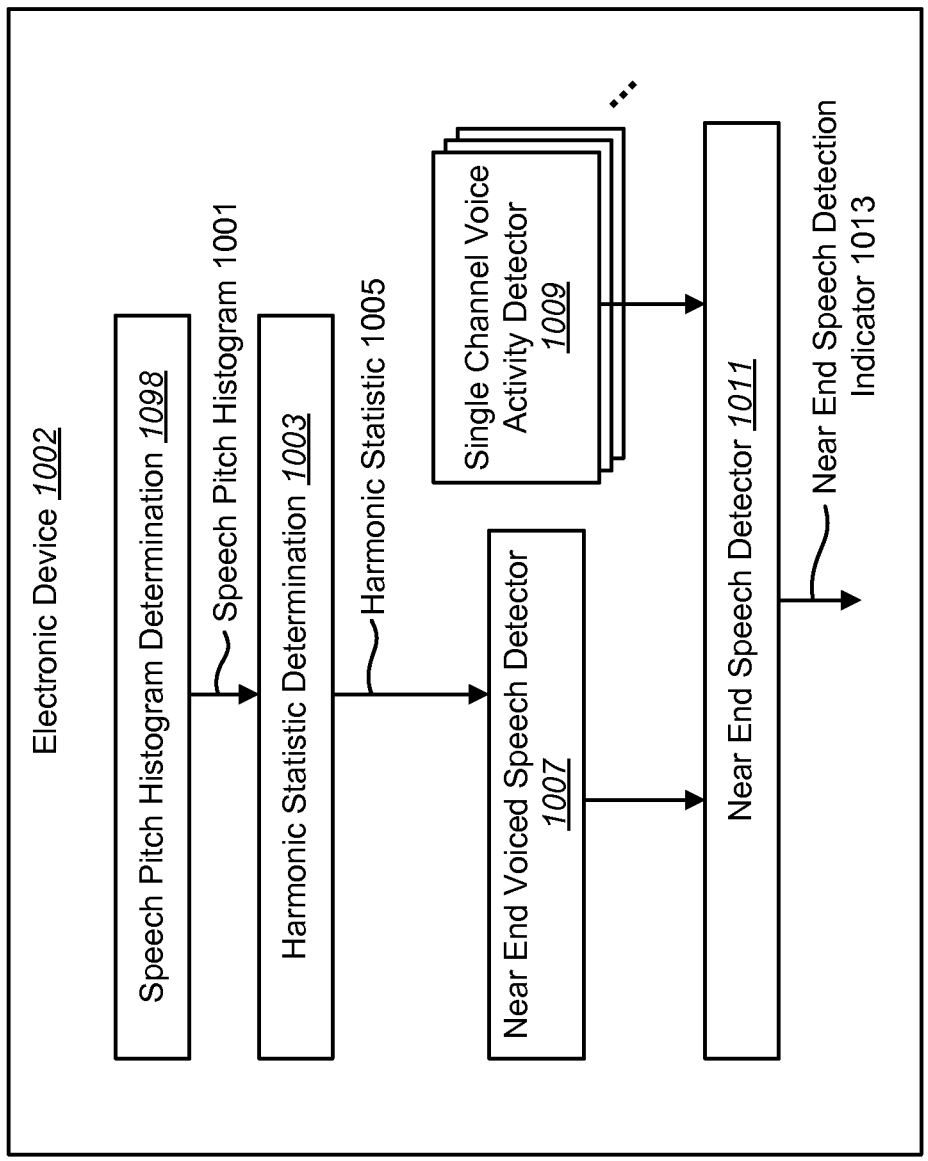
FIG. 10 is a block diagram illustrating one configuration of an electronic device in which systems and methods for detecting voice activity may be implemented.

FIG. 10 is a block diagram illustrating one configuration of an electronic device 1002 in which systems and methods for detecting voice activity may be implemented. In some configurations, the electronic device 1002 may be an example of the electronic device 102 described in connection with FIG. 1. The electronic device 1002 may include one or more of a speech pitch histogram determination block/module 1098, a harmonic statistic determination block/module 1003, a near end voiced speech detector 1007, at least one single channel voice activity detector 1009 and a near end speech detector 1011.

In some configurations, the speech pitch histogram determination block/module 1098 may determine a speech pitch histogram 1001 that may be used to detect voiced speech audio signals 182. For example, the speech pitch histogram determination block/module 1098 may determine the speech pitch histogram 1001 that corresponds to a voiced speech audio signal 182. In some configurations, a voiced speech audio signal 182 may be detected based on pitch. In this configuration, the speech pitch histogram 1001 may distinguish an audio signal 182 that corresponds to voiced speech from other types of audio signals 182. For example, a voiced speech audio signal 182 may correspond to a distinct pitch range. Other types of audio signals 182 may correspond to other pitch ranges. In some implementations, the speech pitch histogram 1001 may identify the pitch range that corresponds to voiced speech audio signals 182.

The harmonic statistic determination block/module 1003 may be coupled to the speech pitch histogram determination block/module 1098. A voiced speech audio signal 182 may also be detected based on harmonics. As described above, harmonics are multiples of the fundamental frequency of an audio signal 182 (e.g., the resonant frequency of a voice). As used herein, the term "harmonicity" may refer to the nature of the harmonics. For example, the harmonicity may refer to the number and quality of the harmonics of an audio signal 182. For example, an audio signal 182 with good harmonicity may have many well-defined multiples of the fundamental frequency.

In some configurations, the harmonic statistic determination block/module 1003 may determine a harmonic statistic 1005. A statistic, as used herein, may refer to a metric that identifies voiced speech. For example, voiced speech may be detected based on audio signal 182 energy level. In this example, the audio signal 182 energy level may be a statistic. Other examples of statistics may include the number of zero crossings per frame (e.g., the number of times the sign of the value of the input audio signal 182 changes from one sample to the next), pitch estimation and detection algorithm results, formant determination results, cepstral coefficient determination results, metrics based on signal-to-noise ratios, metrics based on a likelihood ratio, speech onset and/or offset, dual-microphone signal difference (e.g., magnitude difference, gain difference, level difference, proximity difference and/or phase difference). In some configurations, a statistic may include any suitable combination of two or more metrics. In these examples, a voiced speech audio signal 182 may be detected by applying a threshold value to the statistic value (also called a score). Such a score may be compared to a threshold value to determine voice activity. For example, a voiced speech audio signal 182 may be indicated by an energy level that is above a threshold, or a number of zero crossings that is above a threshold.

Thus, a harmonic statistic 1005 may refer to a metric that identifies voiced speech based on the harmonicity of an audio signal 182. For example, a harmonic statistic 1005 may identify an audio signal 182 as voiced speech if the audio signal 182 has good harmonicity (e.g., many well-defined multiples of the fundamental frequency). In this example, a voiced speech audio signal 182 may be detected by applying a threshold value to the harmonic statistic 1005 value (e.g., the score). Such a score may be compared to a threshold value to determine voice activity. For example, voice activity may be indicated by a harmonic statistic 1005 that is above a threshold.

In some implementations, the harmonic statistic 1005 may be based on the speech pitch histogram 1001. For example, the harmonic statistic determination block/module 1003 may receive the speech pitch histogram 1001 from the speech pitch histogram determination block/module 1098. The harmonic statistic determination block/module 1003 may then determine a harmonic statistic 1005. In some configurations, a harmonic statistic 1005 based on the speech pitch histogram 1001 may identify an audio signal 182 having good harmonicity and that falls within the pitch range defined by the speech pitch histogram 1001. An example of a harmonic statistic 1005 that may be based on the speech pitch histogram 1001 is given as follows. As described above, a voiced speech audio signal 182 may include one or more harmonics. Similarly, some non-voiced audio signals 182 may also include one or more harmonics, for example, music. However, the non-voiced audio signals 182 may correspond to a different pitch range. In this example, a harmonic statistic 1005 based on the speech pitch histogram 1001 may distinguish the voiced speech audio signal 182 (e.g., an audio signal 182 with good harmonicity and falling within the pitch range) from a non-voiced audio signal 182 (e.g., an audio signal 182 having good harmonicity and falling outside the pitch range).

The near end voiced speech detector 1007 may detect near end voiced speech. For example, a user talking on an electronic device 102 (e.g., a wireless communication device) with a plurality of microphones 104 may generate near end voiced speech. The near end voiced speech detector 1007 may be coupled to the harmonic statistic determination block/module 1003. In this example, the near end voiced speech detector 1007 may receive the harmonic statistic 1005 from the harmonic statistic determination block/module 1003. Based on the harmonic statistic 1005, the near end voiced speech detector 1007 may detect near end voiced speech. For example, the near end voiced speech detector 1007 may detect near end voiced speech when an audio signal 182 satisfies the harmonic statistic 1005 (e.g., the harmonicity of the audio signal 182 is greater than a threshold as defined by the harmonic statistic 1005). As described above, in some configurations, the harmonic statistic 1005 may be based on the speech pitch histogram 1001.

The near end voiced speech detector 1007 may also detect near end voiced speech based on the speech pitch histogram 1001. For example, the near end voiced speech detector 1007 may detect near end voiced speech when an audio signal 182 falls within a pitch range defined by the speech pitch histogram 1001.

In some configurations, the near end voiced speech detector 1007 may detect near end voiced speech based on a combination of the harmonic statistic 1005 and the speech pitch histogram 1001. For example, the near end voiced speech detector 1007 may detect near end voiced speech if the pitch of the audio signal 182 falls within the pitch range defined by the speech pitch histogram 1001 and when the audio signal 182 satisfies the harmonic statistic 1005 (e.g., the harmonicity of the audio signal 182 is greater than a threshold as defined by the harmonic statistic 1005). In some implementations, the near end voiced speech detector 1007 may detect near end speech based on different weightings of the harmonic statistic 1005 and the speech pitch histogram 1001. For example, the near end voiced speech detector 1007 may detect near end voiced speech when the harmonicity is high, notwithstanding a pitch that may not fall entirely within the pitch range as defined by the speech pitch histogram 1001. Similarly, the near end voiced speech detector 1007 may detect near end voiced speech when the pitch range falls entirely within the pitch range as defined by the speech pitch histogram 1001, notwithstanding a lower harmonicity.

Additionally or alternatively, the near end voiced speech detector 1007 may be associated with a gain statistic. In this example, the gain statistic may identify voiced speech based on a gain difference between the plurality of audio signals 182. In some implementations, the near end voiced speech detector 1007 may detect near end speech based on different weightings of the harmonic statistic 1005, the gain statistic and the speech pitch histogram 1001. For example, the near end voiced speech detector 1007 may detect near end voiced speech when the harmonicity is high, notwithstanding a gain difference that may be small. Similarly, the near end voiced speech detector 1007 may detect near end voiced speech when the gain difference is large, notwithstanding a lower harmonicity.

The at least one single channel voice activity detector 1009 may detect a speech audio signal 182. In some configurations, the at least one single channel voice activity detector 1009 may detect a speech audio signal 182 based on energy levels. For example, the at least one single channel voice activity detector 1009 may detect certain degrees of energy level increase to detect speech. In some configurations, the single channel voice activity detector 1009 may include one or more statistics as described above to detect a speech audio signal 182. In some configurations, the near end voiced speech detector 1007 and the at least one single channel voice activity detector 1009 may be integrated. For example, the near end voiced speech detector 1007 and the at least one single channel voice activity detector 1009 may be combined into a single block/module (not shown).

The near end speech detector 1011 may be coupled to the near end voiced speech detector 1007 and/or the at least one single channel voice activity detector 1009 to detect near end speech. For example, the near end speech detector 1011 may receive the results from the near end voiced speech detector 1007 (e.g., whether the near end voiced speech detector 1007 detected near end voiced speech) and the results from the single channel voice activity detector 1009 (e.g., whether the single channel voice activity detector 1009 detected a speech audio signal 182). The near end speech detector 1011 may then detect near end speech. The near end speech detector 1011 may then provide a near end speech detection indicator 1013 that identifies whether near end speech was detected. As will be described in greater detail below, the near end speech detection indicator 1013 may initiate one or more functions of the electronic device 102 (e.g., switching from a dual microphone 104 system to a single microphone 104 system).

Figure 11:
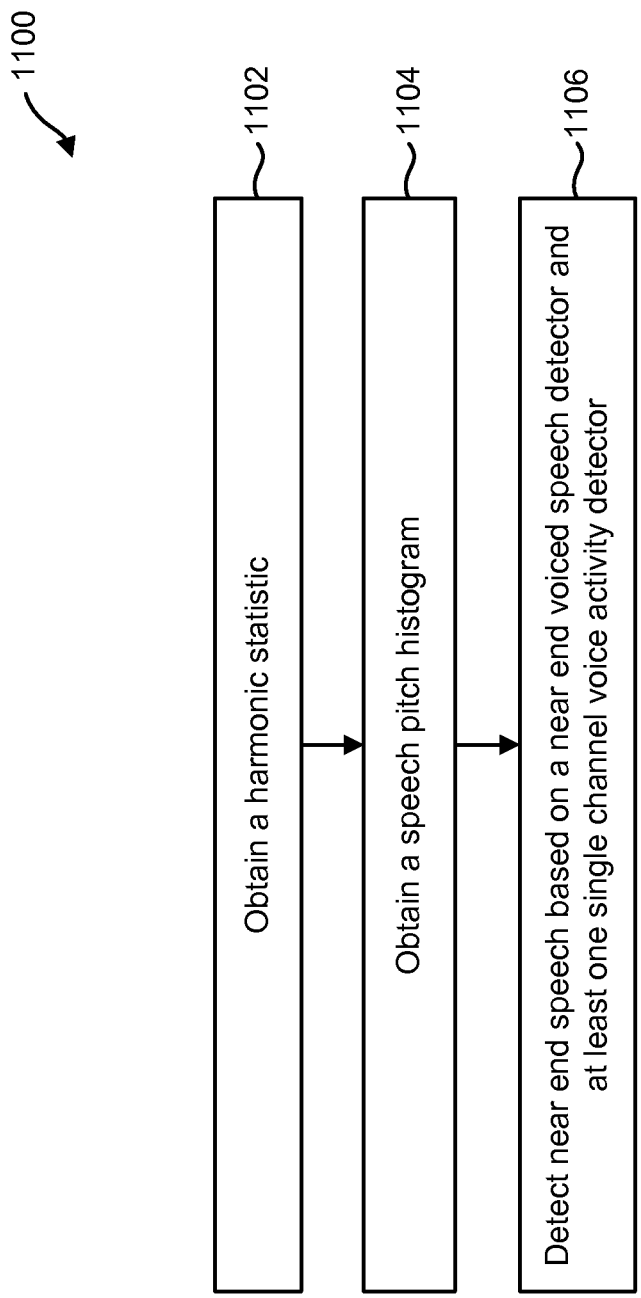
FIG. 11 is a flow diagram illustrating one configuration of a method for detecting voice activity.

FIG. 11 is a flow diagram illustrating one configuration of a method 1100 for detecting voice activity. The method 1100 may be performed by an electronic device 102. The electronic device 102 may obtain 1102 a harmonic statistic 1005. As described above, a harmonic statistic 1005 may refer to a metric that identifies voiced speech based on the harmonics of an audio signal 182. For example, a harmonic statistic 1005 may identify voiced speech if an audio signal 182 has many well-defined multiples of the fundamental frequency. In some implementations, the electronic device 102 may obtain 1102 a harmonic statistic 1005 that is based on the speech pitch histogram 1001. For example, the harmonic statistic 1005 may identify an audio signal 182 that falls within a pitch range as identified by the speech pitch histogram 1001 and that satisfies the harmonic statistic 1005.

The electronic device 102 may obtain 1104 a speech pitch histogram 1001. As described above, the speech pitch histogram 1001 may identify a pitch range that corresponds to voiced speech. For example, the speech pitch histogram 1001 may identify a certain pitch range that corresponds to the pitches associated with voiced speech.

The near end speech detector 1011 of the electronic device 102 may detect 1106 near end speech based on a near end voiced speech detector 1007 and at least one single channel voice activity detector 1009. In some implementations, the near end voiced speech detector 1007 may detect near end voiced speech based on one or more of the harmonic statistic 1005 and the speech pitch histogram 1001. For example, the near end voiced speech detector 1007 may be associated with a harmonic statistic 1005 based on a speech pitch histogram 1001 as described above. Additionally or alternatively, the near end voiced speech detector 1007 may detect near end voiced speech based on a gain statistic.

The near end voiced speech detector 1007 may detect near end speech based on different weightings of the harmonic statistic 1005, the speech pitch histogram 1001 and a gain statistic. For example, the near end voiced speech detector 1007 may detect near end voiced speech when the harmonicity is high, notwithstanding a pitch that may not fall entirely within the pitch range as defined by the speech pitch histogram 1001. Similarly, the near end voiced speech detector 1007 may detect near end voiced speech when the pitch range falls entirely within the pitch range as defined by the speech pitch histogram 1001, notwithstanding a lower harmonicity. In another example, the near end voiced speech detector 1007 may detect near end voiced speech when the harmonicity is high, notwithstanding a gain difference that may be small. Similarly, the near end voiced speech detector 1007 may detect near end voiced speech when the gain difference is large, notwithstanding a lower harmonicity.

The at least one single channel voice activity detector 1009 of the electronic device 102 may detect a speech audio signal 182. The near end speech detector 1011 may use the information from the near end voiced speech detector 1007 and the at least one single channel voice activity detector 1009 to detect 1106 near end speech.

In some configurations, the near end voiced speech detector 1007 may detect near end voiced speech based on a combination of the harmonic statistic 1005 and the speech pitch histogram 1001. For example, the near end voiced speech detector 1007 may detect near end voiced speech if the pitch of the audio signal 182 falls within the pitch range defined by the speech pitch histogram 1001 and the audio signal 182 satisfies the harmonic statistic 1005 (e.g., the harmonicity of the audio signal 182 is greater than a threshold as defined by the harmonic statistic 1005). In some implementations, the near end voiced speech detector 1007 may detect near end speech based on different weightings of the harmonic statistic 1005 and the speech pitch histogram 1001. For example, the near end voiced speech detector 1007 may detect near end voiced speech when the harmonicity is high, notwithstanding a pitch that may not fall entirely within the pitch range as defined by the speech pitch histogram 1001. Similarly, the near end voiced speech detector 1007 may detect near end voiced speech when the pitch range falls entirely within the pitch range as defined by the speech pitch histogram 1001, notwithstanding a lower harmonicity.

Figure 12:
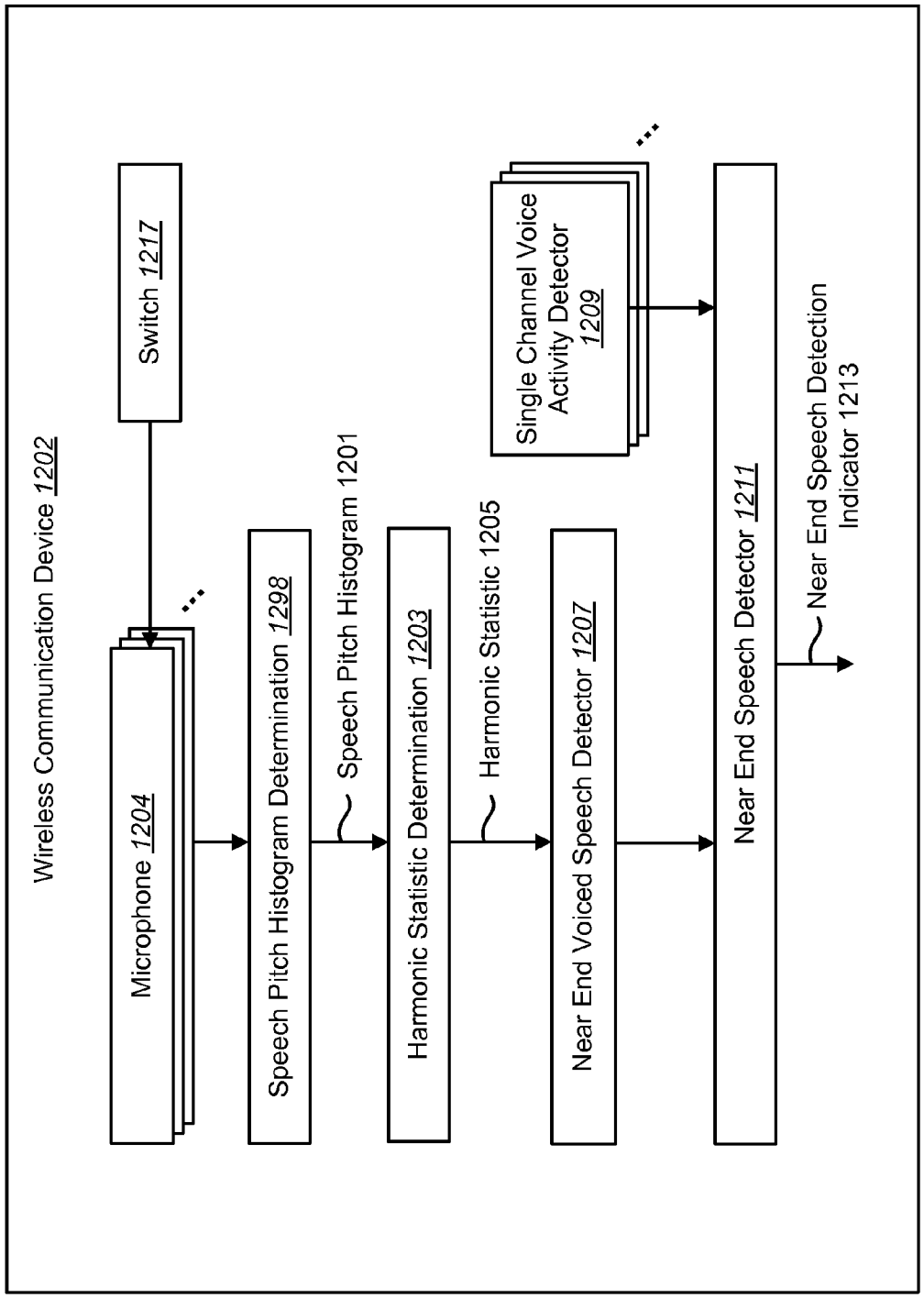
FIG. 12 is a block diagram illustrating one configuration of a wireless communication device in which systems and methods for detecting voice activity may be implemented.

FIG. 12 is a block diagram illustrating one configuration of a wireless communication device 1202 in which systems and methods for detecting voice activity may be implemented. The wireless communication device 1202 may be an example of the electronic device 102 described in connection with FIG. 1. The wireless communication device 1202 may include one or more of a speech pitch histogram determination block/module 1298, a harmonic statistic determination block/module 1203, a near end voiced speech detector 1207, at least one single channel voice activity detector 1209 and a near end speech detector 1211 that may be examples of corresponding elements described earlier. In some configurations, the speech pitch histogram determination block/module 1298 may provide a speech pitch histogram 1201 that may be an example of the speech pitch histogram 1001 described in connection with FIG. 10. The harmonic statistic determination block/module 1203 may provide a harmonic statistic 1205 that may be an example of the harmonic statistic 1005 described in connection with FIG. 10. The near end speech detector 1211 may provide a near end speech detection indicator 1213 that may be an example of the near end speech detection indicator 1013 described in connection with FIG. 10.

In some configurations, the wireless communication device 1202 may include a plurality of microphones 1204 similar to the plurality of microphones 104 described in connection with FIG. 1. For example, the plurality of microphones 1204 may capture a plurality of audio signals 182.

The wireless communication device 1202 may also include a switch 1217 that may be coupled to the plurality of microphones 1204. The switch 1217 may switch to a single microphone 1204. For example, the switch 1217 may switch from a dual microphone 1204 system to a single microphone 1204 system. In some configurations, the switch 1217 may switch to a single microphone 1204 based on one or more criteria. For example, the switch 1217 may switch to a single microphone 1204 when a signal-to-noise ratio exceeds a threshold. For example, in some cases, a dual microphone 1204 system may not generate a reliable audio signal 182 (e.g., when a signal-to-noise ratio is in the 0-5 decibel (dB) range). In this case, the switch 1217 may switch from a dual microphone 1204 system to a single microphone 1204 system. The switch 1217 may also switch to a single microphone 1204 when an envelope 112 is not maintained. The switch 1217 may switch to a single microphone 1204 when near end speech is attenuated. For example, the near end speech detector 1211 may detect attenuated near end speech. Based on this information, the switch 1217 may switch to a single microphone 1204. In some configurations, the switch 1217 may switch to a single microphone 1204 based on attenuated near end speech, when the near end speech is attenuated during a certain time interval, for example 1.5 seconds.

Figure 13:
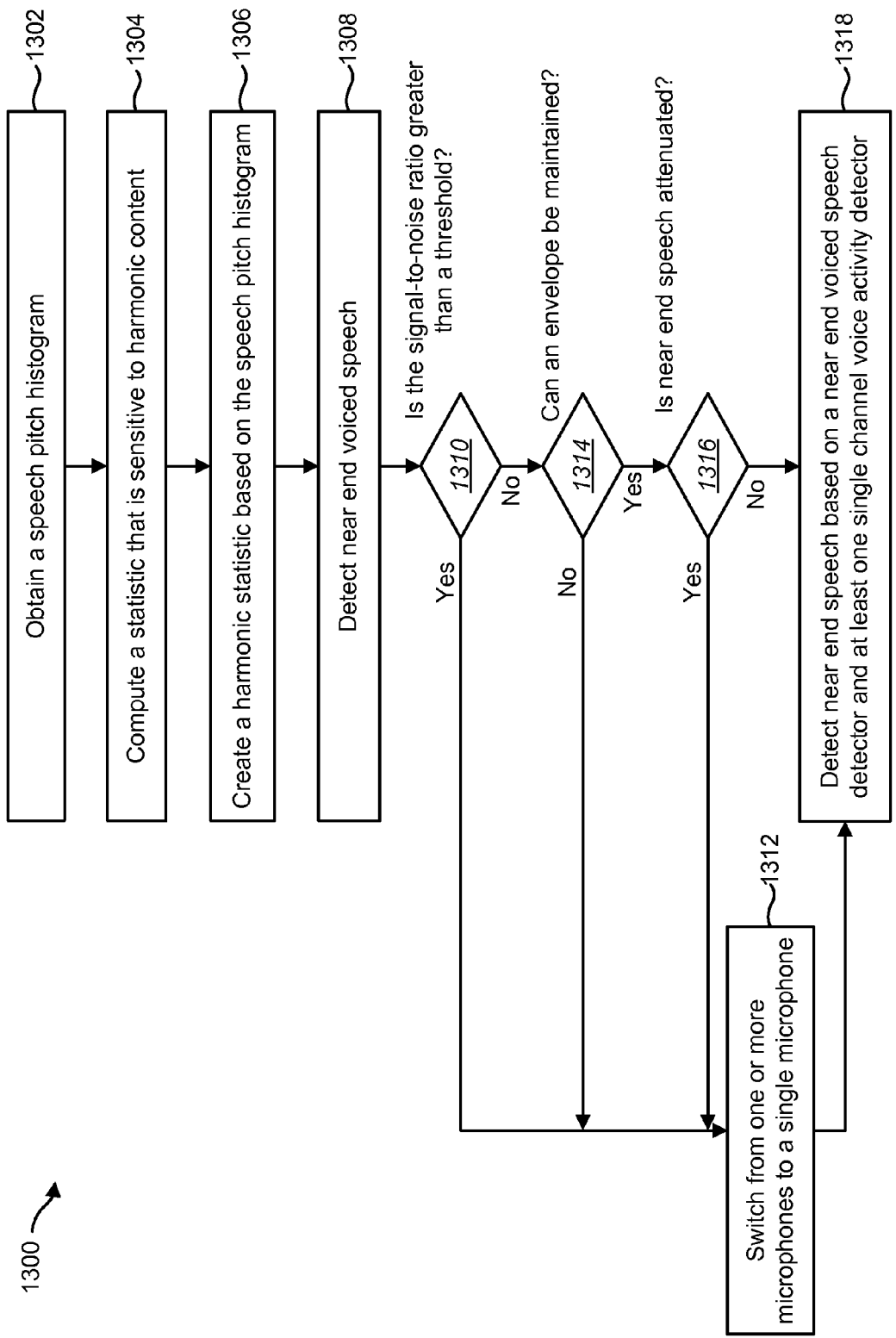
FIG. 13 is a flow diagram illustrating another configuration of a method for detecting voice activity.

FIG. 13 is a flow diagram illustrating another configuration of a method 1300 for detecting voice activity. The method 1300 may be performed by the electronic device 102. The electronic device 102 may obtain 1302 a speech pitch histogram 1001. In some implementations, this may be done as described in connection with FIG. 11.

The electronic device 102 may compute 1304 a statistic that is sensitive to harmonic content. In some configurations, the harmonic statistic determination block module 1003 may compute 1304 the statistic that is sensitive to harmonic content. As described above, a statistic may refer to a metric that identifies voiced speech. In this example, the electronic device 102 may compute 1304 a statistic that identifies voiced speech based on the harmonics of an audio signal 182. For example, a harmonic statistic 1005 may identify an audio signal 182 as voiced speech if the audio signal 182 has good harmonicity (e.g., many well-defined multiples of the fundamental frequency). In some implementations, computing 1304 a statistic that is sensitive to harmonic content may include evaluating pitch on an enhanced signal (e.g., a first microphone minus a scaled second microphone). Evaluating the pitch may include one or more of auto correlation, cepstrum coding, harmonic product spectrum coding and linear predictive coding. In some implementations, the enhanced signal may be an example of the difference signal 108 described in connection with FIG. 1. The harmonic statistic determination block/module 1003 may create 1306 a harmonic statistic 1005 based on the speech pitch histogram 1001. As described earlier, a harmonic statistic 1005 may be based on the speech pitch histogram 1001. In some configurations, a harmonic statistic 1005 based on the speech pitch histogram 1001 may identify an audio signal 182 having good harmonicity and that falls within the pitch range defined by the speech pitch histogram 1001. In other words, the harmonic statistic 1005 may identify voice speech (e.g., based on its harmonicity) falling within a pitch range as defined by the speech pitch histogram 1001. The electronic device 102 may detect 1308 near end voiced speech.

The electronic device 102 may determine 1310 if the signal-to-noise ratio is greater than a threshold. In some implementations, the threshold may be obtained by another electronic device 102. The threshold may reflect a signal-to-noise ratio above which a reliable speech audio signal 182 may not be obtained. If the signal-to-noise ratio is greater than the threshold, the switch 1217 may switch 1312 from one or more microphones 104 to a single microphone 104. For example, the switch 1217 may switch from a dual microphone 104 system to a single microphone 104 system. As will be described in greater detail, the near end speech detector 1011 may then detect 1318 near end speech based on the near end voiced speech detector 1007 and at least one single channel voice activity detector 1009.

If the electronic device 102 determines 1310 that the signal-to-noise ratio is not greater than a threshold, the electronic device 102 may determine 1314 whether an envelope 112 can be maintained. If the electronic device 102 determines 1314 that an envelope 112 cannot be (e.g., is not) maintained, the switch 1217 may switch 1312 from one or more microphones 104 to a single microphone 104.

If the electronic device 102 determines 1314 that an envelope 112 can be maintained, the electronic device 102 may determine 1316 if near end speech is attenuated. If the electronic device 102 determines 1314 that near end speech is attenuated (e.g., detects attenuated near end speech), the switch 1217 may switch 1312 from one or more microphones 104 to a single microphone 104.

If the electronic device 102 determines 1316 that near end speech is not attenuated, the electronic device 102 may detect 1318 near end speech based on a near end voiced speech detector 1007 and at least one single channel voice activity detector 1009. In some implementations, this may be done as described in connection with FIG. 11.

Figure 13A:
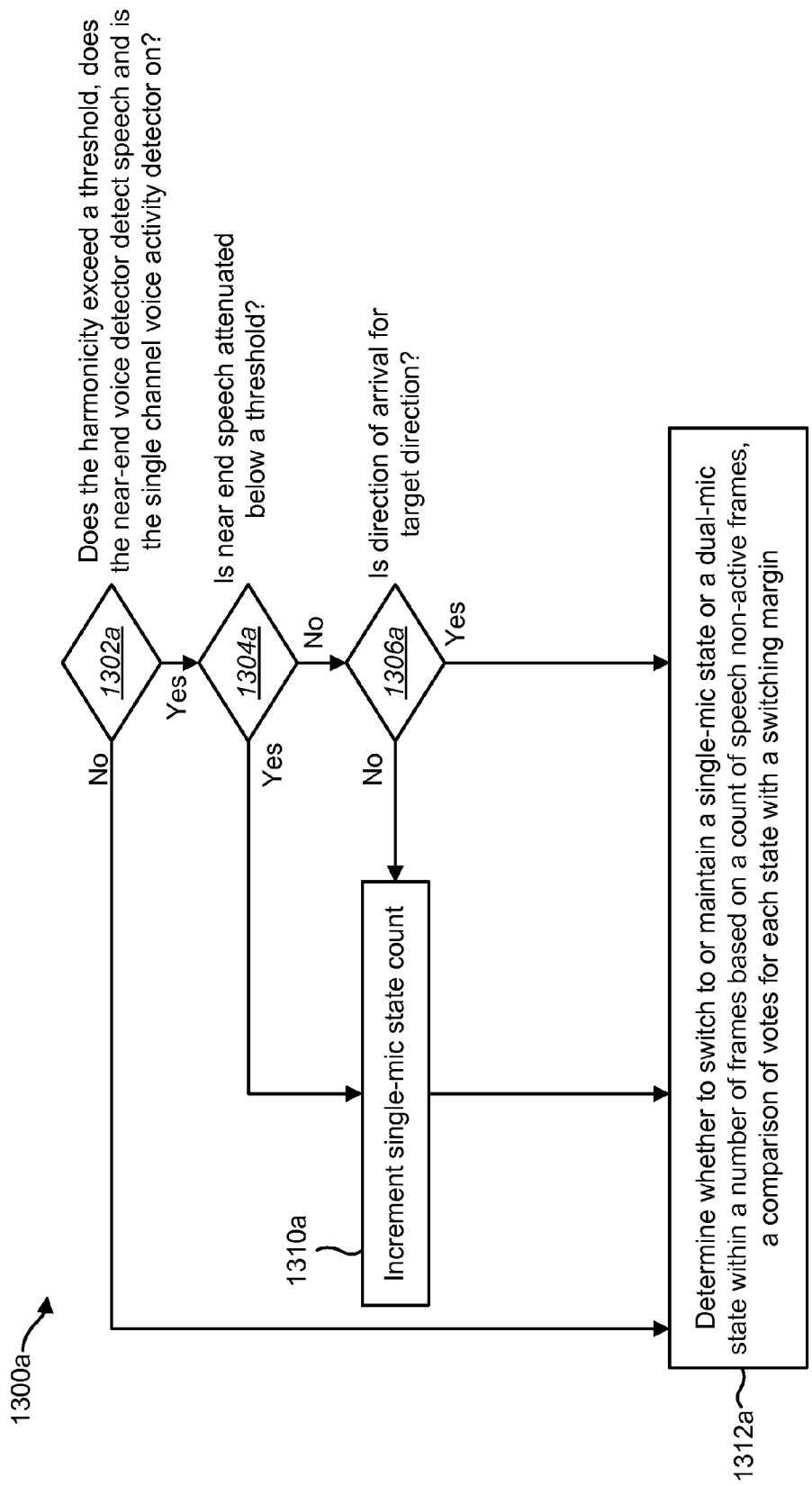
FIG. 13A is a flow diagram illustrating one configuration of a method for microphone switching.

FIG. 13A is a flow diagram illustrating one configuration of a method 1300a for microphone switching. In particular, FIG. 13A illustrates one example of a voting scheme based intelligent switch (IS). An electronic device may determine 1302a if harmonicity exceeds a certain threshold, if the near end voice detector detects voiced speech (e.g., 1420) and if a single-channel voice activity detector (e.g., single channel VAD 1209) is on (e.g., indicates voice activity). If any of these criteria are not met, the electronic device may utilize decision logic as follows. It should be noted that the acronym "VAD" may be used herein to abbreviate "voice activity detection" and/or "voice activity detector."

The electronic device may determine 1312a whether to switch to another microphone state or maintain a microphone state. More specifically, the electronic device may determine 1312a whether to switch to or maintain a single-mic state or a dual-mic state within a number of frames based on a count of speech non-active frames and a comparison of votes for each state with a switching margin. In particular, the electronic device may collect voting for each state during a certain amount of time. If there are not enough speech-active frames, the electronic device may not switch states (between single-mic state and multi-mic (e.g., dual mic) state). If dual-state beats single-state with some margin, then the electronic device may utilize (e.g., switch to or maintain) a dual-mic state. If single-mic state beats dual-mic state with some margin, then the electronic device may utilize (e.g., switch to or maintain) a single-mic state. The margin for each state can be different. Updating state may or may not be done every frame. For example, it could be done up to every "number of frames for the voting." In some configurations, determining 1312a whether to switch to (or maintain) a single-mic state or a dual-mic state may also be based on a previous state (e.g., whether the previous state was a single-mic state or a dual-mic state).

For clarity, additional description is given regarding how the entire processing blocks contribute the speech restoration (speech level matching). If dual-mic processing is always performed (with a dual-mic state, for example), then improved or the best performance may be achieved for a user's normal phone holding case. However, for a sub-optimal holding position such as holding down or outward, dual-mic processing may suppress not only unwanted noise, but also the target speech that is beneficially preserved.

To avoid the target speech suppression, switching to single-mic processing with single-mic state (using the intelligent switching scheme) may be needed. However, at the same time, unnecessary switching may be beneficially prevented, since dual-mic noise suppression performance may be much better.

To have robust switching scheme, an electronic device may collect information for a certain amount time to make a decision, especially for the dual to single state switching. However, before making the decision from dual to single, if the user moves the phone to a sub-optimal holding position abruptly, then until the switching actually happens, the target speech suppression may be unavoidable.

If a user holds the phone in some extreme manner, such that the harmonicity based VAD is not working, then the intelligent switching would not work. In this case, the speech restoration scheme described in connection with FIGS. 20-24 may play a significant role, since it plays a gate keeper role. This means that, regardless of state, it restores target speech if it has been suppressed mistakenly.

If the harmonicity exceeds a certain threshold, if the near end voice detector detects voiced speech and if a single-channel VAD is on, the electronic device may determine 1304a whether near end speech is attenuated below a threshold. If the near end speech is attenuated below a threshold, then the electronic device may increment 1310a a single-mic state count. The electronic device may determine 1312a whether to switch to a single-mic state or a dual mic state within a number of frames as described above.

If the near end speech is not attenuated below a threshold, the electronic device may determine 1306a whether a direction of arrival is for a target direction. For example, the electronic device may determine whether a direction of arrival corresponds to a target direction (within some angle range, for instance). If the direction of arrival is not for the target direction, then the electronic device may increment 1310a a single-mic state count and determine 1312a whether to switch to a single-mic state or a dual mic state within a number of frames as described above. If the direction of arrival is for the target direction, then the electronic device may determine 1312a whether to switch to a single-mic state or a dual mic state within a number of frames as described above.

In some configurations, the electronic device may additionally determine whether near end speech is not attenuated above some threshold when the direction of arrival is for the target direction. If the near end speech is attenuated above some threshold, then the electronic device may increment a dual-mic state count and determine 1312a whether to switch as described above. In some configurations, the electronic device may base the determination 1312a of whether to switch on the case where the near end speech is not attenuated above some threshold. For example, the electronic device may switch to a dual-mic state if the near end speech is not attenuated above some threshold.

Figure 14:
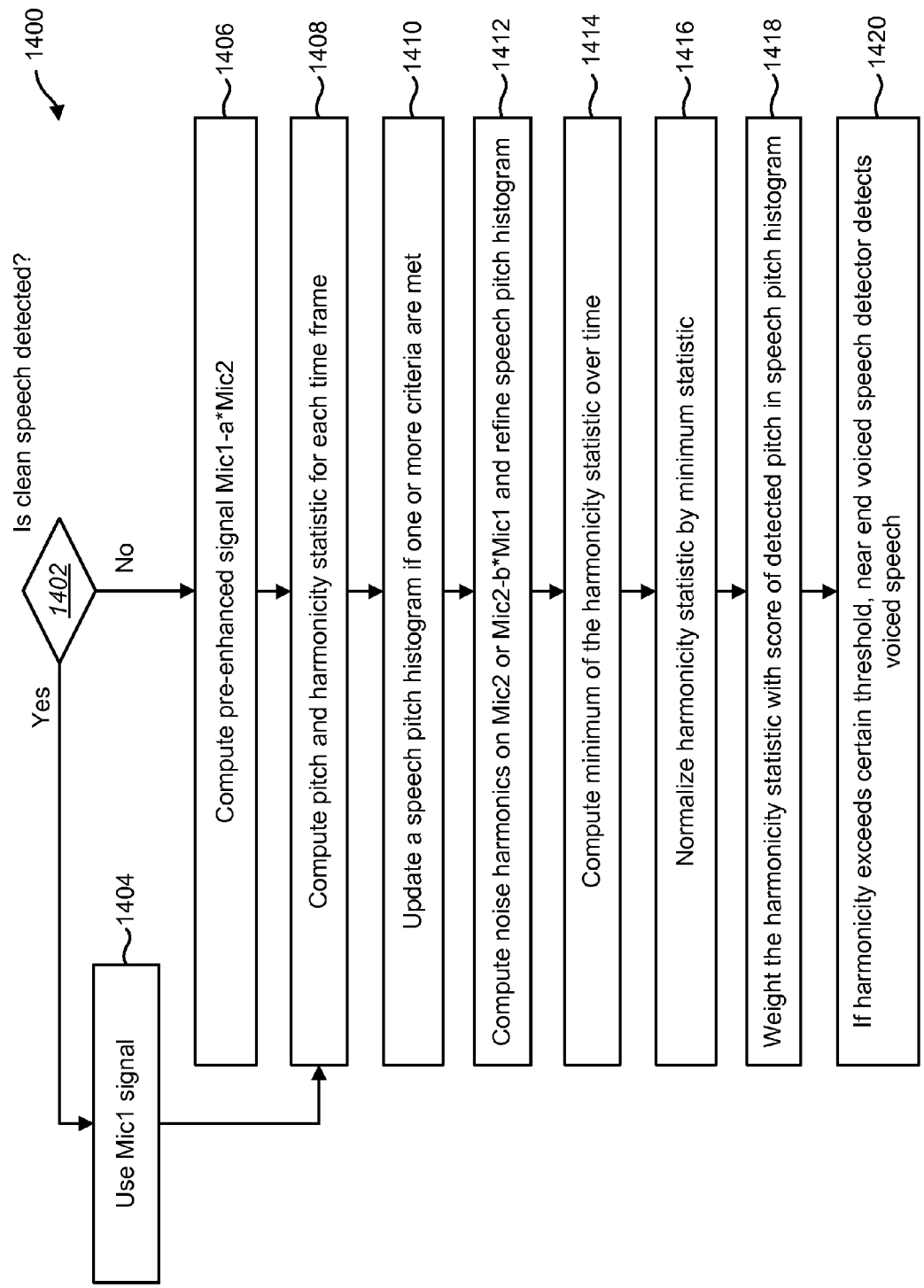
FIG. 14 is a flow diagram illustrating another configuration of a method for detecting voice activity.

FIG. 14 is a flow diagram illustrating another configuration of a method 1400 for detecting voice activity. In one implementation, the electronic device 102 may determine 1402 if clean speech is detected. In some implementations, clean speech may be detected if the audio signal 182 contains a high signal-to-noise ratio (that meets or exceeds a particular threshold, for example). If the electronic device 102 determines 1402 that clean speech is detected, the electronic device 102 may use 1404 the audio signal 182 of a first microphone 104 (e.g., Mic1 signal). If the electronic device 102 determines 1402 that clean speech is not detected, the electronic device 102 may compute 1406 a pre-enhanced audio signal 182 (e.g., Mic1-a*Mic2).

In either case, the electronic device 102 may compute 1408 the pitch and harmonicity statistic for each time frame. In some implementations, the electronic device 102 may update 1410 the speech pitch histogram 1001 if one or more criteria are met. Examples of criteria include, if the harmonicity meets a high threshold and if the inter microphone gain difference is high (e.g., meets or exceeds a threshold value). In some implementations, the updates may be added to an existing speech pitch histogram 1001. Additionally, in some implementations, the electronic device 102 may compute 1412 the noise harmonics on the second microphone 104 (e.g., Mic2) signal. Additionally, or alternatively, the electronic device 102 may compute 1412 the noise harmonics on a Mic2-b*Mic1 audio signal 182. In some implementations, the speech pitch histogram 1001 may be refined based on the noise harmonics of the second microphone 104 (e.g., Mic2) audio signal 182 or an enhanced signal (e.g., Mic2-b*Mic1). In this implementation, the audio signal 182 of the first microphone 104 may be subtracted from the audio signal 182 of the second microphone 104 and may be scaled (e.g., by a factor "b").

The electronic device 102 may also compute 1414 a minimum of the harmonicity statistic over time. For example, the electronic device 102 may calculate the minimum value of a harmonicity statistic over a time t. The electronic device 102 may normalize 1416 the harmonicity statistic by the minimum of the harmonicity statistic (e.g., the tracked minimum) and a fixed maximum. The maximum value may be set to enable soft speech frames (possibly noise contaminated), but not to enable noise-only frames.

If the normalized harmonicity of a frame exceeds a certain threshold, then this frame may be labeled a voiced speech frame, or at least is highly likely that the frame contains voiced speech. For a normalized harmonicity threshold, a technique that tracks the minimum and/or maximum of the statistics may be used (for a dual-mic configuration, for example). As used herein, the term "harmonicity" may be used to refer to harmonicity and/or to normalized harmonicity, unless raw harmonicity is explicitly indicated.

With the speech pitch histogram updated 1001, the electronic device 102 may then weight 1418 the harmonicity statistic with the score of a detected pitch in the speech pitch histogram. If the harmonicity exceeds a certain threshold, the near end voiced speech detector may detect 1420 voiced speech. For example, the near end voiced speech detector may generate a "1" to indicate voice activity.

Figure 15:
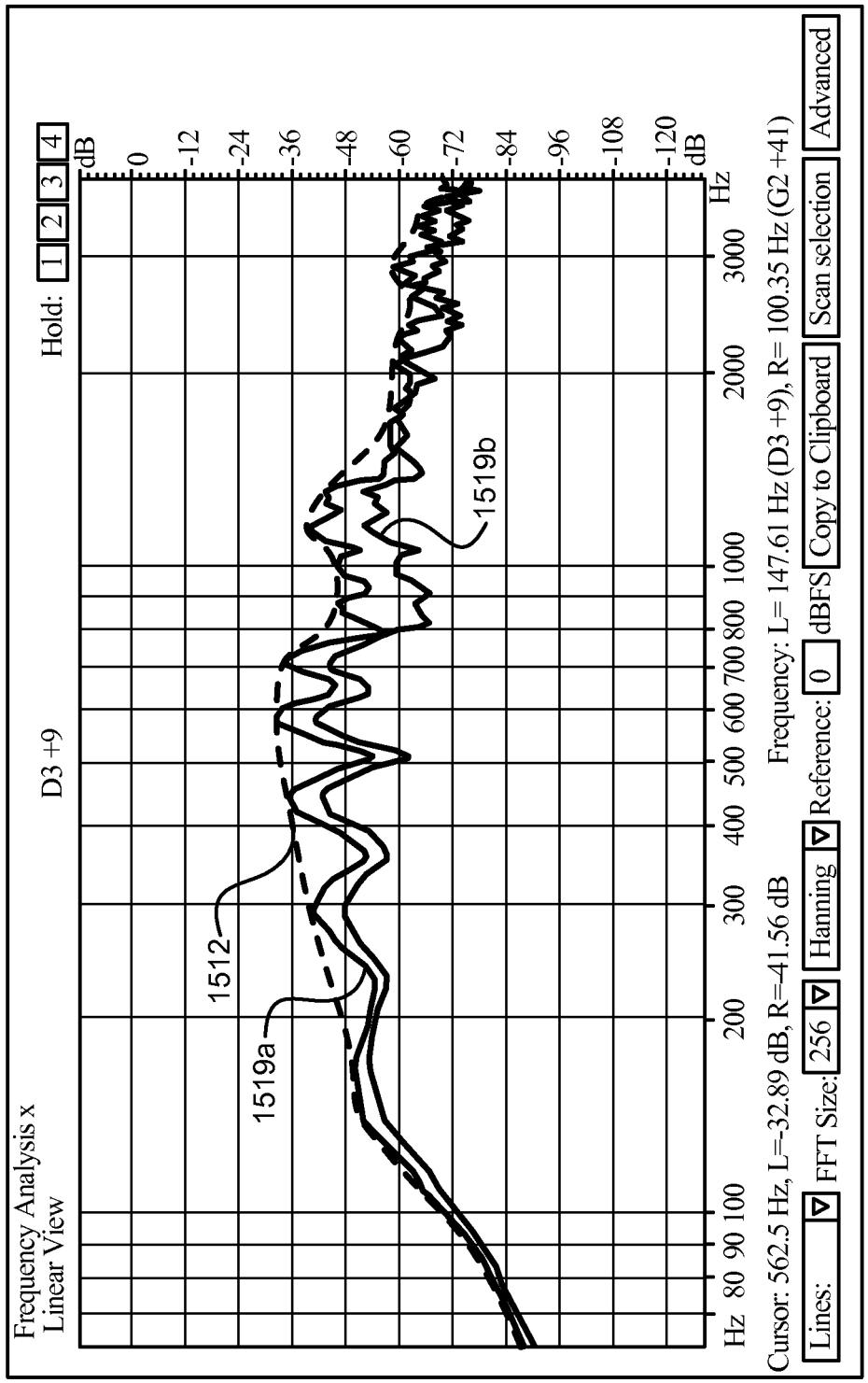
FIG. 15 is a graph illustrating recorded spectra of voiced speech in pink noise.

FIG. 15 is a graph illustrating recorded spectra 1519a-b of voiced speech in pink noise. In some implementations, one or more microphones 104 may record voiced speech. The one or more microphones 104 may be included in the electronic device 102. The graph illustrates a first spectra 1519a that may be recorded by a first microphone 104. The graph 1500 also illustrates a second spectra 1519b that may be recorded by a second microphone 104. In some implementations, the electronic device 102 may identify speech harmonics in a noise signal to maintain an envelope 112 at an output spectrum 448. In some cases, the output spectrum 448 may include a noise-suppressed signal. The identification of speech harmonics in noise may also reduce noise in spectral nulls. In some implementations, if the envelope 112 cannot be maintained, the electronic device 102 may reduce the noise suppression. Additionally or alternatively, if the envelope 112 cannot be maintained, the electronic device 102 may switch from a plurality of microphones 104 to a single microphone 104 (e.g., may reduce the number of active microphones to a single microphone 104). For conceptual clarity, one example of an envelope 1512 is also depicted as a dashed line in FIG. 15. An envelope 1512 may be extracted from a wave form or signal. In this example, the envelope 1512 depicted is related to the first spectra 1519a. An envelope 1512 of a signal or waveform may be bounded by peaks and/or valleys of the signal or waveform. Some configurations of the systems and methods disclosed herein may preserve harmonics in order to determine an envelope 1512, which may be applied to a noise-suppressed signal. It should be noted that the envelope 1512 depicted in FIG. 15 may or may not be an example of the envelope 112 described in connection with FIG. 1, depending on implementation.

Figure 16A:
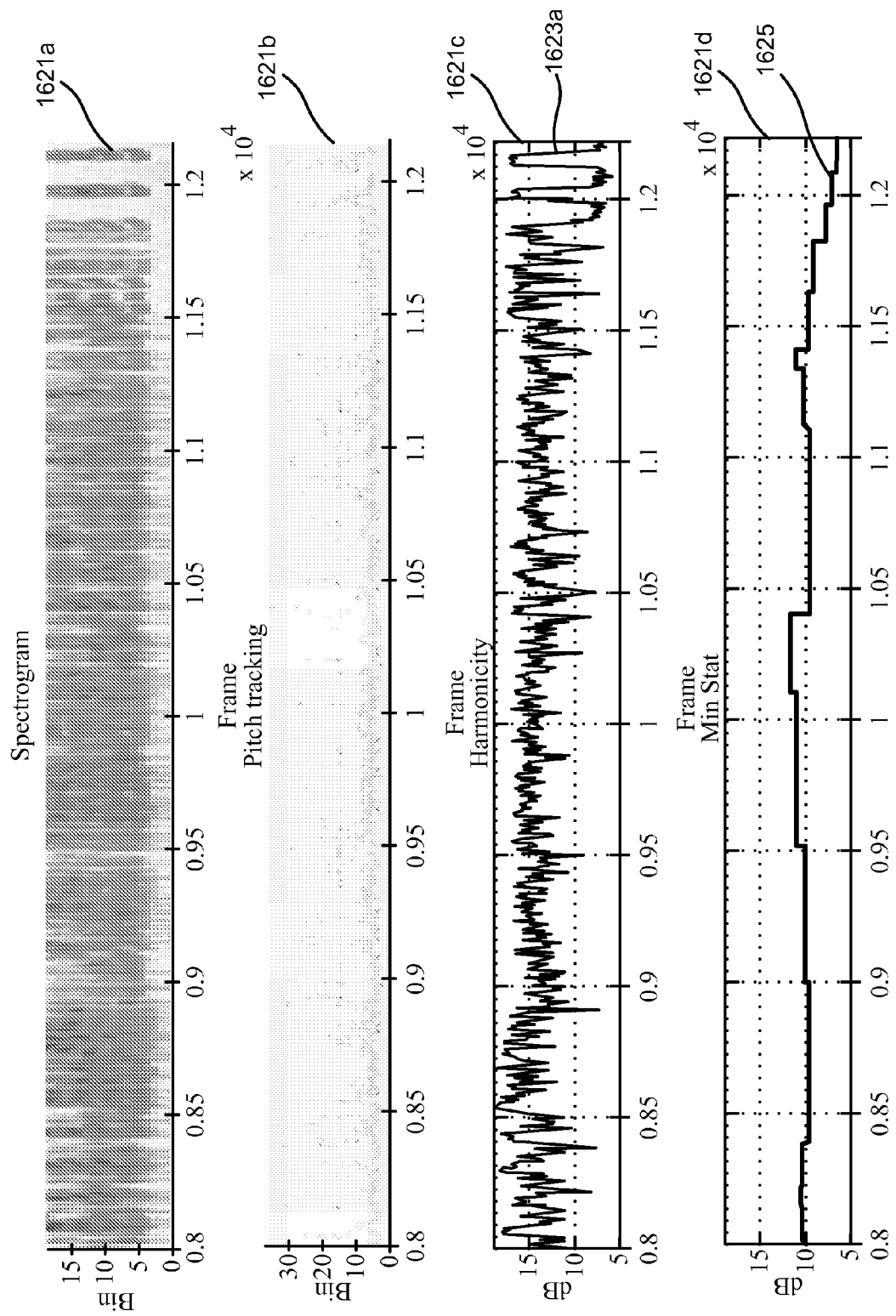
FIGS. 16A-B include various graphs illustrating a harmonic product spectrum statistic in music noise.
Figure 16B:
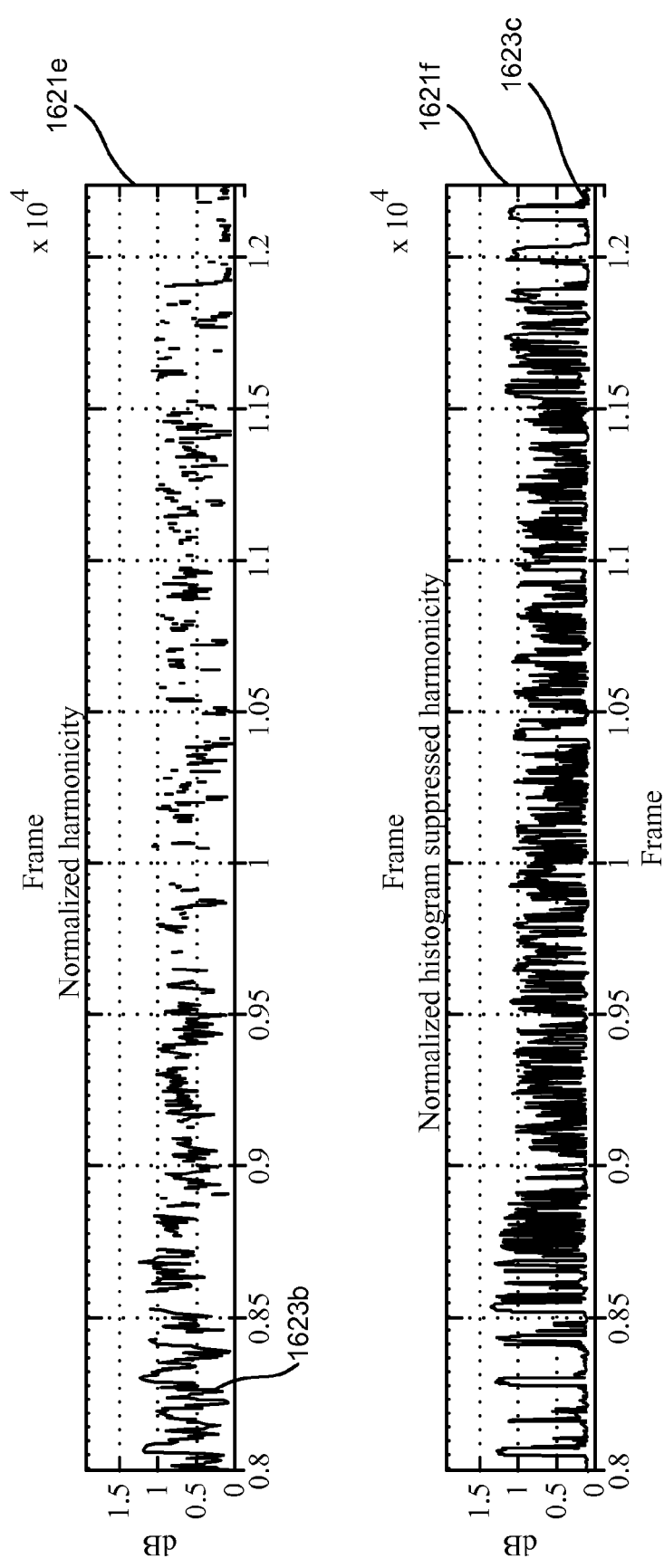

FIGS. 16A-B include various graphs 1621a-f illustrating a harmonic statistic 1005 in music noise. The first graph 1621a of FIG. 16A is a spectrogram of a near end voiced speech (e.g., harmonic product spectrum) statistic in music noise. In this example, the x-axis may represent the frame of the audio signal 182 and the y-axis may represent the frequency bins of the audio signal 182. The second graph 1621b of FIG. 16A illustrates a pitch tracking of the near end voiced speech (e.g., harmonic product spectrum) statistic. In this example, the x-axis may represent the frame of the audio signal 182 and the y-axis may represent the frequency bins of the audio signal 182. The third graph 1621*c* of FIG. 16A illustrates the harmonicity 1623*a* of the near end voiced speech (e.g., harmonic product spectrum) statistic. In this example, the x-axis may represent the frame of the audio signal 182 and the y-axis may represent the harmonicity (in dB) of the audio signal 182. The fourth graph 1621*d* of FIG. 16A illustrates the minimum statistic 1625 of the near end voiced speech (e.g., harmonic product spectrum) statistic. In this example, the x-axis may represent the frame of the audio signal 182 and the y-axis may represent the minimum harmonicity statistic (in dB) of the audio signal 182. The first graph 1621*e* of FIG. 16B depicts near end speech differentiated from music noise. The first graph 1621*e* of FIG. 16B may depict a normalized harmonicity 1623*b*. In this example, the x-axis may represent the frame of the audio signal 182 and the y-axis may represent the normalized harmonicity (in dB) of the audio signal 182. The second graph 1621*f* of FIG. 16B depicts near end speech differentiated from music noise. The second graph 1621*f* of FIG. 16B may depict a histogram suppressed harmonicity 1623*c*. The histogram suppressed harmonicity 1623*c* may indicate the near end speech differentiated from the music noise. In this example, the x-axis may represent the frame of the audio signal 182 and the y-axis may represent the normalized histogram suppressed harmonicity (in dB) of the audio signal 182.

Figure 17A:
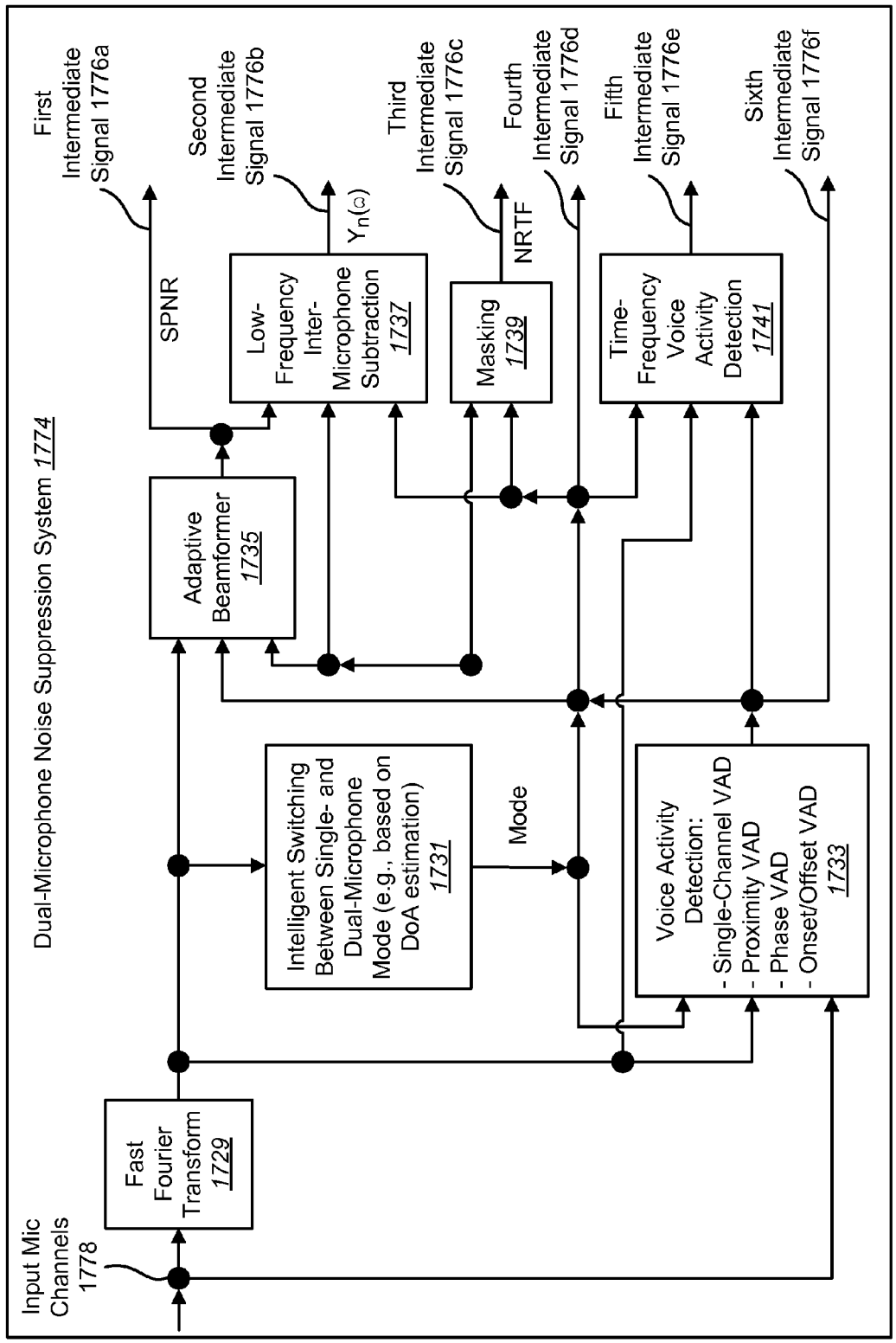
FIG. 17A is a block diagram illustrating a portion of one configuration of a dual-microphone noise suppression system.

FIG. 17A is a block diagram illustrating a portion of one configuration of a dual-microphone noise suppression system 1774. In some implementations, the dual-microphone noise suppression system 1774 may be implemented in accordance with one or more of the functions and/or structures described herein. For example, the dual-microphone noise suppression system 1774 may be included on one or more of the electronic devices 102, 402 702, 902, 1002 and the wireless communication device 1202. More specifically, the dual-microphone noise suppression system 1774 may be an example of the noise suppression block/module 116 as described in connection with FIG. 1. In one example, the dual-microphone noise suppression system 1774 may receive one or more input microphone channels 1778 (e.g., the plurality of audio signals 182). The dual-microphone noise suppression system 1774 may include one or more block/modules that may process the input microphone channels 1778 to output one or more intermediate signals 1776*a-f*.

For example, the dual-microphone noise suppression system 1774 may include a fast Fourier transform block/module 1729 that may split the input microphone channels 1778 into one or more bands. A switching block/module 1731 may switch between a dual-microphone mode and a single-microphone mode. In some configurations, this may be based on a direction of arrival (DOA) estimation. A voice activity detection block/module 1733 may include one or more voice activity detectors that detect voiced speech in the input microphone channels 1778. Examples of voice activity detectors include a single-channel voice activity detector, a proximity voice activity detector, a phase voice activity detector and an onset/offset voice activity detector.

The dual-microphone noise suppression system 1774 may also include one or more of an adaptive beamformer 1735, a low-frequency inter-microphone subtraction block/module 1737, a masking block/module 1739 and a time-frequency voice activity detection block/module 1741 to process the input microphone channels 1778 to output one or more intermediate signals 1776*a-f*.

Figure 17B:
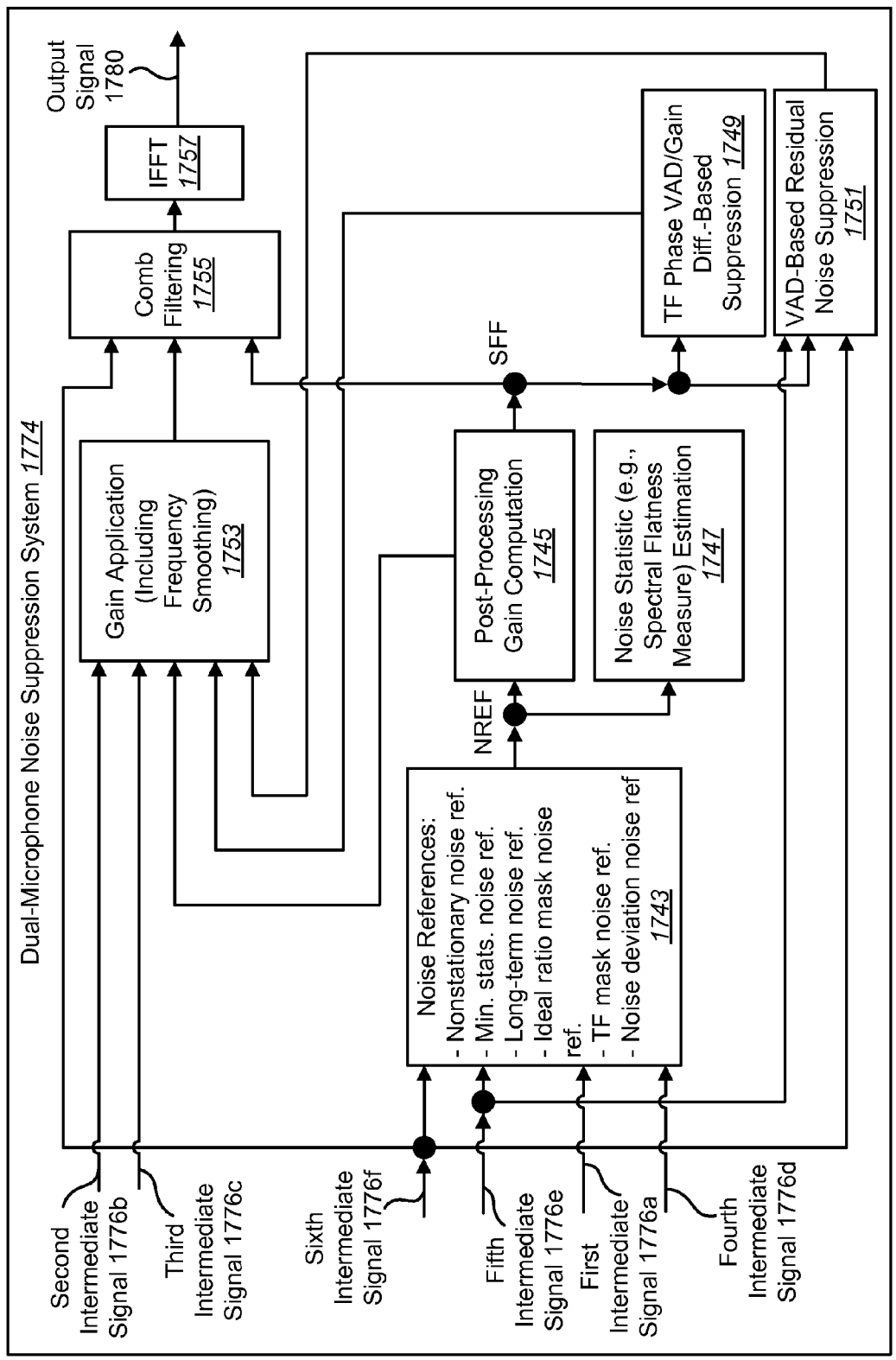
FIG. 17B is a block diagram illustrating another portion of one configuration of a dual-microphone noise suppression system.

FIG. 17B is a block diagram illustrating another portion of one configuration of a dual-microphone noise suppression system 1774. In this example, the dual-microphone noise suppression system 1774 may further include a noise references block/module 1743. The noise references block/module 1743 may include one or more noise references. Examples of noise references include non-stationary noise references, minimum statistics noise references, long-term noise references, ideal ratio mask noise references, TF mask noise references and noise deviation noise references. The dual-microphone noise suppression system 1774 may also include one or more of a gain application block/module 1753, a post-processing gain computation block/module 1745, a noise statistic (e.g., spectral flatness measure) estimation block/module 1747, TF phase voice activity detection/gain difference based suppression block/module 1749, voice activity detection-based residual noise suppression block/module 1751, comb filtering block/module 1755 and an inverse fast Fourier transform block module 1757 that process one or more intermediate signals 1776*a-f* into an output signal 1780. It is expressly noted that any one or more of the block/modules shown in FIGS. 17A-B may be implemented independently of the rest of the system (e.g., as part of another audio signal processing system).

Figure 18:
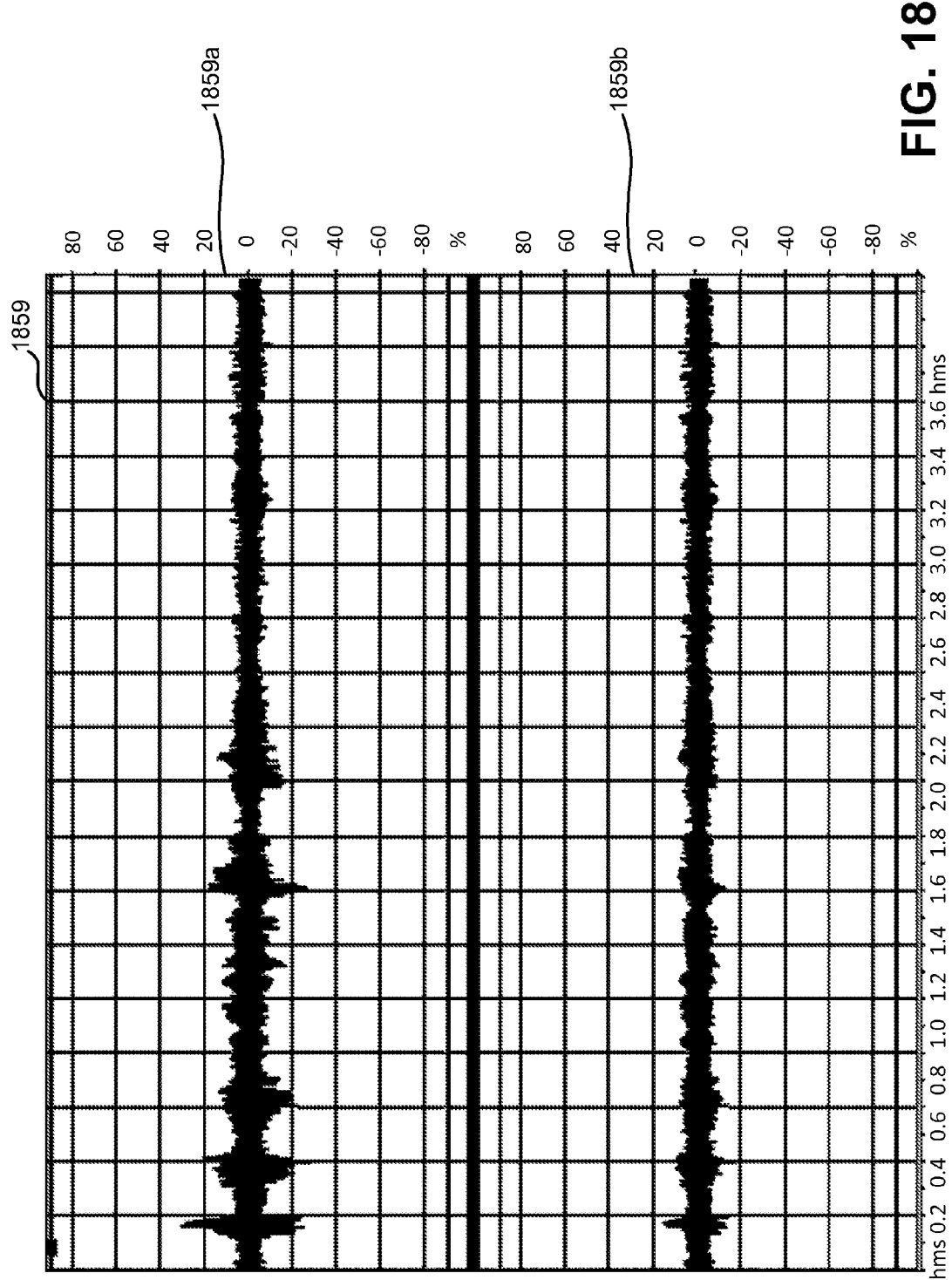
FIG. 18 is a graph illustrating a stereo speech recording in car noise.
Figure 19:
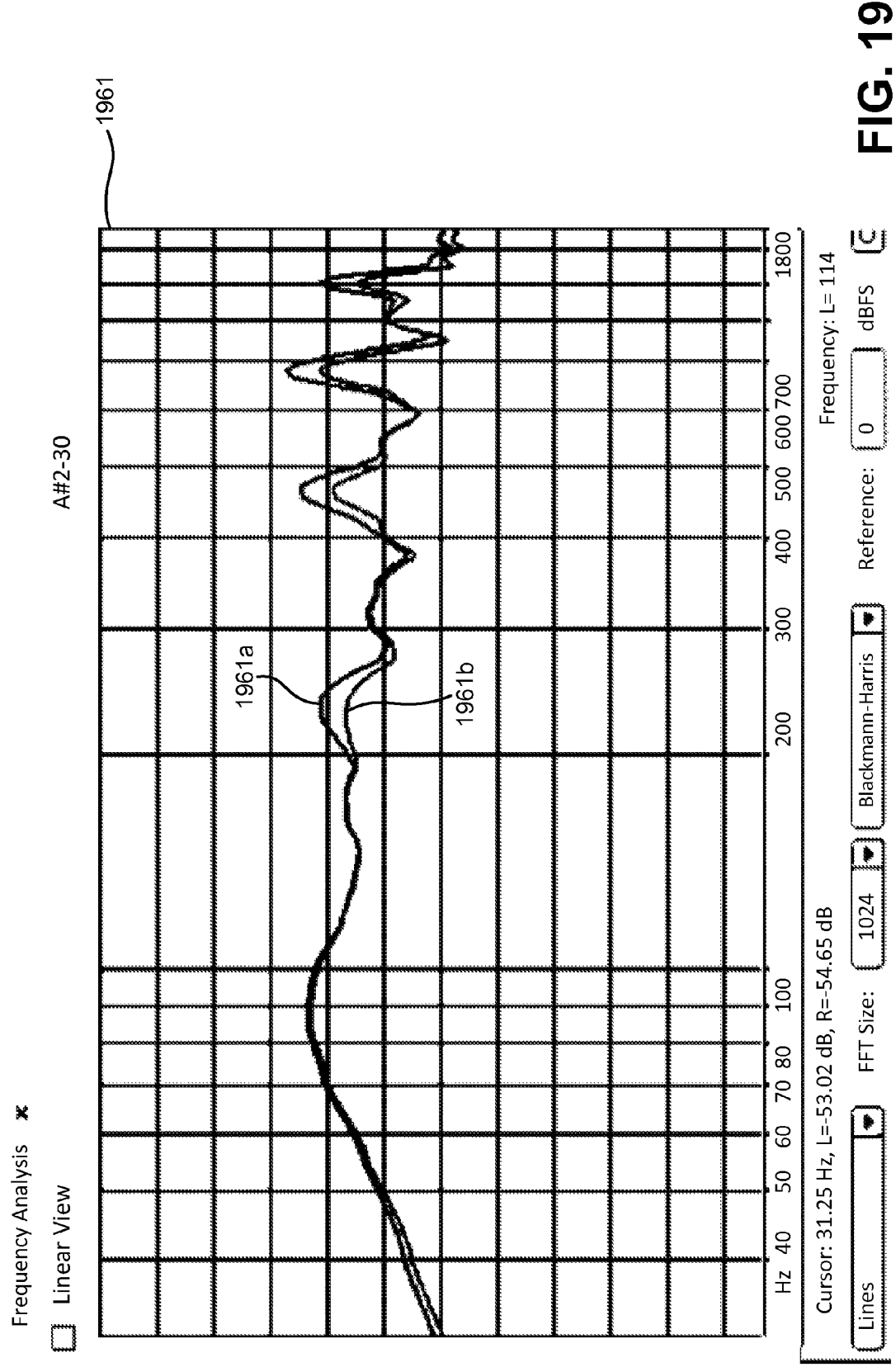
FIG. 19 is another graph illustrating a stereo speech recording in car noise.

FIGS. 18 and 19 are graphs 1859, 1961 illustrating a stereo speech recording in car noise. More specifically, FIG. 18 shows a graph 1859 of the time-domain signal and FIG. 19 shows a graph 1961 of the frequency spectrum. In each case, the upper traces 1859*a*, 1961*a* correspond to an audio signal 182 from a first microphone 104 (e.g., a microphone 104 that is oriented toward the user's mouth or otherwise receives the user's voice most directly) and the lower traces 1859*b*, 1961*b* correspond to an audio signal 182 from a second microphone 104. The frequency spectrum graph 1961 shows that the signal-to-noise ratio is better for the first microphone 104 audio signal 182. For example, it may be seen that voiced speech (e.g., the peaks) is stronger in the first microphone 104 audio signal 182, while background noise (e.g., the valleys) is about equally loud between the channels. In some configurations, inter-microphone channel subtraction may typically be expected to result in 8-12 dB noise reduction in the [0-500 Hz] band with very little voice distortion, which is similar to the noise reduction results that may be obtained by spatial processing using large microphone arrays with many elements.

Low-frequency noise suppression may include inter-microphone subtraction and/or spatial processing. One example of a method of reducing noise in a plurality of audio signals includes using an inter-microphone difference for frequencies less than 500 Hz m(e.g., a phase difference and/or a level difference), and using a spatially selective filtering operation (e.g., a directionally selective operation, such as a beamformer) for frequencies greater than 500 Hz.

It may be desirable to use an adaptive gain calibration filter to avoid a gain mismatch between two microphones 104. Such a filter may be calculated according to a low-frequency gain difference between the signals from a first microphone 104 and one or more secondary microphones 104. For example, a gain calibration filter M may be obtained over a speech-inactive interval according to an expression such as $$\|M(\omega)\| = \frac{\|Y_1(\omega)\|}{\|Y_2(\omega)\|}, \quad (1)$$

where ω denotes a frequency, $Y_1$ denotes the first microphone 104 channel, $Y_2$ denotes the secondary microphone 104 channel, and $\|\cdot\|$ denotes a vector norm operation (e.g., an L2-norm).

In most applications the secondary microphone 104 channel may be expected to contain some voice energy, such that the overall voice channel may be attenuated by a simple subtraction process. Consequently, it may be desirable to introduce a make-up gain to scale the voice gain back to its original level. One example of such a process may be summarized by an expression such as $$\|Y_n(\omega)\| = G^*(\|Y_1(\omega)\| - \|M(\omega)^* Y_2(\omega)\|), \quad (2)$$

where $Y_n$ denotes the resulting output channel and G denotes an adaptive voice make-up gain factor. The phase may be obtained from the first microphone 104 audio signal.

The adaptive voice make-up gain factor G may be determined by low-frequency voice calibration over [0-500 Hz] to avoid introducing reverberation. Voice make-up gain G can be obtained over a speech-active interval according to an expression such as $$\|G\| = \frac{\Sigma \|Y_1(\omega)\|}{\Sigma (\|Y_1(\omega)\| - \|Y_2(\omega)\|)}. \quad (3)$$

In the [0-500 Hz] band, such inter-microphone subtraction may be preferred to an adaptive filtering scheme. For the typical microphone 104 spacing employed on handset form factors, the low-frequency content (e.g., in the [0-500 Hz] range) is usually highly correlated between channels, which may lead in fact to amplification or reverberation of low-frequency content. In a proposed scheme, the adaptive beamforming output $Y_n$ is overwritten with the inter-microphone subtraction module below 500 Hz. However, the adaptive null beamforming scheme also produces a noise reference, which is used in a post-processing stage.

Some configurations of the systems and methods disclosed herein describe speech restoration for multiple (e.g., dual) microphone noise reduction. Dual microphone computational auditory scene analysis- (CASA-) based noise suppression has issues of temporary speech muting and attenuation when the phone is abruptly changed to a non-optimal holding position. For example, these problems may occur while Intelligent Switching (IS) between dual microphone mode and single microphone mode is delayed. The systems and methods disclosed here provide a solution to these problems.

The systems and methods disclosed herein may utilize a restoration block/module to restore the output signal to the input signal level when it contains speech and the noise-suppressed voice is muted or attenuated. The restoration block/module may function as a "gate keeper" for speech signals. The systems and methods disclosed herein may attempt to restore all speech and restore no noise (e.g., pink noise, babble noise, street noise, music, etc.). When speech is in the presence of noise, the systems and methods disclosed herein attempt to restore only speech, although this is not strongly required.

An algorithm overview is provided as follows. Frame-wise conditions may include harmonicity-based conditions. In particular, an electronic device may detect speech-dominant frames based on harmonicity (e.g., Harmonic Product Sum (HPS)). Bin-wise conditions may include an input signal SNR and/or peak tracking (e.g., a peak map). Specifically, an electronic device may detect clean speech based on minimum statistic (MinStat) noise estimation. Additionally or alternatively, the electronic device may detect spectral peaks that are associated with speech using a peak map.

Post-processing may include undoing the restoration (on a frame-wise basis, for example) in some cases. This post-processing may be based on one or more of a restoration ratio, abnormal peak removal, stationary low SNR and restoration continuity. Restoration continuity may ensure that the restored signal is continuous for each bin.

Figure 20:
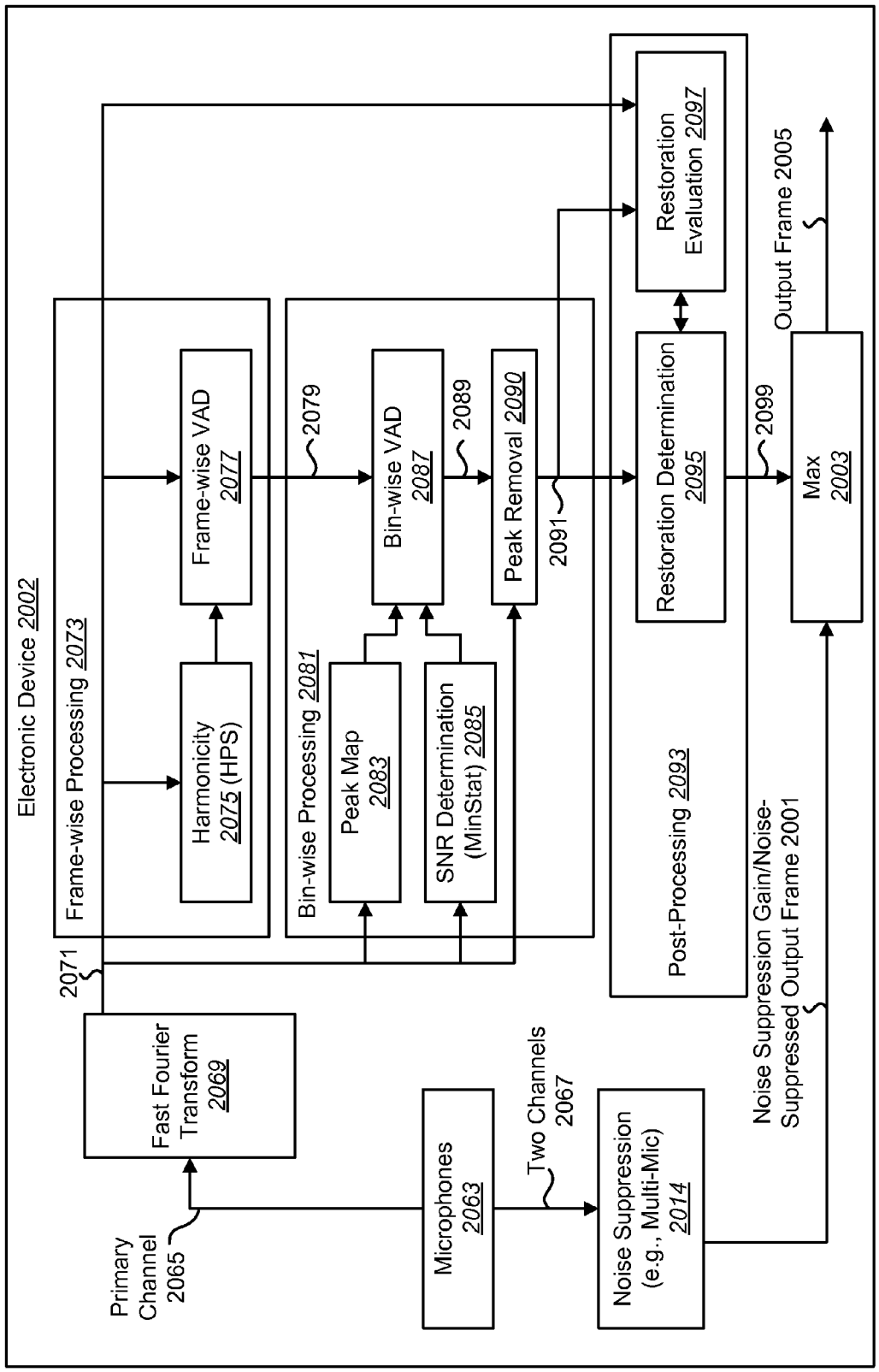
FIG. 20 is a block diagram illustrating one configuration of elements that may be implemented in accordance with the systems and methods disclosed herein.

FIG. 20 is a block diagram illustrating one configuration of an electronic device 2002 in which systems and methods for restoring a processed speech signal may be implemented. The electronic device 2002 may be one example of the electronic device 102 described above in connection with FIG. 1. One or more of the elements included in the electronic device 2002 may be implemented in hardware (e.g., circuitry), software or both. Multiple microphones 2063 may be utilized to capture multiple audio signal channels 2065, 2067. For instance, the multiple microphones 2063 may provide multiple audio signals as described above.

Two or more audio signal channels 2067 may be provided to a noise suppression block/module 2014 (e.g., a dual-mic noise suppression block/module 2014). The noise suppression block/module 2014 may produce a noise-suppressed output frame 2001 (and/or a noise-suppression gain).

An audio signal channel 2065 (e.g., a primary channel) may be provided to a fast Fourier transform (FFT) block/module 2069. In some configurations, the primary channel 2065 may correspond to one of the microphones 2063. In other configurations, the primary channel 2065 may be a single channel that is selected from multiple channels corresponding to the microphones 2063. For example, the electronic device 2002 may select a channel with a highest harmonicity value as the primary channel 2065 from among several channels corresponding to the microphones 2063. In yet other configurations, the primary channel may be a channel resulting from inter-microphone subtraction (with or without scaling value(s), for instance).

The FFT block/module 2069 may transform the primary channel audio signal 2065 from the time domain into the frequency domain. The transformed audio signal 2071 may be provided to a frame-wise processing block/module 2073 and to a bin-wise processing block/module 2081.

The frame-wise processing block/module 2073 may determine frame-wise conditions. In some configurations, the frame-wise processing block/module 2073 may perform operation(s) on a frame basis and may include a harmonicity block/module 2075 and a frame-wise voice activity detector (VAD) 2077. The frame-wise processing block/module 2073 may receive an input frame (e.g., a frame of the transformed audio signal 2071) from the FFT block/module 2069. The frame-wise processing block/module 2073 may operate based on frame-wise conditions as follows.

The harmonicity block/module 2075 may determine a Harmonic Product Spectrum (HPS) based on the primary channel 2065 (e.g., the transformed audio signal 2071) in order to measure the harmonicity. HPS may be a known approach for determining pitch. For example, the harmonicity block/module 2075 returns pitch and harmonicity level. The frame-wise processing block/module 2073 may normalize the raw harmonicity using a minimum statistic (e.g., MinStat). In some configurations, for example, the frame-wise processing block/module 2073 may obtain the minimum statistic (e.g., MinStat) from the SNR determination block/module 2085 included in the bin-wise processing block/module 2081 in order to normalize the raw harmonicity. Alternatively, the frame-wise processing block/module 2073 may determine the minimum statistic (e.g., MinStat) for normalizing the raw harmonicity. Examples of normalized harmonicity are provided in connection with FIG. 25 below. The harmonicity result(s) (e.g., harmonicity and/or pitch) may be provided to the frame-wise VAD 2077. In other words, the frame-wise VAD 2077 may be a harmonicity-based VAD.

The frame-wise VAD 2077 may detect voice activity based on the transformed signal 2071 as well as the harmonicity and/or pitch provided by the harmonicity block/module 2075. For example, the frame-wise VAD 2077 may indicate voice activity if the harmonicity meets one or more thresholds (where the threshold(s) may be based on pitch in some configurations, for instance). The frame-wise VAD 2077 may provide a frame-wise voice indicator 2079 to the bin-wise processing block/module 2081 (e.g., to the bin-wise VAD 2087). The frame-wise voice indicator 2079 may indicate whether or not the frame-wise VAD 2077 has detected voice activity in a frame.

A hang-over scheme may be utilized in some configurations of the systems and methods disclosed herein. For example, if a frame has a strong harmonicity level, then the electronic device 2002 may sustain a state for several frames as long as the harmonicity is not very low. For example, this state refers to voiced speech detection, where hangover may avoid chopping off speech tails.

Stationary noises may be filtered well based on the frame-wise condition. Music noise may be filtered by bin-wise conditions and post-processing. For example, in stationary noise, the frame-wise condition (utilized by the frame-wise processing block/module 2073) may be enough to discriminate speech from noise. In music noise, however, post-processing of the harmonicity estimates may be needed to further determine whether the transformed audio signal 2071 contains speech or harmonic noise. Graphs that illustrate the harmonicity of clean speech during rotation, speech and music/music only/speech only and speech and public noise/public noise only/speech only are provided in FIG. 25.

The bin-wise processing block/module 2081 may determine bin-wise conditions. In some configurations, the bin-wise processing block/module 2081 may perform operations on a bin-wise basis and may include a peak map block/module 2083, an SNR determination block/module 2085, a bin-wise VAD 2087 and/or a peak removal block/module 2090. In some configurations, the peak removal block/module 2090 may be alternatively independent of the bin-wise processing block/module 2081 and/or included in the post-processing block/module 2093. Each "bin" may include a particular frequency band or range of frequencies.

The peak map block/module 2083 may perform peak tracking. In particular, the peak map block/module 2083 may identify the location of any peaks in the transformed audio signal 2071 (based on maxima and/or minima, for example). The peak map block/module 2083 may provide a signal or indicator of these peak locations (in frequency, for example) to the bin-wise VAD 2087.

The bin-wise VAD 2087 may determine voice activity based on the peak information, the bin-wise SNR and the frame-wise voice indicator 2079. For example, the bin-wise VAD 2087 may detect voice activity on a bin-wise basis. More specifically, the bin-wise VAD 2087 may determine which of the peaks indicated by the peak map block/module 2083 are speech peaks. The bin-wise VAD 2087 may generate a bin-wise voice indicator 2089, which may indicate any bins for which voice activity is detected. In particular, the bin-wise voice indicator 2089 may indicate speech peaks and/or non-speech peaks in the transformed audio signal 2071. The peak removal block/module 2090 may remove non-speech peaks.

The bin-wise VAD 2087 may indicate peaks that are associated with speech based on distances between adjacent peaks and temporal continuity. For example, the bin-wise VAD 2087 may indicate small peaks (e.g., peaks that are more than a threshold amount (e.g., 30 dB) below the maximum peak). The bin-wise voice indicator 2089 may indicate these small peaks to the peak removal block/module 2090, which may remove the small peaks from the transformed audio signal 2071. For example, if peaks are determined to be significantly lower (e.g., 30 dB) than a maximum peak, they may not be related to the speech envelope and are thus eliminated.

Additionally, if two peaks are within a certain frequency range (e.g., 90 Hz) and their magnitudes are not much different (e.g., less than 12 dB), the lower one may be indicated as a non-speech peak by the bin-wise VAD 2087 and may be removed by the peak removal block/module 2090. The frequency range may be adjusted depending on speakers. For example, the frequency range may be increased for women or children, who have a relatively higher pitch.

The bin-wise VAD 2087 may also detect temporally isolated peaks (based on the peaks indicated by the peak map block/module 2083, for instance). For example, the bin-wise VAD 2087 may compare peaks from one or more other frames (e.g., previous frame(s) and/or subsequent frame(s)) to peaks in a current frame. For instance, the bin-wise VAD 2087 may detect peaks in a frame that do not have a corresponding peak in a previous frame within a particular range. The range may vary based on the location of the peak. For example, the bin-wise VAD may determine that a peak has a corresponding peak in a previous frame (e.g., that the peak is temporally continuous) if a corresponding peak is found in a previous frame within ±1 bin for lower-frequency peaks and within ±3 bins for higher-frequency peaks. The bin-wise VAD 2087 may indicate temporally isolated peaks (e.g., peaks in a current frame without corresponding peaks in a previous frame) to the peak removal block/module 2090, which may remove the temporally isolated peaks from the transformed audio signal 2071.

One of the bin-wise conditions may be based on the input signal SNR. In particular, the SNR determination block/module 2085 may operate as follows. Bin-wise input signal SNR may be defined as the magnitude of a microphone input signal divided by its minimum statistic (MinStat) noise estimation. Alternatively, the SNR may be determined based on harmonicity (e.g., harmonicity divided by average harmonicity). One benefit of utilizing the bin-wise input signal SNR may be that, for a noisy speech segment, the SNR may be relatively lower due to the higher noise level. On the contrary, for a clean speech segment, the SNR will be higher due to the lower noise level, regardless of holding patterns.

The SNR determination block/module 2085 may determine bin-wise SNR based on the transformed audio signal 2071. For example, the SNR determination block/module 2085 may divide the magnitude of the transformed audio signal 2071 by an estimated noise minimum statistic on a bin-wise basis to yield the bin-wise SNR. The bin-wise SNR may be provided to the bin-wise VAD 2087.

The bin-wise VAD 2087 may determine a peak with SNR that does not meet a threshold. For example, the bin-wise VAD may indicate peaks with SNRs that are lower than one or more thresholds to the peak removal block/module 2090. The peak removal block/module 2090 may remove peaks in the transformed audio signal 2071 that do not meet the threshold(s).

In some configurations, the bin-wise VAD 2087 may utilize frequency-dependent thresholding. For example, non-linear thresholds may be utilized to restore more perceptually dominant voice frequency band(s). In some configurations, the threshold may be increased at onsets of musical sounds (using high-frequency content, for example). Additionally or alternatively, the threshold may be decreased when the input signal level is too low (e.g., in soft speech). Graphs illustrating examples of frequency-dependent thresholding (e.g., SNR in one clean speech muting frame and SNR in one music noise frame) are provided in FIG. 26. For example, peaks that do not meet or exceed the frequency-dependent threshold may be removed by the peak removal block/module 2090.

The approach provided by the bin-wise processing block/module 2081 may allow building the harmonic structure naturally. Additionally, the number of non-speech peaks may be used as an indicator of voice activity. Example graphs of the peak map (produced by the peak mapping block/module 2083) are provided in FIG. 27. In particular, graphs relating to clean speech and noisy speech (in pink noise) are provided.

The peak removal block/module 2090 may produce a restored frame 2091 based on the bin-wise voice indicator 2089. For example, the electronic device 2002 may remove noise peaks from the transformed audio signal 2071 based on a bin-wise voice indicator 2089 in order to produce a restored frame 2091. The restored frame 2091 or replacement signal may be provided to the post-processing block/module 2093.

The post-processing block/module 2093 may include a restoration determination block/module 2095 and/or a restoration evaluation block/module 2097. The post-processing block/module 2093 may determine if the restored frame 2091 will be discarded or not, based on one or more of the following conditions. In particular, the restoration evaluation block/module 2097 may compute parameters such as a restoration ratio, a continuity metric or score, an abnormal peak detection indicator and/or a stationary low SNR detection indicator. One or more of the parameters may be based on the input frame (e.g., transformed audio signal 2071) and/or the restored frame 2091. The restoration determination block/module 2095 may determine whether to keep or discard the restored frame 2091.

A restoration ratio may be defined as the ratio between the sum of restored FFT magnitudes (of the restored frame 2091, for example) and the sum of the original FFT magnitudes (of the transformed audio signal 2071, for example) at each frame. The restoration ratio may be determined by the post-processing block/module 2093. If the restoration ratio is less than a threshold, the post-processing block/module 2093 may undo the restoration.

The post-processing block/module 2093 may also determine a continuity metric (e.g., restoration continuity). The continuity metric may be a frame-wise score. The post-processing block/module 2093 may check the continuity of the restoration decision for each bin. In one example, the post-processing block/module 2093 may add a value (e.g., 2) to a bin score if that bin is restored for both the current and previous frames. Furthermore, the post-processing block/module 2093 may add a value (e.g., 1) to the bin score if the current frame bin is restored but the corresponding previous frame bin is not restored (which occurs as a starting point, for example). A value (e.g., 1) may be subtracted from the bin score if the previous frame bin is restored but the corresponding current frame bin is not restored (which occurs at an end point, for example). All of the bin scores may be summed to obtain the continuity metric for each frame. The frame-wise continuity metric (e.g., score) may be reset to zero when a frame is not restored. The post-processing block/module 2093 may undo the frame-wise restoration if the continuity score is less than the threshold.

In some configurations, additional post-processing may be performed (for some minor cases, for example). In other words, some fine-tuning for some minor cases may be performed. In some configurations, the post-processing block/module 2093 may detect one or more abnormal peaks. In particular, cases where only one or two peaks are restored may be found. If the surviving peaks are located at high frequencies or are too far (e.g., at least a threshold distance) from each other, the restoration for the frame may be undone.

Additionally or alternatively, the post-processing block/module 2093 may determine whether a stationary low SNR (e.g., loud pink noise) meets at least one threshold. If the mean of a minimum statistic (e.g., MinStat) sum is high (e.g., above a threshold amount) and the variation is low (e.g., below a threshold amount), then the restored frame 2091 may be preserved.

Figure 28A:
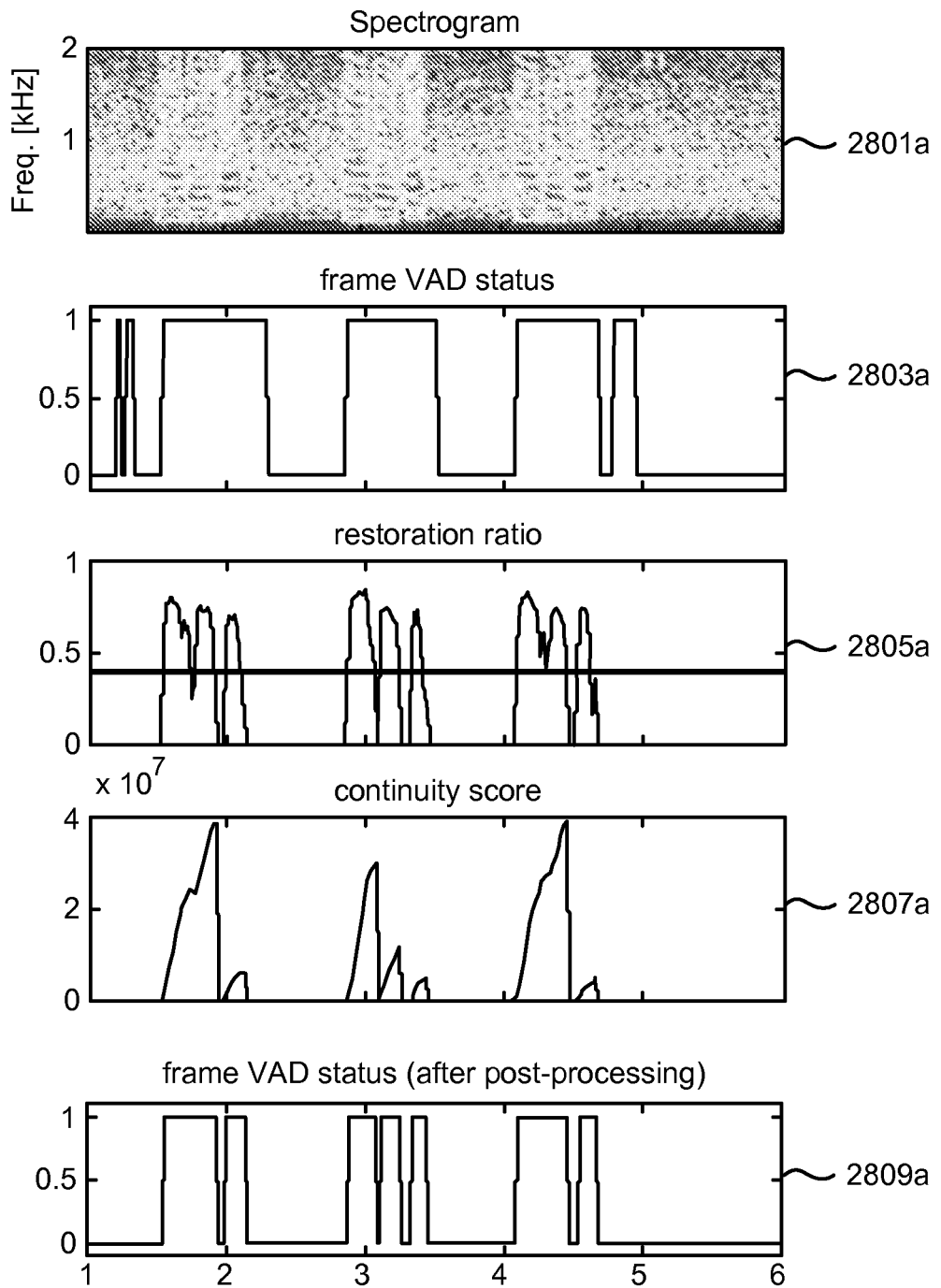
FIG. 28A illustrates an example of post-processing in accordance with the systems and methods disclosed herein.
Figure 28B:
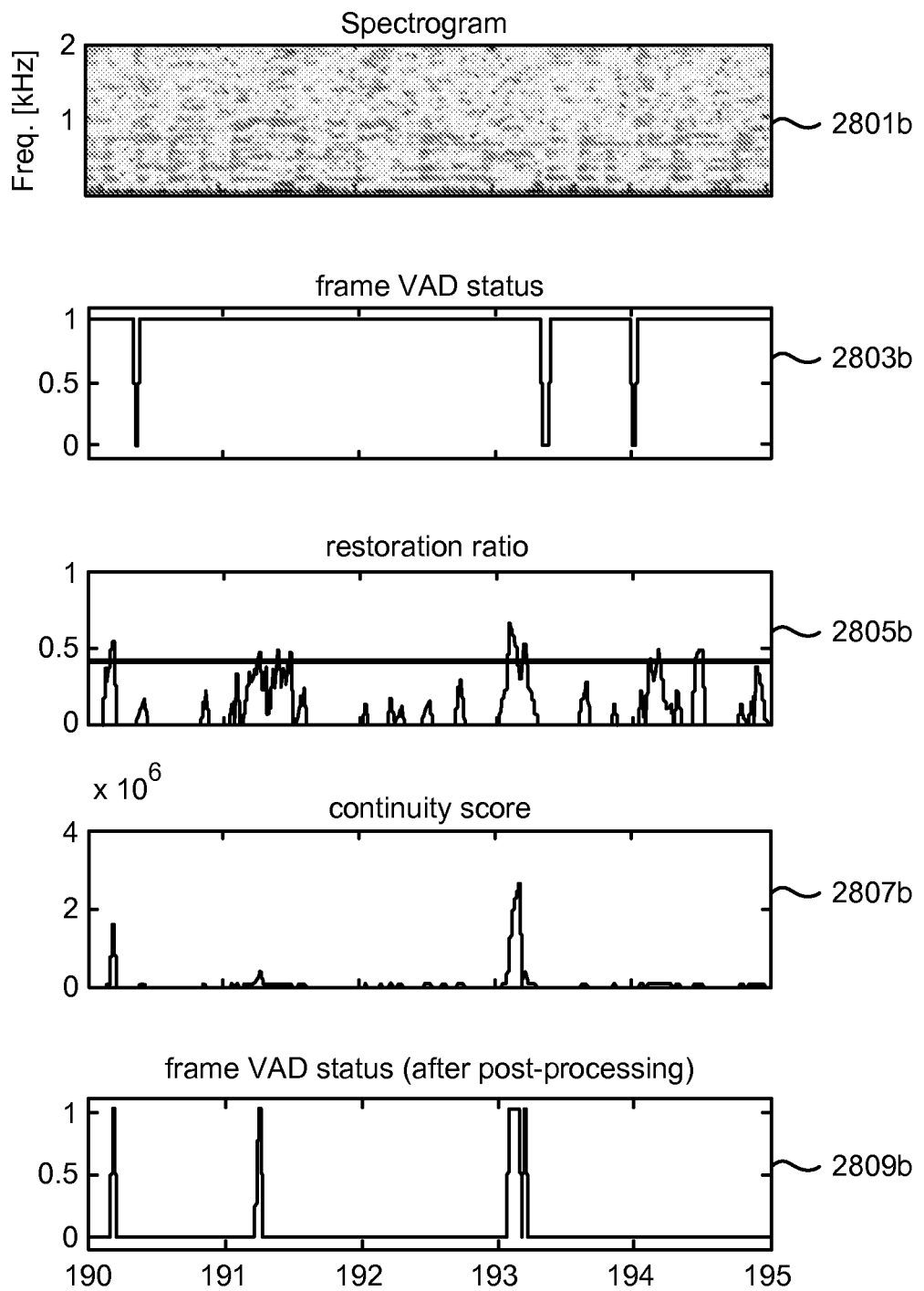
FIG. 28B illustrates another example of post-processing in accordance with the systems and methods disclosed herein.
Figure 28C:
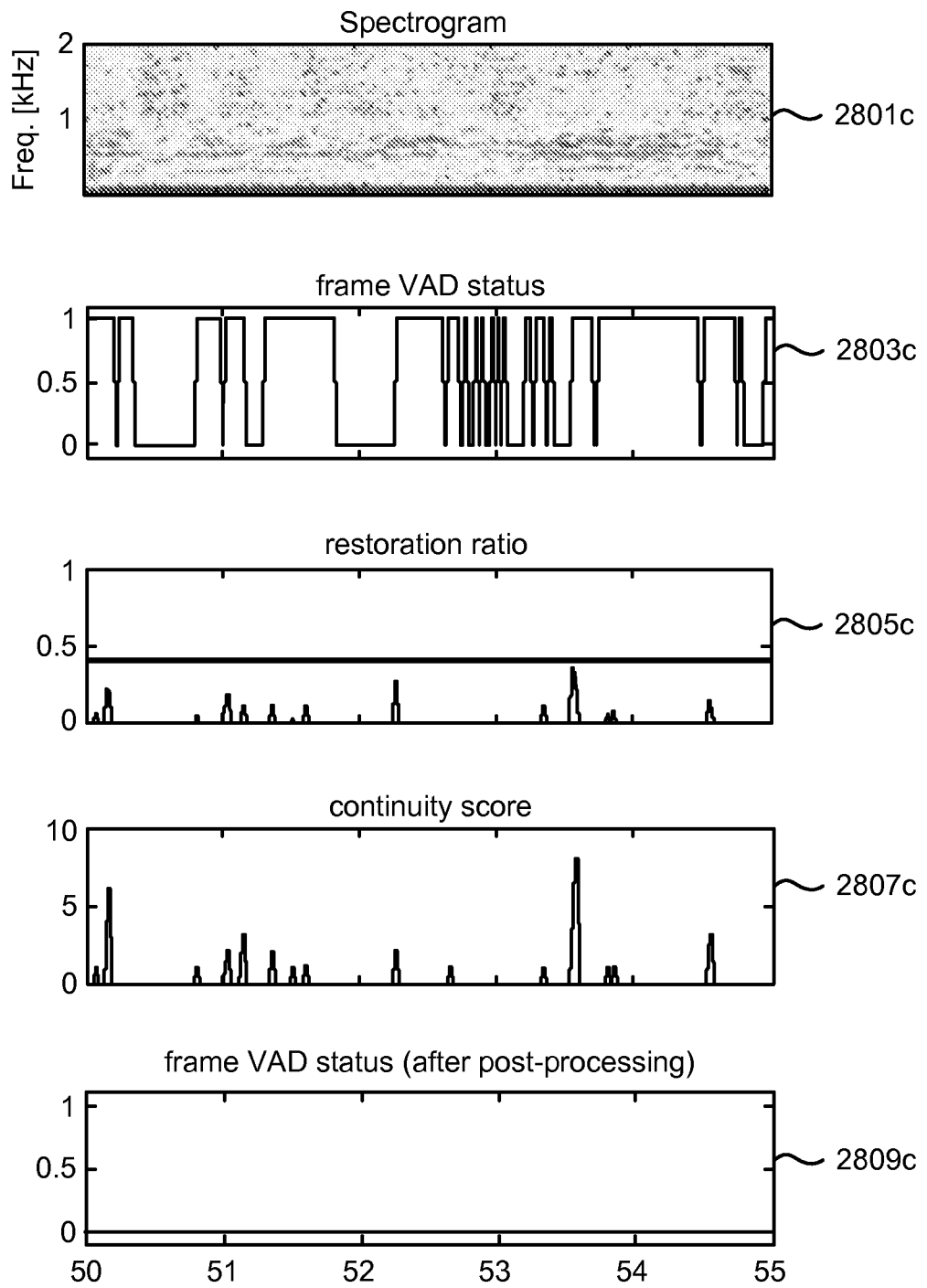
FIG. 28C illustrates another example of post-processing in accordance with the systems and methods disclosed herein.

Examples of post-processing are provided in FIGS. 28A, 28B and 28C. In particular, an example of clean speech is provided in FIG. 28A, where most detected frames are preserved. An example of music noise is also provided in FIG. 28B, where most detected frames are discarded. Furthermore, an example of public noise is provided in FIG. 28C, where all detected frames are discarded.

The post-processing block/module 2093 (e.g., restoration determination block/module 2095) may provide restoration information 2099 to a maximum block/module 2003. For example, in cases where the restoration determination block/module 2095 determines to preserve the restored frame 2091, the restoration information 2099 may include the restored frame 2091 and/or amplitudes, magnitudes or gains corresponding to the restored frame 2091. When restoration is undone (e.g., the restored frame is discarded), the restoration information 2099 may direct the maximum block/module 2003 to pass the noise-suppressed output frame 2001 without scaling.

As illustrated in FIG. 20, the electronic device 2002 may also perform noise suppression (based on audio signal channels 2067 from two or more microphones, for example). The noise suppression block/module 2014 may produce a noise suppression gain and/or a noise-suppressed output frame 2001, which may be provided to the max block/module 2003.

The maximum block/module 2003 may determine a maximum based on the noise suppression gain/noise-suppressed output frame 2001 and the restoration information 2099. For example, the maximum block/module 2003 may determine a bin-wise maximum between the restored frame 2091 and the noise-suppressed output frame 2001. If a restored frame 2091 bin is larger (e.g., has a larger magnitude) than a corresponding noise-suppressed output frame 2001 bin, the maximum block/module 2003 may adjust the gain of (e.g., scale up) the noise-suppressed output frame 2001 bin. For example, the maximum block/module 2003 may apply a gain value to the noise-suppressed output frame 2001 bin that overrides a small noise suppression gain with a larger gain (e.g., a gain of 1). For example, the noise suppression gain 2001 is typically lower than 1. When restoration occurs, the noise reduction gain may be set to 1 in speech harmonic peak bins. Accordingly, the maximum block/module 2003 may perform a maximum operation between two gains (for each bin, for example).

The maximum block/module 2003 may produce an output frame 2005. For example, in cases where the restored frame 2091 is preserved by the post-processing block/module 2093 and one or more bins of the noise-suppressed output frame 2001 are adjusted based on the restored frame 2091, the output frame 2005 may be a gain-adjusted version of the noise-suppressed output frame 2001. For instance, the output frame 2005 may be considered a final restored frame in some cases, which is a frame where the noise suppression gains 2001 (e.g., noise reduction gains) in one or more bins have been overwritten by the peak restoration decision, since it has been determined that these bins are harmonic speech peaks. However, in cases where the restored frame 2091 is discarded (e.g., the restoration is "undone"), the output frame 2005 may be the noise-suppressed output frame 2001 without gain adjustments. One or more of the post-processing block/module 2093 and the maximum block/module 2003 (and/or components thereof) may be circuitry for restoring the processed speech signal based on the bin-wise voice activity detection.

Figure 21:
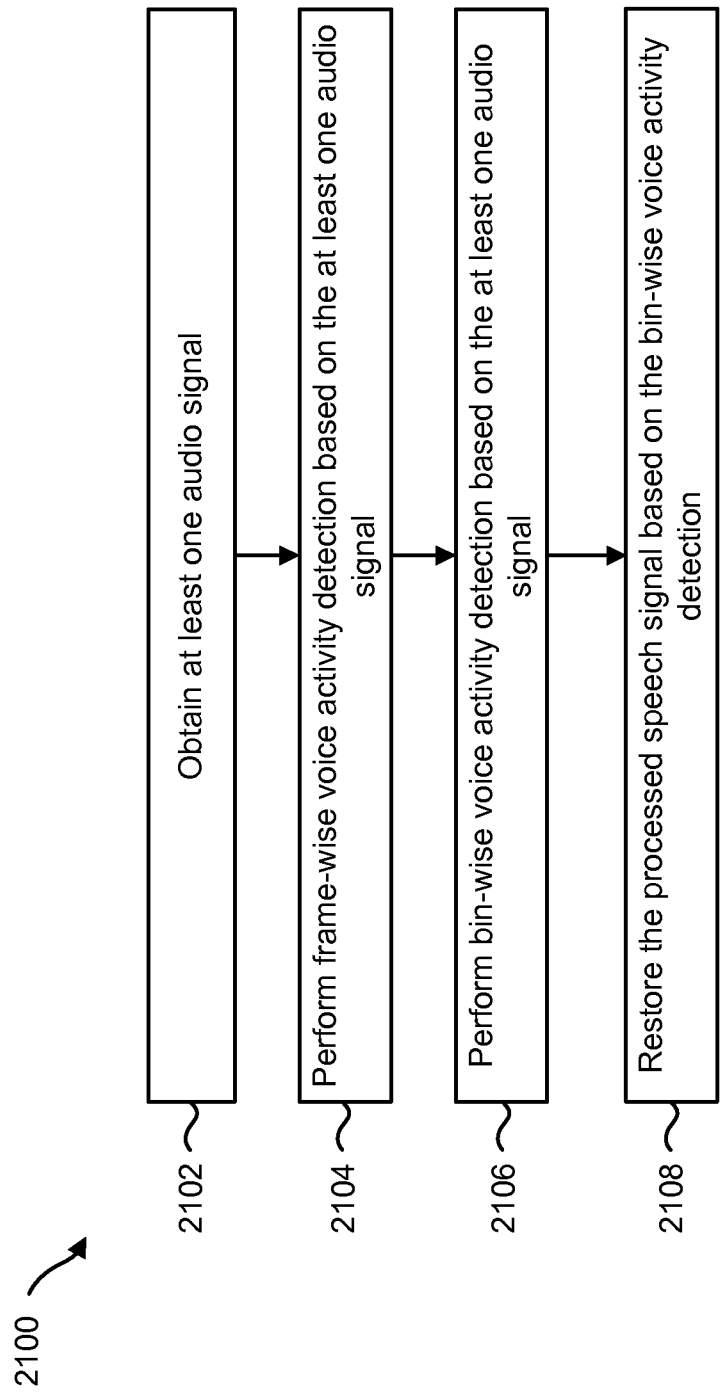
FIG. 21 is a flow diagram illustrating one configuration of a method for restoring a processed speech signal by an electronic device.

FIG. 21 is a flow diagram illustrating one configuration of a method 2100 for restoring a processed speech signal by an electronic device 2002. An electronic device 2002 may obtain 2102 at least one audio signal. For example, the electronic device 2002 may capture an audio signal from at least one microphone.

The electronic device 2002 may perform 2104 frame-wise (e.g., frame-by-frame or frame-based) voice activity detection based on the at least one audio signal. For example, the electronic device 2002 may determine a harmonicity. Performing 2104 the frame-wise voice activity detection may be based on the harmonicity as described above.

The electronic device 2002 may perform 2106 bin-wise (e.g., bin-by-bin or bin-based) voice activity detection based on the at least one audio signal. For example, the electronic device 2002 may perform peak tracking (e.g., determine a peak map) based on the at least one audio signal and may determine a signal-to-noise ratio (SNR) (e.g., minimum statistic or MinStat) based on the at least one audio signal. Performing 2106 the bin-wise voice activity detection (e.g., determining whether voice activity is detected) may be based on the peak map and the SNR as described above. In some configurations, bin-wise activity detection may be performed 2106 only for frames indicated by the frame-wise voice activity detection. In other words, the electronic device 2002 may perform 2106 bin-wise voice activity detection based on the at least one audio signal if the frame-wise voice activity detection indicates voice or speech. In other configurations, bin-wise voice activity detection may be performed 2106 for all frames.

The electronic device 2002 may restore 2108 a processed speech signal based on the bin-wise voice activity detection. For example, restoring 2108 a processed speech signal may mean restoring speech content (e.g., harmonic content) in an audio signal. In particular, one purpose of the systems and methods disclosed herein is to restore harmonic speech content when suppressed by noise reduction but not to restore other harmonic signals (e.g., music, etc.). As described above, restoring 2108 the processed speech signal may be conditional based on the bin-wise voice activity detection (e.g., based on one or more parameters determined from a restored frame). In some configurations, restoring 2108 a processed speech signal based on the bin-wise voice activity detection may include removing one or more peaks (e.g., detected noise peaks) from a transformed audio signal based on the bin-wise voice activity detection to produce a restored frame, as described above.

Additionally or alternatively, restoring 2108 a processed speech signal may include determining one or more parameters (e.g., a restoration ratio and/or a continuity metric), as described above. Furthermore, determining whether to restore the processed speech signal may be based on the parameters (e.g., restoration ratio and/or the continuity metric) as described above. In some configurations, the electronic device 2002 may additionally determine whether one or more abnormal peaks are detected and/or whether a stationary low SNR meets at least one threshold as described above. Determining whether to restore the processed speech signal may be additionally or alternatively based on whether abnormal peak(s) are detected and/or whether the stationary low SNR meets at least one threshold.

In some configurations, it may be determined to restore the processed speech signal as follows. If a restoration ratio meets a threshold (e.g., the restoration ratio is at least equal to a restoration ratio threshold) and an abnormal peak is not detected, the electronic device 2002 may restore the processed speech signal. If a continuity metric meets a threshold (e.g., the continuity metric is at least equal to a continuity metric threshold), the electronic device 2002 may restore the processed speech signal. If a stationary low SNR meets at least one threshold (e.g., the mean of a minimum statistic sum is at least equal to a minimum statistic threshold and variation is below a variation threshold), the electronic device 2002 may restore the processed speech signal. In any other case, the electronic device 2002 may avoid restoring (e.g., not restore) the processed speech signal (e.g., to undo the restored frame). Accordingly, determining whether to restore the processed speech signal may be based on one or more of a restoration ratio, continuity metric, abnormal peak detection and a stationary low SNR condition.

In some configurations, the processed speech signal may be a noise-suppressed output frame 2001. For example, in cases where it is determined to restore the processed speech signal, the electronic device 2002 may restore 2108 the processed speech signal by adjusting the gain of one or more bins of a noise-suppressed output frame 2001 based on a restored frame 2091. For example, the electronic device 2002 may determine a maximum (magnitude, amplitude, gain, etc., for instance) between each bin of the noise-suppressed output frame 2001 and the restored frame 2091. The electronic device 2002 may then adjust the gain of bins in which the restored frame 2091 bins are greater, for example. This may help to restore speech content in the noise-suppressed output frame 2001 that have been suppressed by noise suppression. In other cases, however, the electronic device 2002 may discard the restored frame 2091 as determined based on the parameter(s) that are based on the bin-wise VAD (e.g., the restored frame 2091).

Figure 22:
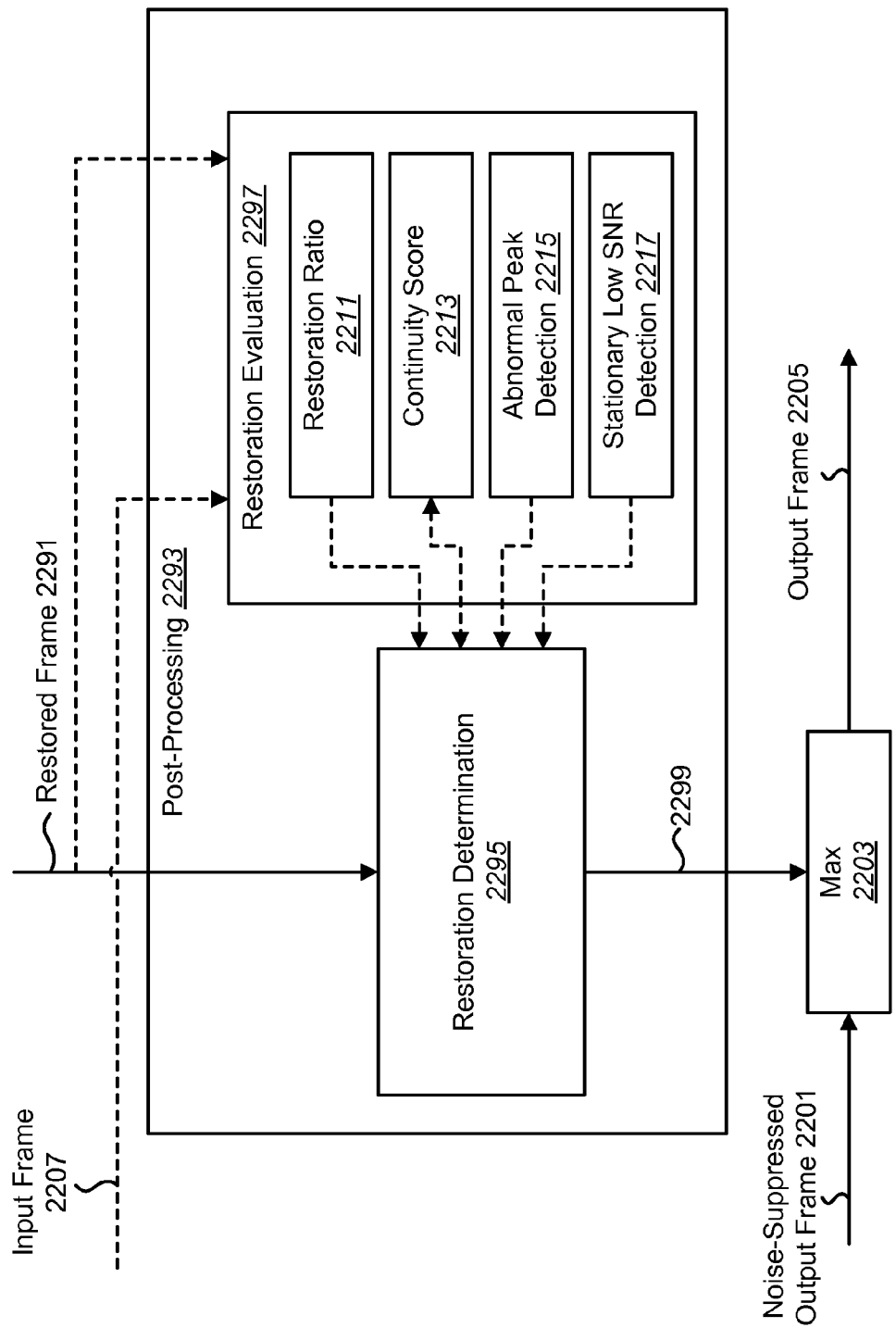
FIG. 22 is a block diagram illustrating a more specific example of post-processing.

FIG. 22 is a block diagram illustrating a more specific example of post-processing in accordance with the systems and methods disclosed herein. In particular, FIG. 22 illustrates one example of a post-processing block/module 2293. The post-processing block/module 2293 may obtain an input frame 2207 and a restored frame 2291. The post-processing block/module 2293 may include a restoration evaluation block/module 2297 and/or a restoration determination block/module 2295.

The restoration evaluation block/module 2297 may determine a restoration ratio 2211, determine a continuity metric (e.g., score) 2213, detect any abnormal peak(s) 2215 and/or determine whether a stationary low SNR 2217 meets at least one threshold based on the input frame 2207 and the restored frame 2291 as described above. The post-processing block/module 2293 may determine to preserve the restored frame 2291 if the restoration ratio meets a threshold (and no abnormal frame is detected, for example) or if the continuity metric meets a threshold or if the stationary low SNR meets at least one threshold. Otherwise, the post-processing block/module 2293 may determine to not restore the processed speech signal (e.g., undo the restoration or discard the restored frame).

Restoration information 2299 (e.g., the restored frame 2291 in cases where it is determined to restore the processed speech signal) may be compared with a noise-suppressed output frame 2201 by a max block/module 2203. The maximum of these frames may be provided as an output frame 2205. For example, the maximum of each bin between the restored frame 2291 and the noise-suppressed output frame may be applied to a noise suppression gain. More specifically, if restoration occurs, a small noise suppression gain may be overridden with a gain of 1 for each bin that is larger in the restored frame 2291. The maximum block/module 2203 accordingly performs a "max" operation.

Figure 23:
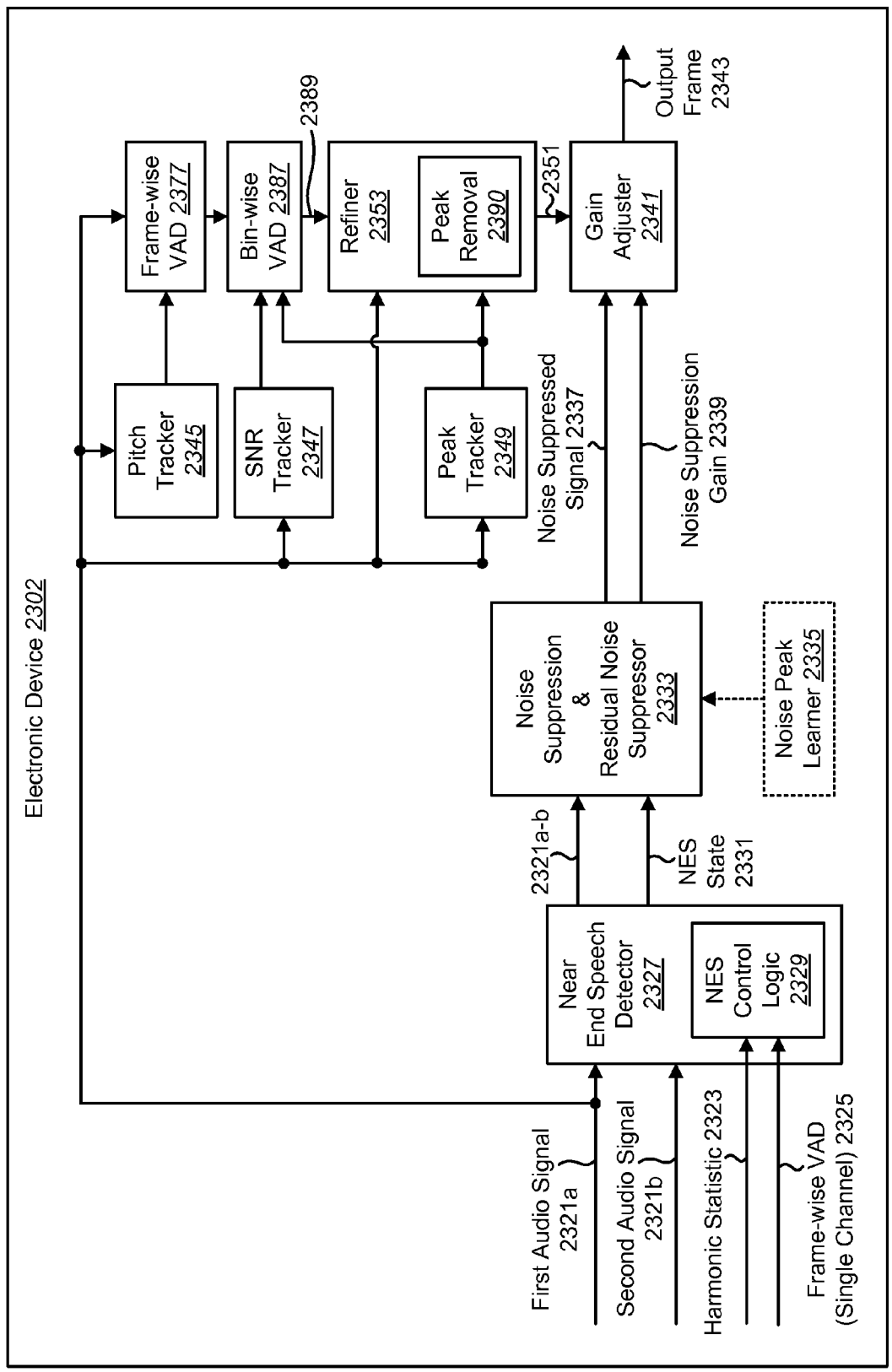
FIG. 23 is a block diagram illustrating a more specific configuration of an electronic device in which systems and methods for restoring a processed speech signal may be implemented.

FIG. 23 is a block diagram illustrating a more specific configuration of an electronic device 2302 in which systems and methods for restoring a processed speech signal may be implemented. The electronic device 2302 may include one or more of a peak tracker 2349, a pitch tracker 2345, a noise peak learner 2335, an echo cancellation/noise suppression block/module & residual noise suppressor 2333 and/or a gain adjuster 2341. In some configurations, one or more of these elements may be configured similarly to and/or operate similarly to corresponding elements described above in connection with FIG. 4.

The electronic device 2302 may also include a near-end speech (NES) detector 2327 (with NES control logic 2329), a refiner 2353 (which may include a peak removal block/module 2390 in some configurations), an SNR tracker 2347, a frame-wise VAD 2377, a bin-wise VAD 2387. The SNR tracker 2347 may operate in accordance with the SNR (Min-Stat) block/module 2085 described above in connection with FIG. 20. The peak tracker 2349 may operate in accordance with the peak map block/module 2083 described above in connection with FIG. 20. In this example, the pitch tracker 2345 may perform the frame-wise processing described above in connection with FIG. 20 to compute harmonicity information. The pitch tracker 2345, SNR tracker 2347 and peak tracker 2349 may operate based on a first audio signal 2321a. In some configurations, the first audio signal 2321a may be statically configured (e.g., may come from one microphone) or may be selected from a group of audio signals (that includes the second audio signal 2321b, for example) similar to the primary channel 2065 described above in connection with the FIG. 20. The refiner block/module 2353 may include the post-processing block/module 2093 described above in connection with FIG. 20. For example, the refiner block/module 2353 may perform one or more of the operations described in connection with the post-processing block/module 2093 in FIGS. 20 and/or 22 described above.

As illustrated in FIG. 23, the near-end speech detector 2327 may detect near-end speech based on one or more audio signals 2321a-b. Additionally, the near-end speech (NES) control logic 2329 may provide control based on the harmonic statistic 2323 and the frame-wise VAD 2325 (single channel, for example). The near-end speech detector 2327 may provide one or more of the audio signals 2321a-b and/or a NES state 2331 to the noise suppression block/module & residual noise suppressor 2333. In some configurations, the NES state 2331 may indicate a single-mic state or a multi-mic (e.g., dual-mic) state.

The noise suppression block/module & residual noise suppressor 2333 may provide a noise-suppressed signal 2337 and a noise suppression gain 2339 to the gain adjuster 2341. In some configurations, the noise suppression & residual noise suppressor 2333 may include adaptive beamformer (ABF) functionality. For example, the noise suppression & residual noise suppressor 2333 may perform beamforming operations in order to suppress noise in the audio signal(s) 2321a-b. In other words, the noise suppressed signal 2337 may be based on adaptive beamforming in some configurations. The gain adjuster 2341 may provide the "max" functionality described in connection with one or more of FIGS. 20 and 22. For example, the gain adjuster 2341 may compare the noise suppression gain 2339 with the restoration information 2351 (e.g., gains corresponding to the restored frame) in order to produce the output frame 2343.

The bin-wise VAD 2387 may provide a bin-wise voice indicator 2389 (e.g., a bin-wise VAD signal) to the refiner 2353 (e.g., the peak removal block/module 2390). The bin-wise voice indicator 2389 may indicate particular bins (e.g., peaks) that do not include speech. The bin-wise voice indicator 2389 (e.g., bin-wise VAD signal) may be based on energy in a frequency bin. The peak removal block/module 2390 may be one example of the peak removal block/module 2090 described above in connection with FIG. 20. The peak removal block/module 2090 may remove non-speech peaks.

Refinement may occur in the refiner 2353. The first audio signal 2321a may include gain with spectral peaks before the refinement (which may be a bit messy, especially for harmonic noise such as music). The refiner 2353 may be circuitry for refining a speech signal (e.g., the first audio signal 2321a) based on a harmonicity metric (e.g., harmonicity information provided by the pitch tracker 2345). The refiner 2353 may produce a replacement signal (e.g., restored frame). In some configurations, for example, refinement may include removing non-speech peaks from the first audio signal 2321a. As described above, the replacement signal (e.g., restored frame) may be based on the bin-wise VAD signal 2389. The refiner 2353 may generate restoration information 2351 (e.g., the replacement signal, restored frame and/or information corresponding to the replacement signal or restored frame (e.g., one or more gains)). The refiner 2353 may provide the restoration information 2351 to the gain adjuster. In some configurations, the restoration information 2351 may include a gain with spectral peaks after the refinement by "undoing" the restoration for wrongly restored portions of the restored frame. For example, one or more frames may be restored based on frame harmonicity and bin-wise conditions. Frames may be typically restored based on the frame harmonicity and bin-wise conditions. However, if post-processing of the harmonicity conditions further determines that this was the wrong decision, then the basic restoration decision is undone. It should be noted that the refiner may correspond to the post-processing block in one or more of FIGS. 20 and 22.

Dual or single microphone state switching may occur before the entire noise suppression processing, and the speech restoration may not be dependent on the state. The refiner 2353 may provide restored speech or undo the restoration if the desired speech is suppressed in some frequency bins, for example.

In some configurations, the gain adjuster 2341 may be circuitry for replacing a noise suppressed speech frame (e.g., the noise suppressed signal 2337) based on the replacement signal. For example, the gain adjuster 2341 may adjust the noise suppression gain(s) 2339 of the noise suppressed signal 2337 in order to produce the output frame 2343. In some configurations, the electronic device 2302 may accordingly refine a speech signal based on a harmonicity metric to produce a replacement signal and may replace a noise-suppressed speech frame based on the replacement signal. The replacement signal may be based on a bin-wise VAD signal, which may be based on energy in a frequency bin.

Figure 24:
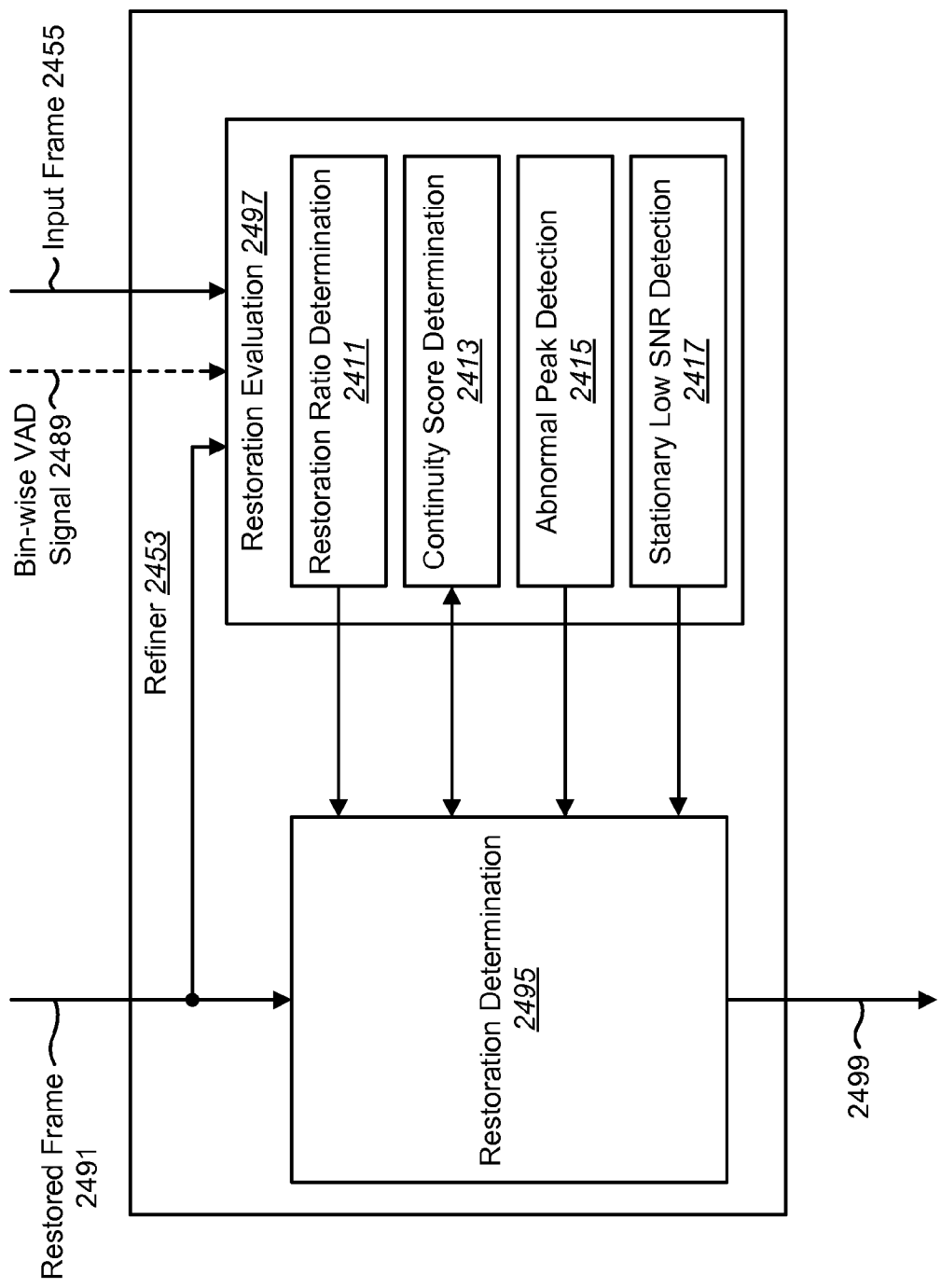
FIG. 24 is a block diagram illustrating one configuration of a refiner.

FIG. 24 is a block diagram illustrating one configuration of a refiner 2453. The refiner 2453 may be one example of one or more of the post-processing blocks/modules and refiner 2453 described in connection with one or more of FIGS. 20, 22 and 23. The refiner 2453 may obtain an input frame 2455 and a restored frame 2491. For example, the refiner 2453 may obtain and analyze the restored frame 2491. In some configurations, the refiner 2453 may optionally obtain a bin-wise VAD signal 2489. The refiner 2453 may include a restoration evaluation block/module 2497 and a restoration determination block/module 2495.

The restoration evaluation block/module 2497 may include a restoration ratio determination block/module 2411, a continuity score determination block/module 2413, an abnormal peak detection block/module 2415 and a stationary low SNR detection block/module 2417. The restoration ratio determination block/module 2411 may determine a restoration ratio based on the restored frame 2491 and the input frame 2455. For example, the restoration ratio may be the ratio between the sum of restored FFT magnitudes and the sum of the original FFT magnitude at each frame.

The continuity score determination block/module 2413 may determine a continuity metric or score based on current and past frame restorations. For example, the continuity score determination may add a first positive value (e.g., +2) if both the current and previous frames are restored, a second positive value (e.g., +1) if the current frame is restored but the previous frame is not restored and a negative value (e.g., −1) if the previous frame is restored but the current frame is not restored. Different weights may be assigned to the positive and negative values based on the implementation. For example, if both current and previous frames are restored, the first positive value could be +2.4. The continuity score determination block/module may sum up the scores of all bins to obtain the continuity score for each frame. The frame-wise continuity score may be reset to zero when a frame is not restored.

The abnormal peak detection block/module 2415 may detect any abnormal peak(s). For example, the abnormal peak detection block/module may detect cases where under a threshold number of (e.g., only one or two) peaks are restored.

The stationary low SNR detection block/module 2417 may detect a stationary low SNR condition. This may occur if the mean of a minimum statistic (e.g., MinStat) sum is high and the variation is low.

The restoration determination block/module 2495 may determine to preserve the restored frame 2491 if the restoration ratio meets a threshold (and no abnormal frame is detected, for example) or if the continuity metric meets a threshold or if the stationary low SNR meets at least one threshold. Otherwise, the restoration determination block/module 2495 may determine to not restore the processed speech signal (e.g., undo the restoration or discard the restored frame 2491). In this case, the restoration determination block/module 2495 may discard the restored frame 2491. In some configurations, the refiner 2453 may determine whether the restored frame 2491 will be used or not. Accordingly, in the cases where the refiner 2453 determines to preserve the restored frame 2491, it may provide the final restored frame 2499. It should be noted that a restored frame 2491 may include one or more frequency bins that have been replaced or restored. For example, a frame can be restored on a bin-wise basis to produce a restored frame 2491 in some configurations.

Figure 25:
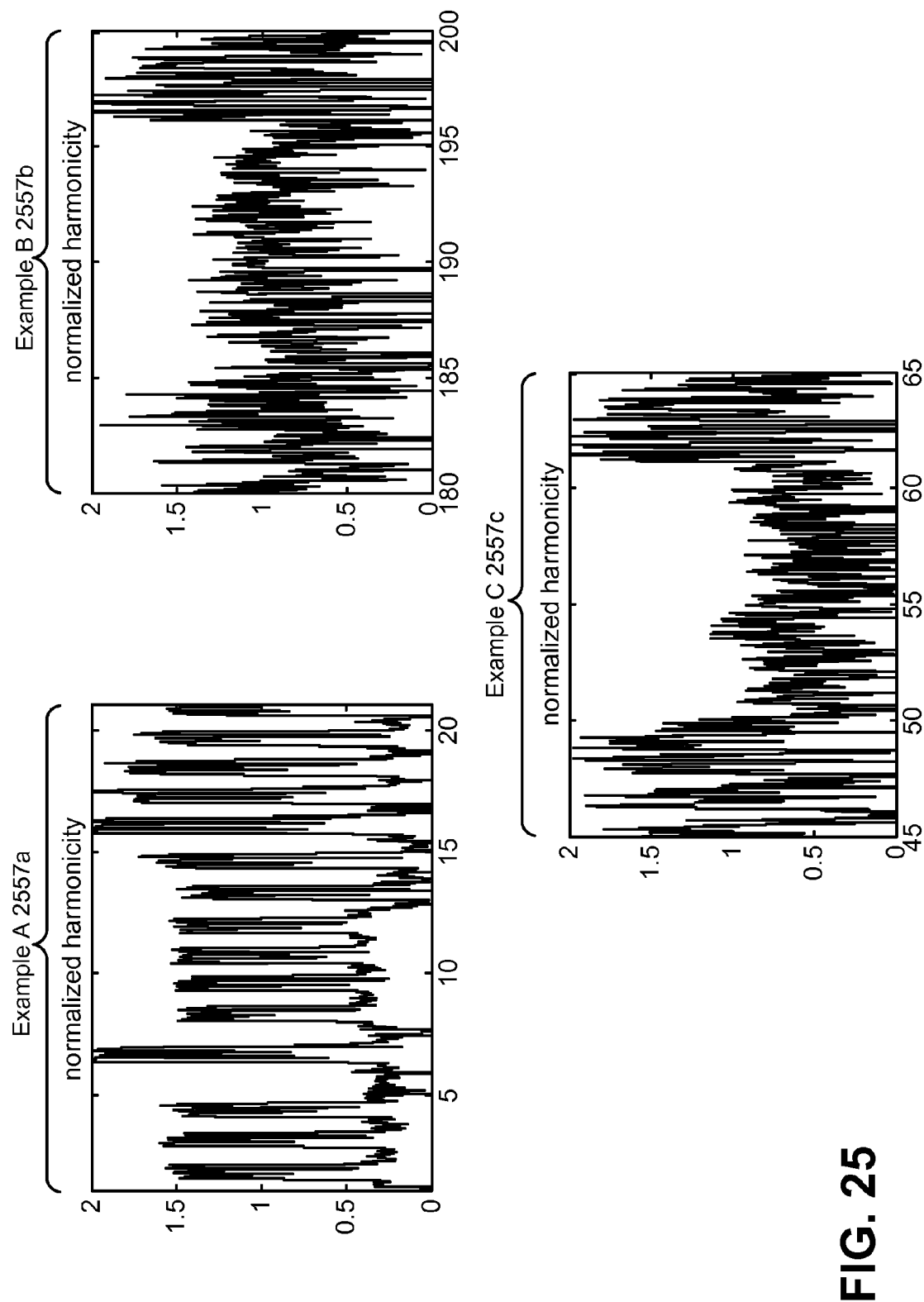
FIG. 25 illustrates examples of normalized harmonicity in accordance with the systems and methods disclosed herein.

FIG. 25 illustrates examples of normalized harmonicity in accordance with the systems and methods disclosed herein. In particular, example A 2557*a* illustrates a normalized harmonicity of clean speech during rotation. Example B 2557*b* illustrates a normalized harmonicity of speech+music/music only/speech only. Furthermore, Example C 2557*c* illustrates a normalized harmonicity of speech+public noise/public noise only/speech only. The horizontal axes of the graphs illustrated in examples A-C 2557*a-c* are given in frequency. The vertical axes of the graphs illustrated in examples A-C 2557*a-c* provide a measure of the normalized harmonicities, although harmonicity is a dimensionless metric measuring the degree of periodicity (in the frequency direction as illustrated).

Figure 26:
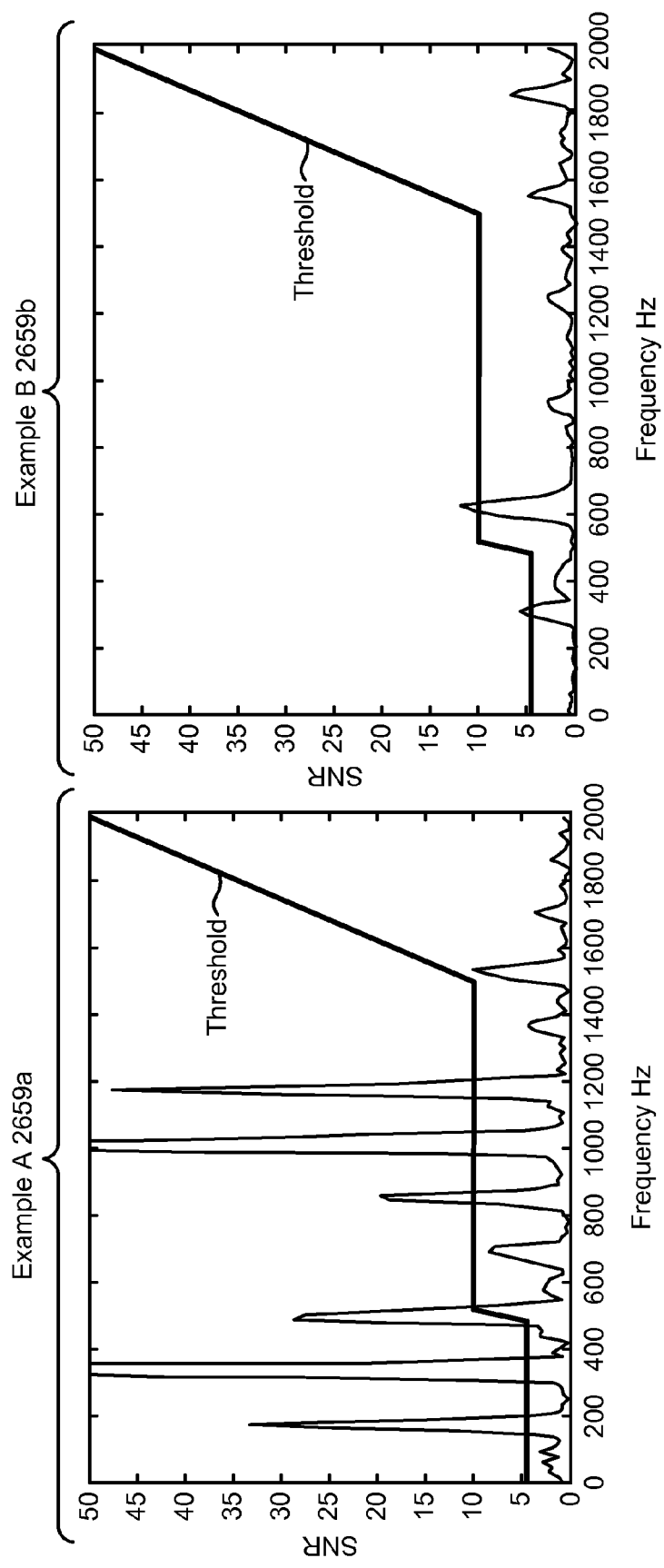
FIG. 26 illustrates examples of frequency-dependent thresholding in accordance with the systems and methods disclosed herein.

FIG. 26 illustrates examples of frequency-dependent thresholding in accordance with the systems and methods disclosed herein. In particular, example A 2659*a* illustrates SNR in one clean speech muting frame. Example A 2659*a* also illustrates a frequency dependent threshold. Example B 2659*b* illustrates SNR in one music noise frame. Example B 2659*b* also illustrates a frequency dependent threshold.

The non-linear thresholds illustrated in FIG. 26 may be utilized to restore more perceptually dominant voice frequency bands. Furthermore, the threshold may be increased at the onset of musical sounds (using high-frequency content, for example). Additionally, the threshold may be decreased when an input signal level is too low (e.g., in soft speech).

Figure 27:
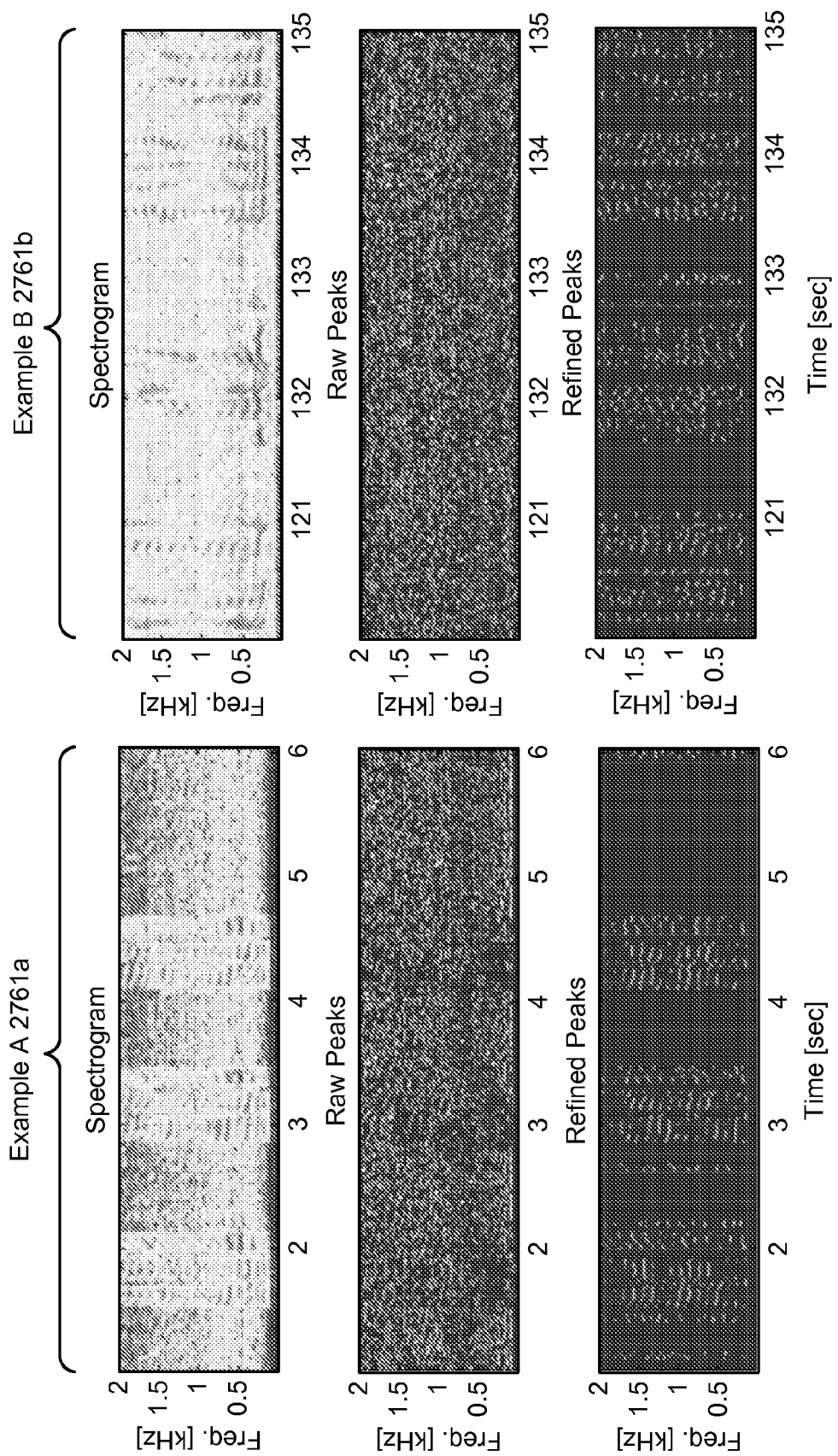
FIG. 27 illustrates examples of peak maps in accordance with the systems and methods disclosed herein.

FIG. 27 illustrates examples of peak maps in accordance with the systems and methods disclosed herein. In particular, example A 2761*a* illustrates a spectrogram, raw peaks and refined peaks in a clean speech signal. Example B 2761*b* illustrates a spectrogram, raw peaks and refined peaks in a noisy speech signal (with pink noise, for example). The graphs in FIG. 27 are illustrated in units of kilohertz (kHz) on the vertical axes and time in seconds on the horizontal axes.

FIG. 28A illustrates an example of post-processing in accordance with the systems and methods disclosed herein. In particular, this example illustrates a spectrogram graph 2801*a*, a frame VAD status graph 2803*a*, a restoration ratio graph 2805*a* (with a threshold), a continuity score graph 2807*a* and a frame VAD status after post-processing graph 2809*a* for a clean speech signal. In this example, most detected frames are preserved.

The horizontal axes of the graphs in FIG. 28A are illustrated in time. The vertical axis of the spectrogram graph 2801*a* is illustrated in frequency (kHz). In the frame VAD status graph 2803*a* and the frame VAD status after post-processing graph 2809*a*, a value of 1 on the vertical axes denotes a frame with detected voice, while a value of 0 on the vertical axes denotes a frame without detected voice. As illustrated in FIG. 28A, the systems and methods described herein may help to refine the VAD status via post-processing (e.g., remove false voice detections). The vertical axis of the restoration ratio graph 2805*a* denotes a dimensionless value that indicates a ratio of a restored frame FFT magnitude sum divided by an original frame FFT magnitude sum. In this example, the restoration ratio threshold is illustrated at 40%. The vertical axis of the continuity score graph 2807*a* denotes a dimensionless value that indicates a degree of restoration continuity as described above.

FIG. 28B illustrates another example of post-processing in accordance with the systems and methods disclosed herein. In particular, this example illustrates a spectrogram graph 2801*b*, a frame VAD status graph 2803*b*, a restoration ratio graph 2805*b* (with a threshold), a continuity score graph 2807*b* and a frame VAD status after post-processing graph 2809*b* for music noise. In this example, most detected frames are discarded.

The horizontal axes of the graphs in FIG. 28B are illustrated in time. The vertical axis of the spectrogram graph 2801*b* is illustrated in frequency (kHz). In the frame VAD status graph 2803*b* and the frame VAD status after post-processing graph 2809*b*, a value of 1 on the vertical axes denotes a frame with detected voice, while a value of 0 on the vertical axes denotes a frame without detected voice. As illustrated in FIG. 28B, the systems and methods described herein may help to refine the VAD status via post-processing (e.g., remove false voice detections). The vertical axis of the restoration ratio graph 2805b denotes a dimensionless value that indicates a ratio of a restored frame FFT magnitude sum divided by an original frame FFT magnitude sum. In this example, the restoration ratio threshold is illustrated at 40%. The vertical axis of the continuity score graph 2807b denotes a dimensionless value that indicates a degree of restoration continuity as described above.

FIG. 28C illustrates another example of post-processing in accordance with the systems and methods disclosed herein. In particular, this example illustrates a spectrogram graph 2801c, a frame VAD status graph 2803c, a restoration ratio graph 2805c (with a threshold), a continuity score graph 2807c and a frame VAD status after post-processing graph 2809c for public noise. In this example, all detected frames are discarded.

The horizontal axes of the graphs in FIG. 28C are illustrated in time. The vertical axis of the spectrogram graph 2801c is illustrated in frequency (kHz). In the frame VAD status graph 2803c and the frame VAD status after post-processing graph 2809c, a value of 1 on the vertical axes denotes a frame with detected voice, while a value of 0 on the vertical axes denotes a frame without detected voice. As illustrated in FIG. 28C, the systems and methods described herein may help to refine the VAD status via post-processing (e.g., remove false voice detections). The vertical axis of the restoration ratio graph 2805c denotes a dimensionless value that indicates a ratio of a restored frame FFT magnitude sum divided by an original frame FFT magnitude sum. In this example, the restoration ratio threshold is illustrated at 40%. The vertical axis of the continuity score graph 2807c denotes a dimensionless value that indicates a degree of restoration continuity as described above.

Figure 29:
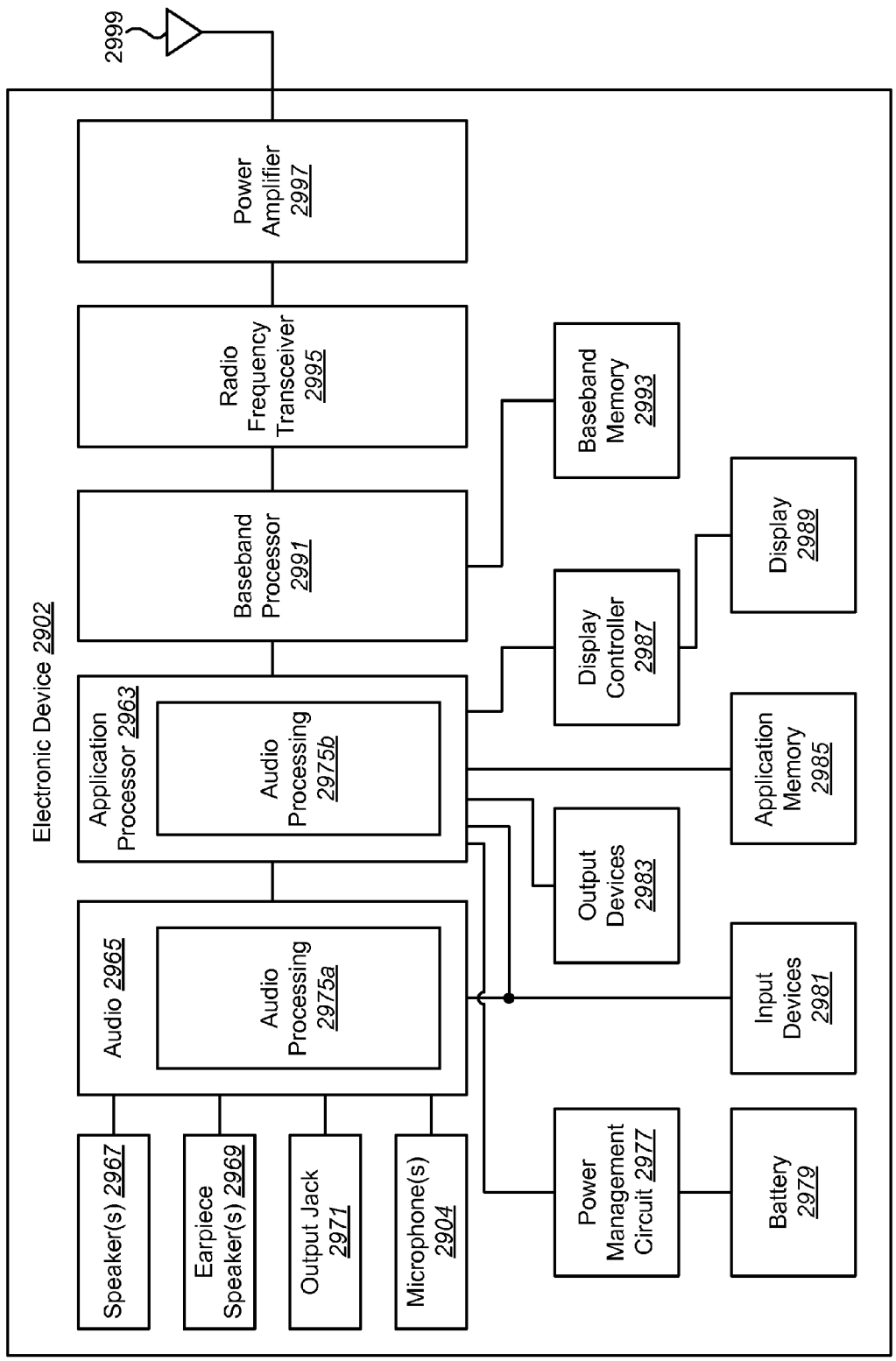
FIG. 29 is a block diagram illustrating one configuration of several components in an electronic device in which systems and methods for signal level matching and detecting voice activity may be implemented.

FIG. 29 is a block diagram illustrating one configuration of several components in an electronic device 2902 in which systems and methods for signal level matching and detecting voice activity may be implemented. As described above, one example of the electronic device 2902 may be a wireless communication device. Examples of wireless communication devices include cellular phones, smartphones, laptop computers, personal digital assistants (PDAs), digital music players, digital cameras, digital camcorders, game consoles, etc. The electronic device 2902 may be capable of communicating wirelessly with one or more other devices. The electronic device 2902 may include an application processor 2963. The application processor 2963 generally processes instructions (e.g., runs programs) to perform functions on the electronic device 2902. The application processor 2963 may be coupled to an audio block/module 2965.

The audio block/module 2965 may be an electronic device (e.g., integrated circuit) used for processing audio signals. For example, the audio block/module 2965 may include an audio codec for coding and/or decoding audio signals. The audio block/module 2965 may be coupled to one or more speakers 2967, one or more earpiece speakers 2969, an output jack 2971 and/or one or more microphones 2904. The speakers 2967 may include one or more electro-acoustic transducers that convert electrical or electronic signals into acoustic signals. For example, the speakers 2967 may be used to play music or output a speakerphone conversation, etc. The one or more earpiece speakers 2969 may include one or more speakers or electro-acoustic transducers that can be used to output acoustic signals (e.g., speech signals, ultrasonic signals, noise control signals, etc.) to a user. For example, one or more earpiece speakers 2969 may be used such that only a user may reliably hear an acoustic signal generated by the earpiece speakers 2969. The output jack 2971 may be used for coupling other devices to the electronic device 2902 for outputting audio, such as headphones. The speakers 2967, one or more earpiece speakers 2969 and/or the output jack 2971 may generally be used for outputting an audio signal from the audio block/module 2965. The one or more microphones 2904 may be acousto-electric transducers that convert an acoustic signal (such as a user's voice) into electrical or electronic signals that are provided to the audio block/module 2965.

An audio processing block/module 2975a may be optionally implemented as part of the audio block/module 2965. For example, the audio processing block/module 2975a may be implemented in accordance with one or more of the functions and/or structures described herein.

Additionally or alternatively, an audio processing block/module 2975b may be implemented in the application processor 2963. For example, the audio processing block/module 2975b may be implemented in accordance with one or more of the functions and/or structures described herein.

The application processor 2963 may be coupled to a power management circuit 2977. One example of a power management circuit 2977 is a power management integrated circuit (PMIC), which may be used to manage the electrical power consumption of the electronic device 2902. The power management circuit 2977 may be coupled to a battery 2979. The battery 2979 may generally provide electrical power to the electronic device 2902. It should be noted that the power management circuit 2977 and/or the battery 2979 may be coupled to one or more of the elements (e.g., all) included in the electronic device 2902.

The application processor 2963 may be coupled to one or more input devices 2981 for receiving input. Examples of input devices 2981 include infrared sensors, image sensors, accelerometers, touch sensors, force (e.g., pressure) sensors, keypads, microphones, input ports/jacks, etc. The input devices 2981 may allow user interaction with the electronic device 2902. The application processor 2963 may also be coupled to one or more output devices 2983. Examples of output devices 2983 include printers, projectors, screens, haptic devices, speakers, etc. The output devices 2983 may allow the electronic device 2902 to produce an output that may be experienced by a user.

The application processor 2963 may be coupled to application memory 2985. The application memory 2985 may be any electronic device that is capable of storing electronic information. Examples of application memory 2985 include double data rate synchronous dynamic random access memory (DDRAM), synchronous dynamic random access memory (SDRAM), flash memory, etc. The application memory 2985 may provide storage for the application processor 2963. For instance, the application memory 2985 may store data and/or instructions for the functioning of programs that are run on the application processor 2963. In one configuration, the application memory 2985 may store and/or provide data and/or instructions for performing one or more of the methods described herein.

The application processor 2963 may be coupled to a display controller 2987, which in turn may be coupled to a display 2989. The display controller 2987 may be a hardware block that is used to generate images on the display 2989. For example, the display controller 2987 may translate instructions and/or data from the application processor 2963 into images that can be presented on the display 2989. Examples of the display 2989 include liquid crystal display (LCD)

panels, light emitting diode (LED) panels, cathode ray tube (CRT) displays, plasma displays, etc.

The application processor 2963 may be coupled to a baseband processor 2991. The baseband processor 2991 generally processes communication signals. For example, the baseband processor 2991 may demodulate and/or decode received signals. Additionally or alternatively, the baseband processor 2991 may encode and/or modulate signals in preparation for transmission.

The baseband processor 2991 may be coupled to baseband memory 2993. The baseband memory 2993 may be any electronic device capable of storing electronic information, such as SDRAM, DDRAM, flash memory, etc. The baseband processor 2991 may read information (e.g., instructions and/or data) from and/or write information to the baseband memory 2993. Additionally or alternatively, the baseband processor 2991 may use instructions and/or data stored in the baseband memory 2993 to perform communication operations.

The baseband processor 2991 may be coupled to a radio frequency (RF) transceiver 2995. The RF transceiver 2995 may be coupled to one or more power amplifiers 2997 and one or more antennas 2999. The RF transceiver 2995 may transmit and/or receive radio frequency signals. For example, the RF transceiver 2995 may transmit an RF signal using a power amplifier 2997 and one or more antennas 2999. The RF transceiver 2995 may also receive RF signals using the one or more antennas 2999.

Figure 30:
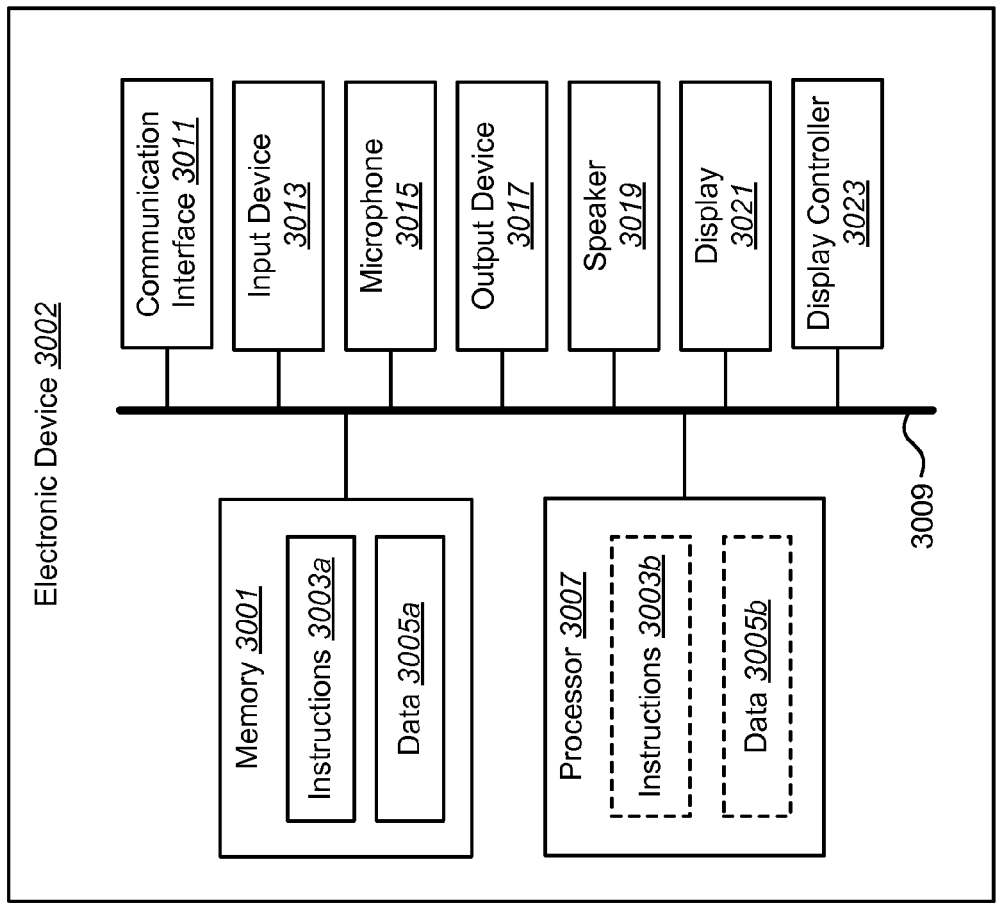
FIG. 30 illustrates various components that may be utilized in an electronic device.

FIG. 30 illustrates various components that may be utilized in an electronic device 3002. The illustrated components may be located within the same physical structure or in separate housings or structures. In some configurations, one or more of the devices or electronic devices described herein may be implemented in accordance with the electronic device 3002 illustrated in FIG. 30. The electronic device 3002 includes a processor 3007. The processor 3007 may be a general purpose single- or multi-chip microprocessor (e.g., an ARM), a special purpose microprocessor (e.g., a digital signal processor (DSP)), a microcontroller, a programmable gate array, etc. The processor 3007 may be referred to as a central processing unit (CPU). Although just a single processor 3007 is shown in the electronic device 3002 of FIG. 30, in an alternative configuration, a combination of processors 3007 (e.g., an ARM and DSP) could be used.

The electronic device 3002 also includes memory 3001 in electronic communication with the processor 3007. That is, the processor 3007 can read information from and/or write information to the memory 3001. The memory 3001 may be any electronic component capable of storing electronic information. The memory 3001 may be random access memory (RAM), read-only memory (ROM), magnetic disk storage media, optical storage media, flash memory devices in RAM, on-board memory included with the processor 3007, programmable read-only memory (PROM), erasable programmable read-only memory (EPROM), electrically erasable PROM (EEPROM), registers, and so forth, including combinations thereof.

Data 3005a and instructions 3003a may be stored in the memory 3001. The instructions 3003a may include one or more programs, routines, sub-routines, functions, procedures, etc. The instructions 3003a may include a single computer-readable statement or many computer-readable statements. The instructions 3003a may be executable by the processor 3007 to implement one or more of the methods or functions described herein. Executing the instructions 3003a may involve the use of the data 3005a that is stored in the memory 3001. FIG. 30 shows some instructions 3003b and data 3005b being loaded into the processor 3007 (which may originate from instructions 3003a and data 3005a).

The electronic device 3002 may also include one or more communication interfaces 3011 for communicating with other electronic devices. The communication interface 3011 may be based on wired communication technology, wireless communication technology, or both. Examples of different types of communication interfaces 3011 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The electronic device 3002 may also include one or more input devices 3013 and one or more output devices 3017. Examples of different kinds of input devices 3013 include a keyboard, mouse, microphone, remote control device, button, joystick, trackball, touchpad, lightpen, etc. For instance, the electronic device 3002 may include one or more microphones 3015 for capturing acoustic signals. In one configuration, a microphone 3015 may be a transducer that converts acoustic signals (e.g., voice, speech, noise, etc.) into electrical or electronic signals. Examples of different kinds of output devices 3017 include a speaker, printer, etc. For instance, the electronic device 3002 may include one or more speakers 3019. In one configuration, a speaker 3019 may be a transducer that converts electrical or electronic signals into acoustic signals.

One specific type of output device 3017 that may be included in an electronic device 3002 is a display device 3021. Display devices 3021 used with configurations disclosed herein may utilize any suitable image projection technology, such as a cathode ray tube (CRT), liquid crystal display (LCD), light-emitting diode (LED), gas plasma, electroluminescence, or the like. A display controller 3023 may also be provided, for converting data 3005a stored in the memory 3001 into text, graphics, and/or moving images (as appropriate) shown on the display device 3021.

The various components of the electronic device 3002 may be coupled together by one or more buses, which may include a power bus, a control signal bus, a status signal bus, a data bus, etc. For simplicity, the various buses are illustrated in FIG. 30 as a bus system 3009. It should be noted that FIG. 30 illustrates only one possible configuration of an electronic device 3002. Various other architectures and components may be utilized.

Figure 31:
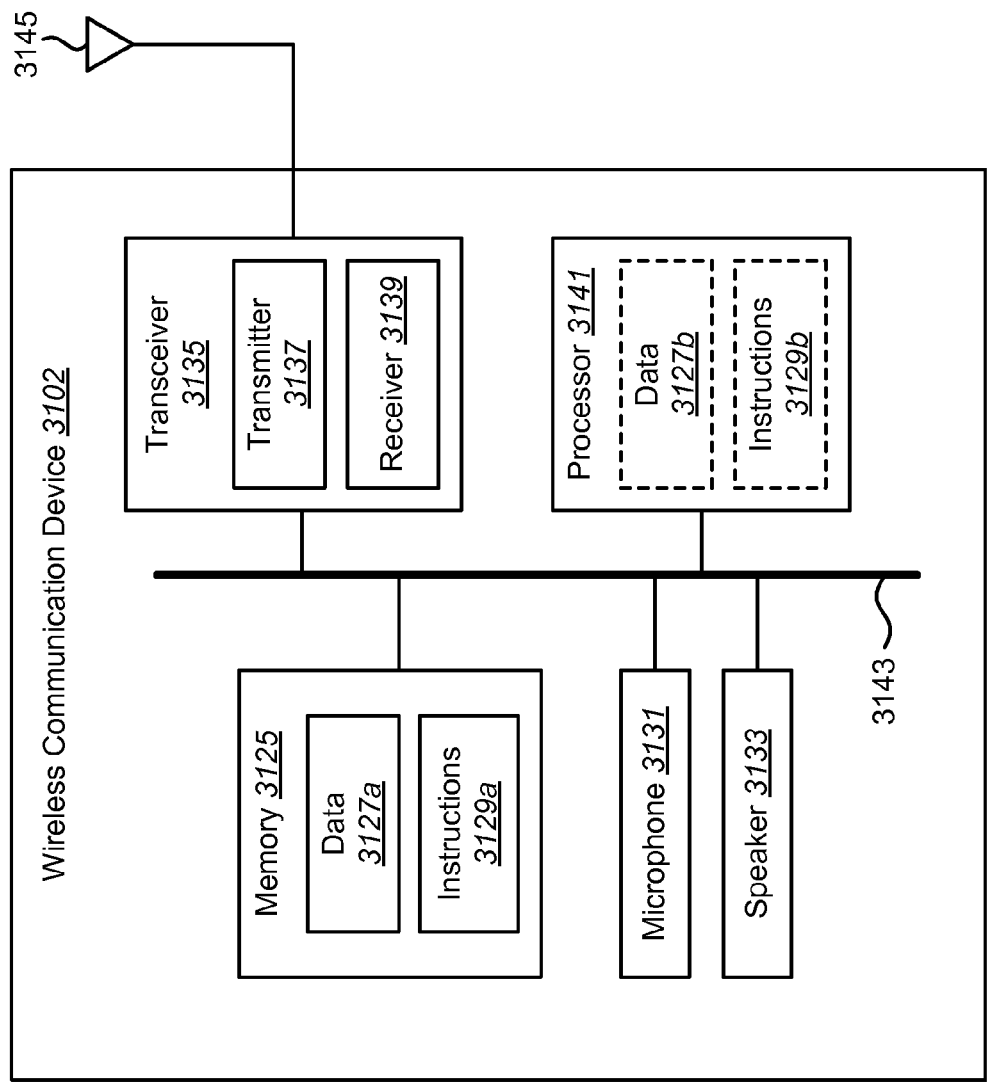
FIG. 31 illustrates certain components that may be included within a wireless communication device.

FIG. 31 illustrates certain components that may be included within a wireless communication device 3102. In some configurations, one or more of the devices or electronic devices described herein may be implemented in accordance with the wireless communication device 3102 illustrated in FIG. 31.

The wireless communication device 3102 includes a processor 3141. The processor 3141 may be a general purpose single- or multi-chip microprocessor (e.g., an ARM), a special purpose microprocessor (e.g., a digital signal processor (DSP)), a microcontroller, a programmable gate array, etc. The processor 3141 may be referred to as a central processing unit (CPU). Although just a single processor 3141 is shown in the wireless communication device 3102 of FIG. 31, in an alternative configuration, a combination of processors 3141 (e.g., an ARM and DSP) could be used.

The wireless communication device 3102 also includes memory 3125 in electronic communication with the processor 3141 (e.g., the processor 3141 can read information from and/or write information to the memory 3125). The memory 3125 may be any electronic component capable of storing electronic information. The memory 3125 may be random access memory (RAM), read-only memory (ROM), magnetic disk storage media, optical storage media, flash memory devices in RAM, on-board memory included with the processor 3141, programmable read-only memory (PROM), erasable programmable read-only memory (EPROM), electrically erasable PROM (EEPROM), registers, and so forth, including combinations thereof.

Data 3127a and instructions 3129a may be stored in the memory 3125. The instructions 3129a may include one or more programs, routines, sub-routines, functions, procedures, code, etc. The instructions 3129a may include a single computer-readable statement or many computer-readable statements. The instructions 3129a may be executable by the processor 3141 to implement one or more of the methods or functions described herein. Executing the instructions 3129a may involve the use of the data 3127a that is stored in the memory 3125. FIG. 31 shows some instructions 3129b and data 3127b being loaded into the processor 3141 (which may come from instructions 3129a and data 3127a in memory 3125).

The wireless communication device 3102 may also include a transmitter 3137 and a receiver 3139 to allow transmission and reception of signals between the wireless communication device 3102 and a remote location (e.g., another wireless communication device, etc.). The transmitter 3137 and receiver 3139 may be collectively referred to as a transceiver 3135. An antenna 3145 may be electrically coupled to the transceiver 3135. The wireless communication device 3102 may also include (not shown) multiple transmitters 3137, multiple receivers 3139, multiple transceivers 3135 and/or multiple antennas 3145.

In some configurations, the wireless communication device 3102 may include one or more microphones 3131 for capturing acoustic signals. In one configuration, a microphone 3131 may be a transducer that converts acoustic signals (e.g., voice, speech, noise, etc.) into electrical or electronic signals. Additionally or alternatively, the wireless communication device 3102 may include one or more speakers 3133. In one configuration, a speaker 3133 may be a transducer that converts electrical or electronic signals into acoustic signals.

The various components of the wireless communication device 3102 may be coupled together by one or more buses, which may include a power bus, a control signal bus, a status signal bus, a data bus, etc. For simplicity, the various buses are illustrated in FIG. 31 as a bus system 3143.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The methods and apparatus disclosed herein may be applied generally in any transceiving and/or audio sensing application, including mobile or otherwise portable instances of such applications and/or sensing of signal components from far-field sources. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." For example, the term "based on" may indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

The term "couple" and any variations thereof may indicate a direct or indirect connection between elements. For example, a first element coupled to a second element may be directly connected to the second element, or indirectly connected to the second element through another element.

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, smoothing and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations.

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband). Unless the context indicates otherwise, the term "offset" is used herein as an antonym of the term "onset."

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The foregoing presentation of the described configurations is provided to enable any person skilled in the art to make or use the methods and other structures disclosed herein. The flowcharts, flow diagrams, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits and symbols that may be referenced throughout the above description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing for more aggressive noise reduction.

An apparatus as disclosed herein may be implemented in any combination of hardware with software, and/or with firmware, that is deemed suitable for the intended application. For example, the elements of such an apparatus may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of the elements of the apparatus may be implemented within the same array or arrays. Such an array or arrays may be implemented within one or more chips (for example, within a chipset including two or more chips).

One or more elements of the various implementations of the apparatus disclosed herein may also be implemented in whole or in part as one or more sets of instructions arranged to execute on one or more fixed or programmable arrays of logic elements, such as microprocessors, embedded processors, intellectual property (IP) cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a voice activity detection procedure as described herein, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software or combinations of both. Such modules, logical blocks, circuits, and operations may be implemented or performed with a general-purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, a CD-ROM or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., methods and other methods disclosed by way of description of the operation of the various apparatus described herein) may be performed by an array of logic elements such as a processor, and that the various elements of an apparatus as described herein may be implemented as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in one or more computer-readable media as listed herein) as one or more sets of instructions readable and/or executable by a machine including an array of logic elements (e.g., a processor, microprocessor, microcontroller, or other finite state machine). The term "computer-readable medium" may include any medium that can store or transfer information, including volatile, nonvolatile, removable and non-removable media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk, a fiber optic medium, a radio frequency (RF) link, or any other medium which can be used to store the desired information and which can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one or even all of the various tasks of the method. One or more (possibly all) of the tasks may also be implemented as code (e.g., one or more sets of instructions), embodied in a computer program product (e.g., one or more data storage media such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device such as a handset, headset, or portable digital assistant (PDA), and that the various apparatus described herein may be included within such a device. A typical real-time (e.g., online) application is a telephone conversation conducted using such a mobile device.

In one or more exemplary embodiments, the operations described herein may be implemented in hardware, software, firmware or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose."

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for signal level matching of one or more audio signals by an electronic audio device, comprising:
 segmenting an input spectrum into one or more bands;
 measuring a signal-to-noise ratio for each band;
 determining if the signal-to-noise ratios are less than a signal-to-noise ratio threshold;

assembling a target spectrum, wherein assembling a target spectrum comprises replacing a portion of a speech reference spectrum with a portion of a speech template spectrum that corresponds to one or more bands of the audio signals with signal-to-noise ratios that are less than the signal-to-noise ratio threshold; and adjusting a gain of one or more bands in a noise-suppressed signal such that the one or more bands approximately match the target spectrum.

2. The method of claim 1, further comprising:
capturing the audio signals from a plurality of microphones;
determining a difference signal based on an inter-microphone subtraction, wherein the difference signal comprises multiple harmonics;
determining whether a harmonicity of the difference signal exceeds a harmonicity threshold;
preserving the harmonics to determine an envelope; and
applying the envelope to the noise-suppressed signal.

3. The method of claim 2, further comprising suppressing residual noise based on the audio signals.

4. The method of claim 2, wherein applying the envelope to the noise-suppressed signal comprises adjusting the gain of the noise-suppressed signal such that a noise-suppressed signal level approximately matches an audio signal level.

5. The method of claim 2, wherein determining a difference signal comprises determining portions of the input spectrum that correspond to a speech signal.

6. The method of claim 1, wherein the speech template spectrum is based on a codebook.

7. The method of claim 1, wherein the speech template spectrum is based on an interpolation of the bands of the input spectrum where the signal-to-noise ratio is greater than the signal-to-noise ratio threshold.

8. The method of claim 1, wherein the speech reference spectrum is based on the input spectrum.

9. The method of claim 1, wherein assembling a target spectrum comprises harmonic synthesis generation.

10. The method of claim 1, further comprising:
generating a confidence measure or a voicing parameter;
estimating one or more sinusoidal parameters based on a fundamental frequency;
generating a sinusoidal signal based on the one or more sinusoidal parameters; and
multiplying the sinusoidal signal by the confidence measure or the voicing parameter to produce a scaled sinusoidal signal.

11. The method of claim 10, further comprising:
filtering the scaled sinusoidal signal to produce a first filtered signal;
filtering the transformed signal to produce a second filtered signal;
summing the first filtered signal and the second filtered signal to produce a second summed signal; and
transforming the second summed signal into a time domain.

12. The method of claim 1, wherein the target spectrum is based on gain differences and a pitch estimate.

13. The method of claim 1, further comprising:
receiving a noise signal;
filtering the noise signal to produce a filtered noise signal;
generating a first summed signal based on the filtered noise signal and a speech signal;
generating a transformed signal based on the first summed signal;
generating a fundamental frequency of the transformed signal;
generating a confidence measure or a voicing parameter;
estimating one or more sinusoidal parameters based on the fundamental frequency;
generating a sinusoidal signal based on the one or more sinusoidal parameters;
multiplying the sinusoidal signal by the confidence measure or the voicing parameter to produce a scaled sinusoidal signal;
filtering the scaled sinusoidal signal to produce a first filtered signal;
filtering the transformed signal to produce a second filtered signal;
summing the first filtered signal and the second filtered signal to produce a second summed signal; and
transforming the second summed signal into a time domain.

14. An electronic audio device for signal level matching of one or more audio signals, comprising:
inter-microphone subtraction circuitry configured to segment an input spectrum into one or more bands;
peak sufficiency determination circuitry coupled to the inter-microphone subtraction circuitry, wherein the peak sufficiency determination circuitry is configured to measure a signal-to-noise ratio for each band and to determine if the signal-to-noise ratios are less than a signal-to-noise ratio threshold;
assemble spectrum circuitry coupled to the peak sufficiency determination circuitry, wherein the assemble spectrum circuitry is configured to assemble a target spectrum by replacing a portion of a speech reference spectrum with a portion of a speech template spectrum that corresponds to one or more bands of the audio signals with signal-to-noise ratios that are less than the signal-to-noise ratio threshold; and
a gain adjuster coupled to the assemble spectrum circuitry, wherein the gain adjuster is configured to adjust a gain of one or more bands in the noise-suppressed signal such that the one or more bands approximately match the target spectrum.

15. The electronic audio device of claim 14, wherein the inter-microphone subtraction circuitry is configured to determine a difference signal based on an inter-microphone subtraction, wherein the difference signal comprises multiple harmonics, and wherein the electronic audio device further comprises:
a plurality of microphones coupled to the inter-microphone subtraction circuitry, wherein the plurality of microphones is configured to capture the audio signals;
envelope determination circuitry coupled to the inter-microphone subtraction circuitry, wherein the envelope determination circuitry is configured to determine whether a harmonicity of the difference signal exceeds a harmonicity threshold and to preserve the harmonics to determine an envelope; and
envelope application circuitry coupled to the envelope determination circuitry, wherein the envelope application circuitry is configured to apply the envelope to a noise-suppressed signal.

16. The electronic audio device of claim 15, further comprising residual noise suppression circuitry coupled to the inter-microphone subtraction circuitry, wherein the residual noise suppression circuitry is configured to suppress residual noise based on the audio signals.

17. The electronic audio device of claim 15, wherein the envelope application circuitry is configured to apply the envelope to the noise-suppressed signal by adjusting a gain of the noise-suppressed signal such that a noise-suppressed signal level approximately matches an audio signal level.

18. The electronic audio device of claim 15, wherein the inter-microphone subtraction circuitry is configured to determine the difference signal by determining portions of the input spectrum that correspond to a speech signal.

19. The electronic audio device of claim 14, wherein the speech template spectrum is based on a codebook.

20. The electronic audio device of claim 14, wherein the speech template spectrum is based on an interpolation of the bands of the input spectrum where the signal-to-noise ratio is greater than the signal-to-noise ratio threshold.

21. The electronic audio device of claim 14, wherein the speech reference spectrum is based on the input spectrum.

22. The electronic audio device of claim 14, wherein the assemble spectrum circuitry is configured to assemble the target spectrum by harmonic synthesis generation.

23. The electronic audio device of claim 14, wherein the target spectrum is based on gain differences and a pitch estimate.

24. The electronic audio device of claim 14, further comprising:
   a first filter configured to receive a noise signal and filter the noise signal to produce a filtered noise signal;
   a first summer coupled to the first filter, wherein the first summer is configured to generate a first summed signal based on the filtered noise signal and a speech signal;
   a first transformer coupled to the first summer, wherein the first transformer is configured to generate a transformed signal based on the first summed signal;
   pitch analysis circuitry coupled to the first transformer, wherein the pitch analysis circuitry is configured to generate a fundamental frequency of the transformed signal and generate a confidence measure or a voicing parameter;
   sinusoidal parameter estimation circuitry coupled to the pitch analysis circuitry, wherein the sinusoidal parameter estimation circuitry is configured to estimate one or more sinusoidal parameters based on the fundamental frequency;
   sinusoidal synthesis circuitry coupled to the sinusoidal parameter estimation circuitry, wherein the sinusoidal synthesis circuitry is configured to generate a sinusoidal signal based on the one or more sinusoidal parameters;
   a first multiplier coupled to the sinusoidal synthesis circuitry, wherein the first multiplier is configured to multiply the sinusoidal signal by the confidence measure or the voicing parameter to produce a scaled sinusoidal signal;
   a second filter coupled to the sinusoidal synthesis circuitry, wherein the second filter is configured to filter the scaled sinusoidal signal to produce a first filtered signal;
   a third filter coupled to the first transformer, wherein the third filter is configured to filter the transformed signal to produce a second filtered signal;
   a second summer coupled to the second filter and the third filter, wherein the second summer is configured to sum the first filtered signal and the second filtered signal to produce a second summed signal; and
   a second transformer coupled to the summer, wherein the transformer is configured to transform the second summed signal into a time domain.

25. A computer-program product for signal level matching of one or more audio signals, comprising a non-transitory tangible computer-readable medium having instructions thereon, the instructions comprising:
   code for causing the electronic audio device to segment an input spectrum into one or more bands;
   code for causing the electronic audio device to measure a signal-to-noise ratio for each band;
   code for causing the electronic audio device to determine if the signal-to-noise ratios are less than a signal-to-noise ratio threshold;
   code for causing the electronic audio device to assemble a target spectrum, wherein assembling a target spectrum comprises replacing a portion of a speech reference spectrum with a portion of a speech template spectrum that corresponds to one or more bands of the audio signals with signal-to-noise ratios that are less than the signal-to-noise ratio threshold; and
   code for causing the electronic audio device to adjust a gain of one or more bands in a noise-suppressed signal such that the one or more bands approximately match the target spectrum.

26. The computer-program product of claim 25, wherein the instructions further comprise:
   code for causing the electronic audio device to capture the audio signals from a plurality of microphones;
   code for causing the electronic audio device to determine a difference signal based on an inter-microphone subtraction, wherein the difference signal comprises multiple harmonics;
   code for causing the electronic audio device to determine whether a harmonicity of the difference signal exceeds a harmonicity threshold;
   code for causing the electronic audio device to preserve the harmonics to determine an envelope; and
   code for causing the electronic audio device to apply the envelope to a noise-suppressed signal.

27. The computer-program product of claim 26, wherein the code for causing the electronic audio device to apply the envelope to the noise-suppressed signal comprises code for causing the electronic audio device to adjust the gain of the noise-suppressed signal such that a noise-suppressed signal level approximately matches an audio signal level.

28. The computer-program product of claim 26, wherein the code for causing the electronic audio device to determine a difference signal comprises code for causing the electronic audio device to determine portions of the input spectrum that correspond to a speech signal.

29. The computer-program product of claim 25, wherein the speech template spectrum is based on a codebook.

30. The computer-program product of claim 25, wherein the speech template spectrum is based on an interpolation of the bands of the input spectrum where the signal-to-noise ratio is greater than the signal-to-noise ratio threshold.

31. The computer-program product of claim 25, wherein the speech reference spectrum is based on the input spectrum.

32. The computer-program product of claim 25, wherein the code for causing the electronic audio device to assemble a target spectrum comprises code for causing the electronic audio device to perform harmonic synthesis generation.

33. The computer-program product of claim 25, wherein the target spectrum is based on gain differences and a pitch estimate.

34. The computer-program product of claim 25, wherein the instructions further comprise:
   code for causing the electronic audio device to receive a noise signal;
   code for causing the electronic audio device to filter the noise signal to produce a filtered noise signal;

code for causing the electronic audio device to generate a first summed signal based on the filtered noise signal and a speech signal;
code for causing the electronic audio device to generate a transformed signal based on the first summed signal;
code for causing the electronic audio device to generate a fundamental frequency of the transformed signal;
code for causing the electronic audio device to generate a voicing parameter or a confidence measure;
code for causing the electronic audio device to estimate one or more sinusoidal parameters based on the fundamental frequency;
code for causing the electronic audio device to generate a sinusoidal signal based on the one or more sinusoidal parameters;
code for causing the electronic audio device to multiply the sinusoidal signal by the confidence measure or the voicing parameter to produce a scaled sinusoidal signal;
code for causing the electronic audio device to filter the scaled sinusoidal signal to produce a first filtered signal;
code for causing the electronic audio device to filter the transformed signal to produce a second filtered signal;
code for causing the electronic audio device to sum the first filtered signal and the second filtered signal to produce a second summed signal; and
code for causing the electronic audio device to transform the second summed signal into a time domain.

35. An electronic audio device for signal level matching of one or more audio signals, comprising:
means for segmenting an input spectrum into one or more bands;
means for measuring a signal-to-noise ratio for each band;
means for determining if the signal-to-noise ratios are less than a signal-to-noise ratio threshold;
means for assembling a target spectrum, wherein the means for assembling a target spectrum comprises means for replacing a portion of a speech reference spectrum with a portion of a speech template spectrum that corresponds to one or more bands of the audio signals with signal-to-noise ratios that are less than the signal-to-noise ratio threshold; and
means for adjusting a gain of one or more bands in the noise-suppressed signal such that the one or more bands approximately match the target spectrum.

36. The electronic audio device of claim 35, further comprising:
means for capturing the audio signals;
means for determining a difference signal based on an inter-microphone subtraction, wherein the difference signal comprises multiple harmonics;
means for determining whether a harmonicity of the difference signal exceeds a harmonicity threshold;
means for preserving the harmonics to determine an envelope; and
means for applying the envelope to a noise-suppressed signal.

37. The electronic audio device of claim 36, wherein the means for applying the envelope to the noise-suppressed signal comprises means for adjusting the gain of the noise-suppressed signal such that a noise-suppressed signal level approximately matches an audio signal level.

38. The apparatus of claim 36, wherein the means for determining a difference signal comprises means for determining portions of the input spectrum that correspond to a speech signal.

39. The electronic audio device of claim 35, wherein the speech template spectrum is based on a codebook.

40. The electronic audio device of claim 35, wherein the speech template spectrum is based on an interpolation of the bands of the input spectrum where the signal-to-noise ratio is greater than the signal-to-noise ratio threshold.

41. The electronic audio device of claim 35, wherein the speech reference spectrum is based on the input spectrum.

42. The electronic audio device of claim 35, wherein the means for assembling a target spectrum comprises means for harmonic synthesis generation.

43. The electronic audio device of claim 35, wherein the target spectrum is based on gain differences and a pitch estimate.

44. The electronic audio device of claim 35, further comprising:
means for receiving a noise signal and for filtering the noise signal to produce a filtered noise signal;
means for generating a first summed signal based on the filtered noise signal and a speech signal;
means for generating a transformed signal based on the first summed signal;
means for generating a fundamental frequency of the transformed signal;
means for generating a voicing parameter or a confidence measure;
means for estimating one or more sinusoidal parameters based on the fundamental frequency;
means for generating a sinusoidal signal based on the one or more sinusoidal parameters;
means for multiplying the sinusoidal signal by the confidence measure or the voicing parameter to produce a scaled sinusoidal signal;
means for filtering the scaled sinusoidal signal to produce a first filtered signal;
means for filtering the transformed signal to produce a second filtered signal;
means for summing the first filtered signal and the second filtered signal to produce a second summed signal; and
means for transforming the second summed signal into a time domain.

* * * * *